United States Patent
Watanuki et al.

(10) Patent No.: US 9,726,965 B2
(45) Date of Patent: Aug. 8, 2017

(54) PROJECTION DEVICE, IMAGE CORRECTION METHOD, AND COMPUTER-READABLE RECORDING MEDIUM

(71) Applicant: JVC KENWOOD Corporation, Yokohama-shi (JP)

(72) Inventors: Katsumi Watanuki, Yokohama (JP); Hironobu Fukutomi, Yokohama (JP); Ryo Nishima, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 28 days.

(21) Appl. No.: 14/808,907

(22) Filed: Jul. 24, 2015

(65) Prior Publication Data
US 2015/0331302 A1 Nov. 19, 2015

Related U.S. Application Data

(63) Continuation of application No. PCT/JP2014/051726, filed on Jan. 27, 2014.

(30) Foreign Application Priority Data

Jan. 28, 2013 (JP) .................... 2013-013552
Jan. 31, 2013 (JP) .................... 2013-017507
(Continued)

(51) Int. Cl.
*G03B 21/14* (2006.01)
*H04N 9/31* (2006.01)
(Continued)

(52) U.S. Cl.
CPC ......... *G03B 21/147* (2013.01); *G03B 21/142* (2013.01); *G03B 21/16* (2013.01);
(Continued)

(58) Field of Classification Search
CPC ... H04N 9/3185; G03B 21/147; G03B 21/142
(Continued)

(56) References Cited

U.S. PATENT DOCUMENTS 7,441,906 B1 * 10/2008 Wang .................. H04N 9/3185
    348/745
8,511,835 B2 * 8/2013 Sato ....................... G06T 3/0006
    353/121
(Continued)

FOREIGN PATENT DOCUMENTS

JP      S63-061212 A    3/1988
JP      2003-107325 A   4/2003
(Continued)

OTHER PUBLICATIONS

Office Action in Japanese Patent Application No. 2013-076025, dated Jun. 21, 2016.

*Primary Examiner* — Kimberly A Williams
(74) *Attorney, Agent, or Firm* — Venable LLP; Michael A. Sartori; F. Brock Riggs

(57) ABSTRACT

A projection device includes a projection unit including a display element in which pixel lines each formed by pixels arranged in a first direction are arranged in a second direction and an optical system that projects light emitted from the display element and projecting an image based on input image data, a first correction unit for correcting a scale of each line data of the image data that corresponds to each of the pixel lines, a second correction unit for correcting a second-direction scale of each pixel data of the image data after the correction performed by the first correction unit, and an image cutting-out unit for cutting out image data of an area, which is projected from the projection unit, of the image data after the correction performed by the second correction unit and input the image data of the area to the projection unit.

18 Claims, 50 Drawing Sheets

(30) Foreign Application Priority Data

Feb. 14, 2013 (JP) ................. 2013-026529
Apr. 1, 2013 (JP) ................. 2013-076025

(51) Int. Cl.
*G09G 3/00* (2006.01)
*G03B 21/16* (2006.01)

(52) U.S. Cl.
CPC ........... *G09G 3/002* (2013.01); *H04N 9/3185* (2013.01); *G09G 2320/0693* (2013.01); *G09G 2340/045* (2013.01); *G09G 2340/0492* (2013.01); *G09G 2340/14* (2013.01)

(58) Field of Classification Search
USPC ...................... 345/647; 353/69, 70
See application file for complete search history.

(56) References Cited

U.S. PATENT DOCUMENTS

| | | | |
|---|---|---|---|
| 2004/0061838 A1* | 4/2004 | Mochizuki | H04N 5/74 353/69 |
| 2004/0141157 A1* | 7/2004 | Ramachandran | G02B 17/06 353/70 |
| 2005/0046803 A1* | 3/2005 | Akutsu | H04N 9/3194 353/69 |
| 2005/0046804 A1* | 3/2005 | Akutsu | H04N 5/74 353/70 |
| 2005/0162620 A1* | 7/2005 | Taguchi | G03B 21/14 353/69 |
| 2009/0027629 A1* | 1/2009 | Yonezawa | H04N 5/7416 353/70 |
| 2010/0117929 A1* | 5/2010 | Fujimori | G06F 3/1446 345/1.3 |
| 2012/0148172 A1* | 6/2012 | Uemura | G06T 5/003 382/264 |
| 2012/0182416 A1* | 7/2012 | Kawaguchi | H04N 9/3185 348/128 |

FOREIGN PATENT DOCUMENTS

| | | |
|---|---|---|
| JP | 2004-077545 A | 3/2004 |
| JP | 2006-003426 A | 1/2006 |
| JP | 2006-065176 A | 3/2006 |
| JP | 2007-272068 A | 10/2007 |

* cited by examiner

PROJECTION DEVICE, IMAGE CORRECTION METHOD, AND COMPUTER-READABLE RECORDING MEDIUM

CROSS-REFERENCE TO RELATED APPLICATIONS

This application is a continuation of PCT International Application No. PCT/JP2014/051726 filed on Jan. 27, 2014 which claims the benefit of priority from Japanese Patent Application No. 2013-013552 filed on Jan. 28, 2013, Japanese Patent Application No. 2013-017507 filed on Jan. 31, 2013, Japanese Patent Application No. 2013-026529 filed on Feb. 14, 2013, and Japanese Patent Application No. 2013-076025 filed on Apr. 1, 2013, the entire contents of which are incorporated herein by reference.

BACKGROUND OF THE INVENTION

1. Field of the Invention

The present invention relates to a projection device, an image correction method, and a computer-readable recording medium.

2. Description of the Related Art

A projection device such as a projector device is known which drives display elements based on an input image signal and projects an image relating to the image signal on a projection face of a projection medium such as a screen or a wall face. In such a projection device, in a case where a projection image is projected not in a state in which an optical axis of a projection lens is perpendicular to the projection face but in a state in which the optical axis of the projection lens is inclined with respect to the projection face, a problem of a so-called trapezoidal distortion in which a projection image originally projected in an originally approximate rectangular shape is displayed to be distorted in a trapezoidal shape on the projection face occurs.

Accordingly, conventionally, by performing a trapezoidal distortion correction (keystone correction) for converting an image that is a projection target into a trapezoidal shape formed in a direction opposite to that of the trapezoidal shape formed in the projection image displayed on the projection face, a projection image having an approximately rectangular shape without any distortion is displayed on the projection face.

For example, in Japanese Patent Application Laid-open No. 2004-77545, a technology for projecting excellent video for which a trapezoidal distortion correction has been appropriately performed onto a projection face in a projector also in a case where the projection face is either a wall face or a ceiling is disclosed.

In such a conventional technology, when a trapezoidal distortion correction (keystone correction) is performed, an image is converted into a trapezoidal shape formed in a direction opposite to a trapezoidal shape generated in a projection image according to a projection direction, and the converted image is input to a display device, whereby the keystone correction is performed. Accordingly, on the display device, an image having the number of pixels that is smaller than the number of pixels that can be originally displayed by the display device is input in the trapezoidal shape formed in the opposite direction, and a projection image is displayed in an approximately rectangular shape on the projection face onto which the projection image is projected.

In the conventional technology as described above, in order not to display an area of the periphery of the projection image onto which the approximately rectangular-shaped original projection image is projected, in other words, a differential area between the area of the projection image of a case where no correction is made and the area of the projection image after the correction on the projection face, image data corresponding to black is input to the display device, or the display device is controlled not to be driven. Accordingly, there is a problem in that the pixel area of the display device is not effectively used. In addition, there are cases where the brightness of the actual projection area decreases.

Meanwhile, recently, in accordance with wide use of high-resolution digital cameras, the resolution of video content is improved, and thus, there are cases where the resolution of the video content is higher than the resolution of a display device. For example, in a projection device such as a projector that supports up to full HD of 1920 pixels×1080 pixels as an input image for a display device having resolution of 1280 pixels×720 pixels, the input image is scaled in a prior stage of the display device so as to match the resolution such that the whole input image can be displayed on the display device, or a partial area of the input image that corresponds to the resolution of the display device is cut out and is displayed on the display device without performing such scaling.

Even in such a case, in a case where projection is performed in a state in which the optical axis of the projection lens is inclined with respect to the projection face, a trapezoidal distortion occurs, and accordingly, it is necessary to perform the trapezoidal distortion correction, and similar problems occur at that time.

The present invention is devised in consideration of the description presented above, and an object thereof is to provide a projection device, an image correction method, and a computer-readable recording medium capable of easily acquiring an appropriate projection image.

SUMMARY OF THE INVENTION

It is an object of the present invention to at least partially solve the problems in the conventional technology.

There is provided a projection device that includes a projection unit including a display element in which a plurality of pixel lines each formed by a plurality of pixels arranged in a first direction are arranged in a second direction perpendicular to the first direction and an optical system that projects light emitted from the display element and projecting an image based on input image data; a first correction unit configured to correct a scale of each line data of the image data that corresponds to each of the pixel lines based on a position of the each of the pixel lines in the second direction in the display element and a second-direction component of inclination of a projection direction of the projection unit with respect to a normal line of a projection face onto which the image is projected; a second correction unit configured to correct a second-direction scale of each pixel data of the image data after the correction performed by the first correction unit based on a position of each pixel in the second direction in the display element and the second-direction component of the inclination of the projection direction of the projection unit with respect to the normal line of the projection face onto which the image is projected; and an image cutting-out unit configured to cut-out image data of an area, which is projected from the projection unit, of the image data after the correction performed by the second correction unit and input the image data of the area to the projection unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1A:
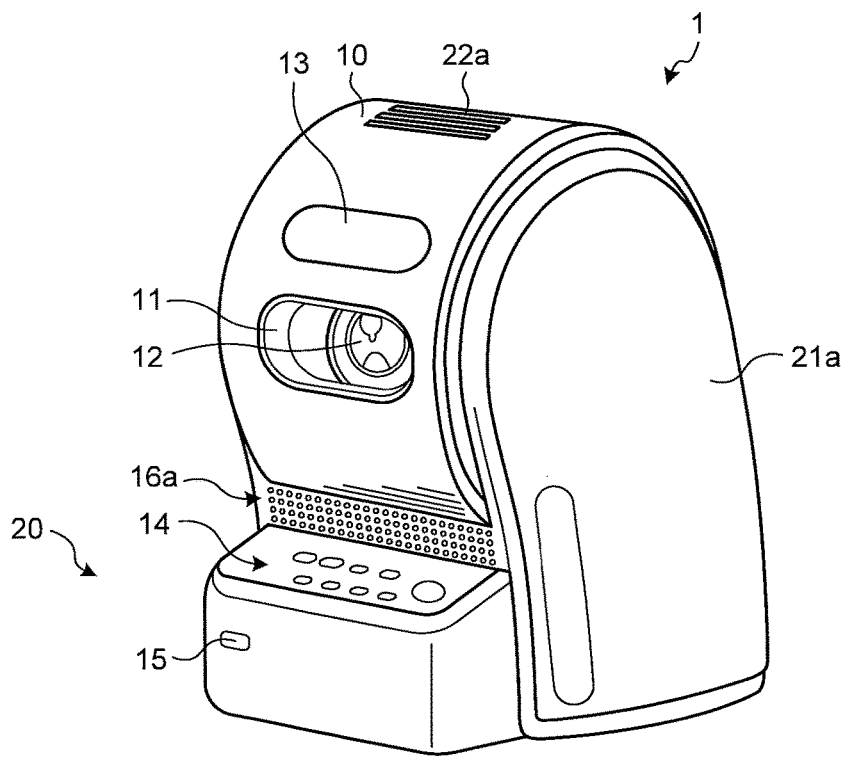
FIG. 1A is a schematic diagram that illustrates an example of the external appearance of a projector device that can be applied to be common to each embodiment.

Hereinafter, a projection device, an image correction method and a computer-readable recording medium according to embodiments will be described in detail with reference to the accompanying drawings. Specific numerical values, external configurations, and the like represented in the embodiments are merely examples for easy understanding of the present invention but are not for the purpose of limiting the present invention unless otherwise mentioned. In addition, elements not directly relating to the present invention are not described in detail and are not presented in the drawings.

Configuration Common to Embodiments

External Appearance of Projection Device

Figure 1B:
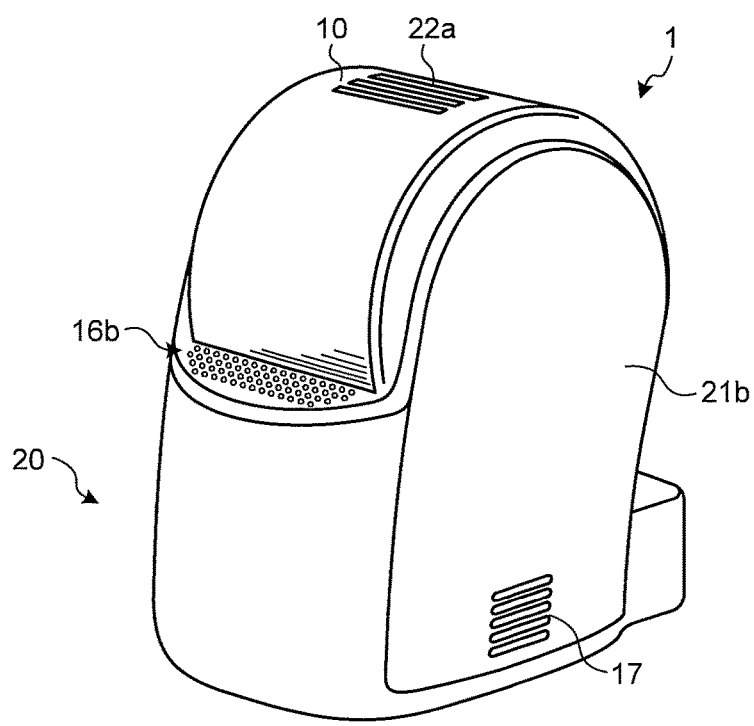
FIG. 1B is a schematic diagram that illustrates an example of the external appearance of the projector device that can be applied to be common to each embodiment.

FIGS. 1A and 1B are schematic diagrams that illustrate an example of the external appearances of a projection device (projector device) 1 that can be applied to be common to embodiments. FIG. 1A is a perspective view of the projector device 1 viewed from a first face side on which an operation unit is disposed, and FIG. 1B is a perspective view of the projector device 1 viewed from a second face side that is a side facing the operation unit. The projector device 1 includes a drum unit 10 and a base 20. The drum unit 10 is a rotor that is driven to be rotatable with respect to the base 20. In addition, the base 20 includes a support portion supporting the drum unit 10 to be rotatable and a circuit unit performing various control operations such as rotation driving control of the drum unit 10 and image processing control.

The drum unit 10 is supported to be rotatable by a rotation shaft, which is not illustrated in the figure, disposed on the inner side of side plate portions 21a and 21b that are parts of the base 20 and is configured by a bearing and the like. Inside the drum unit 10, a light source, a display element that modulates light emitted from the light source based on image data, a drive circuit that drives the display element, an optical engine unit that includes an optical system projecting the light modulated by the display element to the outside, and a cooling means configured by a fan and the like used for cooling the light source and the like are disposed.

In the drum unit 10, window portions 11 and 13 are disposed. The window portion 11 is disposed such that light projected from a projection lens 12 of the optical system described above is emitted to the outside. In the window portion 13, a distance sensor deriving a distance up to a projection medium, for example, using an infrared ray, an ultrasonic wave, or the like is disposed. In addition, the drum unit 10 includes an intake/exhaust hole 22a that performs air in-taking/exhausting for heat rejection using a fan.

Inside the base 20, various substrates of the circuit unit, a power supply unit, a drive unit used for driving the drum unit 10 to be rotated, and the like are disposed. The rotary drive of the drum unit 10 that is performed by this drive unit will be described later. On the first face of the base 20, an operation unit 14 used for inputting various operations for controlling the projector device 1 and a reception unit 15 that receives a signal transmitted by a user from a remote control commander not illustrated in the figure when the projector device 1 is remotely controlled are disposed. The operation unit 14 includes various operators receiving user's operation inputs, a display unit used for displaying the state of the projector device 1, and the like.

On the first face side and the second face side of the base 20, intake/exhaust holes 16a and 16b are respectively disposed. Thus, even in a case where the intake/exhaust hole 22a of the drum unit 10 that is driven to be rotated takes a posture toward the base 20 side, air in-taking or air exhaust can be performed so as not to decrease the heat rejection efficiency of the inside of the drum unit 10. In addition, an intake/exhaust hole 17 disposed on the side face of the casing performs air in-taking and air exhaust for heat rejection of the circuit unit.

Rotary Drive of Drum Unit

Figure 2A:
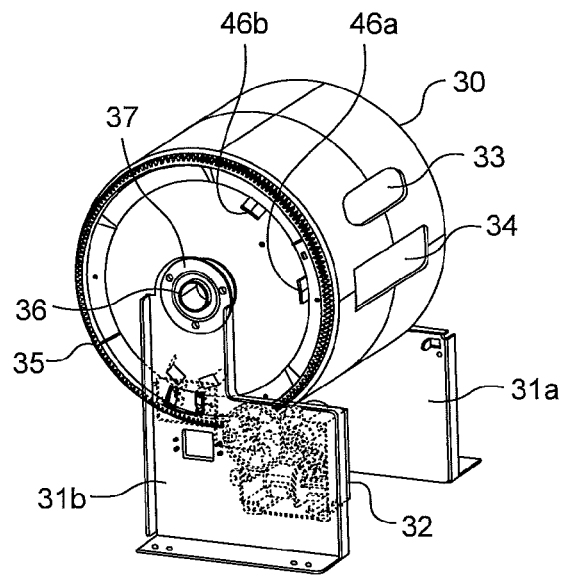
FIG. 2A is a schematic diagram that illustrates an example of the configuration for performing rotary drive of a drum unit that can be applied to be common to each embodiment.
Figure 2B:
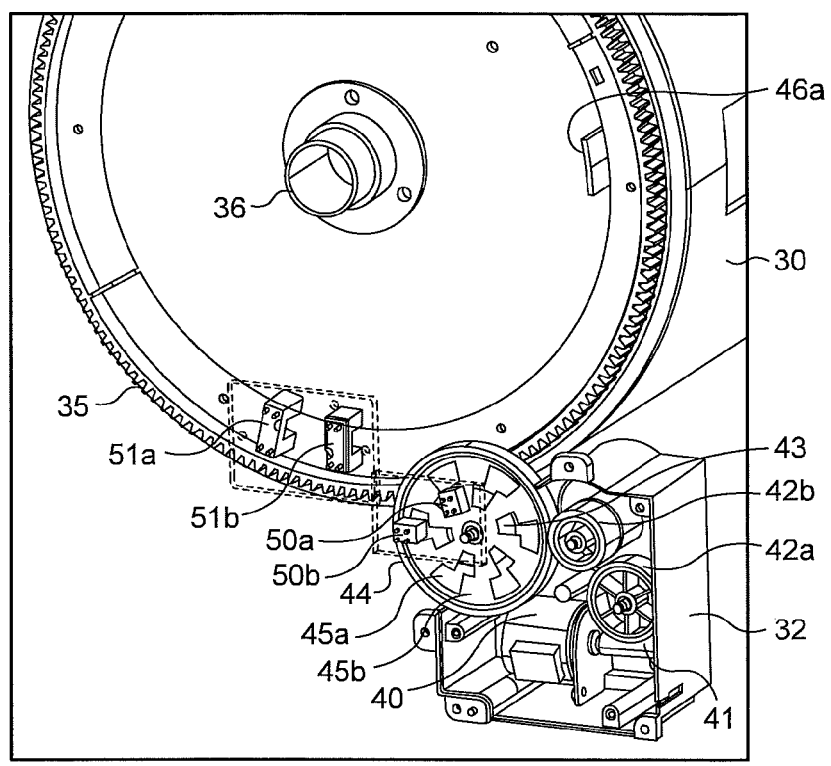
FIG. 2B is a schematic diagram that illustrates an example of the configuration for performing rotary drive of the drum unit that can be applied to be common to each embodiment.

FIGS. 2A and 2B are diagrams that illustrate the rotary drive of the drum unit 10, which can be applied to be common to the embodiments, performed by a drive unit 32 disposed in the base 20. FIG. 2A is a diagram that illustrates the configuration of a drum 30 in a state in which a cover and the like of the drum unit 10 are removed and the drive unit 32 disposed in the base 20. In the drum 30, a window portion 34 corresponding to the window portion 11 described above and a window portion 33 corresponding to the window portion 13 are disposed. The drum 30 includes a rotation shaft 36 and is attached to a bearing 37 using bearings disposed in support portions 31a and 31b to be driven to rotate by the rotation shaft 36.

On one face of the drum 30, a gear 35 is disposed on the circumference. The drum 30 is driven to be rotated through the gear 35 by the drive unit 32 disposed in the support portion 31b. Here, protrusions 46a and 46b disposed in the inner circumference portion of the gear 35 are disposed so as to detect a start point and an end point at the time of the rotating operation of the drum 30.

FIG. 2B is an enlarged diagram that illustrates the configuration of the drum 30 and the drive unit 32 disposed in the base 20 in more detail. The drive unit 32 includes a motor 40 and a gear group including a worm gear 41 that is directly driven by the rotation shaft of the motor 40, gears 42a and 42b that transfer rotation according to the worm gear 41, and a gear 43 that transfers the rotation transferred from the gear 42b to the gear 35 of the drum 30. By transferring the rotation of the motor 40 to the gear 35 using the gear group, the drum 30 can be rotated in accordance with the rotation of the motor 40. As the motor 40, for example, a stepping motor performing rotation control for each predetermined angle using a drive pulse may be used.

In addition, photo interrupters 51a and 51b are disposed towards the support portion 31b. The photo interrupters 51a and 51b respectively detect the protrusions 46a and 46b disposed in the inner circumference portion of the gear 35. Output signals of the photo interrupters 51a and 51b are supplied to a rotation control unit 104 to be described later. In the embodiment, by detecting the protrusion 46b using the photo interrupter 51a, the rotation control unit 104 determines that the posture of the drum 30 is a posture arriving at an end point of the rotation operation. In addition, by detecting the protrusion 46a using the photo interrupter 51b, the rotation control unit 104 determines that the posture of the drum 30 is a posture arriving at a start point of the rotation operation.

Hereinafter, a direction in which the drum 30 rotates from a position at which the protrusion 46a is detected by the photo interrupter 51b to a position at which the protrusion 46b is detected by the photo interrupter 51a through a longer arc in the circumference of the drum 30 will be represented as a forward direction. In other words, the rotation angle of the drum 30 increases toward the forward direction.

In addition, the photo interrupters 51a and 51b and the protrusions 46a and 46b are arranged such that an angle formed with the rotation shaft 36 is 270° between the detection position at which the photo interrupter 51b detects the protrusion 46a and the detection position at which the photo interrupter 51a detects the protrusion 46b.

For example, in a case where a stepping motor is used as the motor 40, by specifying the posture of the drum 30 based on timing at which the protrusion 46a is detected by the photo interrupter 51b and the number of drive pulses used for driving the motor 40, a projection angle according to the projection lens 12 can be acquired.

Here, the motor 40 is not limited to the stepping motor but, for example, a DC motor may be used. In such a case, for example, as illustrated in FIG. 2B, a code wheel 44 rotating together with the gear 43 on the same shaft as that of the gear 43 is disposed, and photo reflectors 50a and 50b are disposed in the support portion 31b, whereby a rotary encoder is configured.

In the code wheel 44, for example, a transmission portion 45a and a reflection portion 45b having phases changing in the radial direction are disposed. By receiving reflected light having each phase from the code wheel 44 using the photo reflectors 50a and 50b, the rotation speed and the rotation direction of the gear 43 can be detected. Then, based on the rotation speed and the rotation direction of the gear 43 that have been detected, the rotation speed and the rotation direction of the drum 30 are derived. Based on the rotation speed and the rotation direction of the drum 30 that have been derived and a result of the detection of the protrusion 46b that is performed by the photo interrupter 51a, the posture of the drum 30 is specified, whereby the projection angle according to the projection lens 12 can be acquired.

Figure 3:
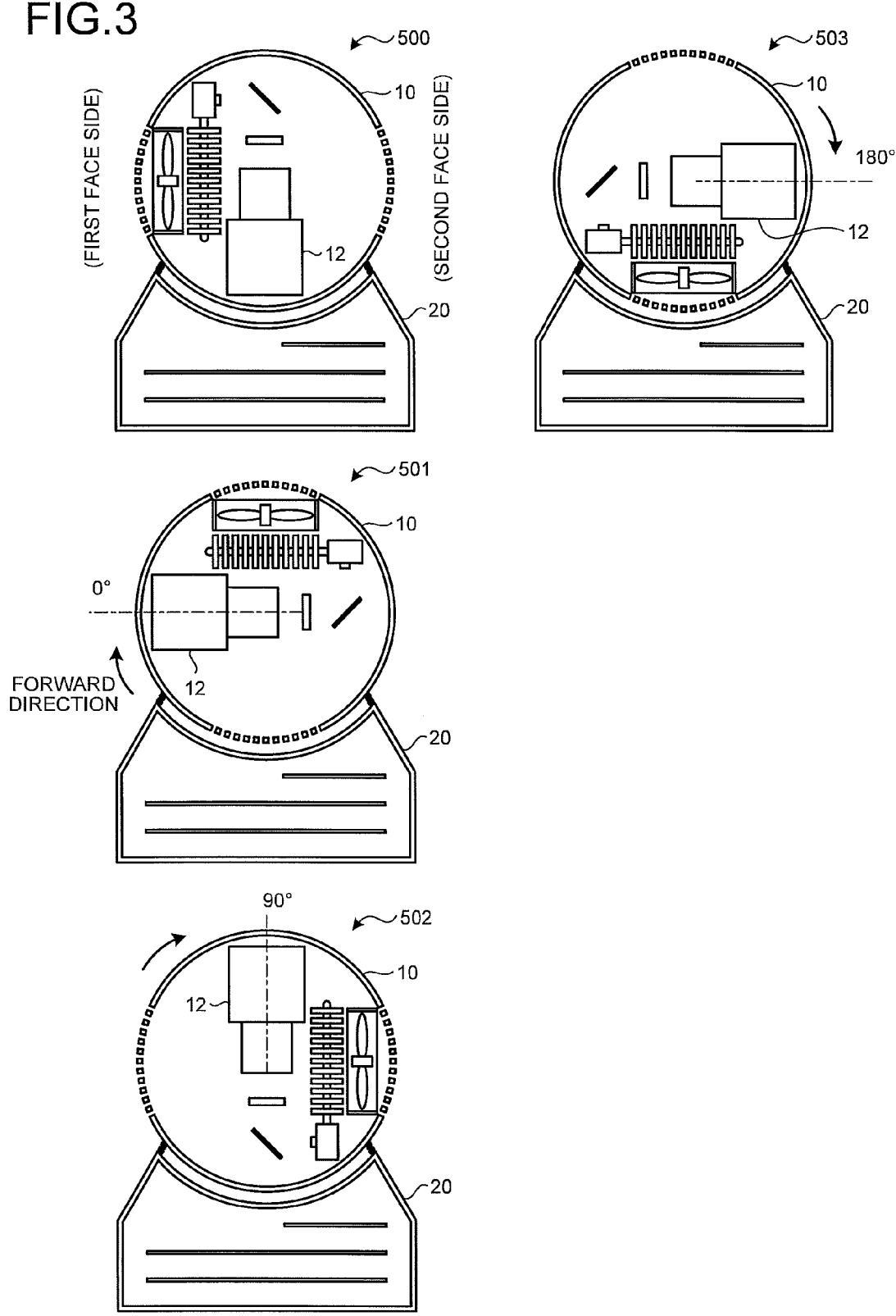
FIG. 3 is a schematic diagram that illustrates each posture of the drum unit that can be applied to be common to each embodiment.

In the configuration as described above, a state in which the projection direction according to the projection lens 12 is in the vertical direction, and the projection lens 12 is completely hidden by the base 20 will be referred to as a housed state (or housing posture). FIG. 3 is a schematic diagram that illustrates each posture of the drum unit 10. In FIG. 3, State 500 illustrates the appearance of the drum unit 10 that is in the housed state. In the embodiment, the protrusion 46a is detected by the photo interrupter 51b in the housed state, and it is determined that the drum 30 arrives at the start point of the rotation operation by the rotation control unit 104 to be described later.

Hereinafter, unless otherwise mentioned, the "direction of the drum unit 10" and the "angle of the drum unit 10" have the same meanings as the "projection direction according to the projection lens 12" and the "projection angle according to the projection lens 12".

For example, when the projector device 1 is started up, the drive unit 32 starts to rotate the drum unit 10 such that the projection direction according to the projection lens 12 faces the above-described first face. Thereafter, the drum unit 10, for example, is assumed to rotate up to a position at which the direction of the drum unit 10, in other words, the projection direction according to the projection lens 12 is horizontal on the first face side and temporarily stop. The projection angle of the projection lens 12 of a case where the projection direction according to the projection lens 12 is horizontal on the first face side is defined as a projection angle of 0°. In FIG. 3, State 501 illustrates the appearance of the posture of the drum unit 10 (projection lens 12) when the projection angle is 0°. Hereinafter, the posture of the drum unit 10 (projection lens 12) at which the projection angle is θ with the posture having a projection angle of 0° used as the reference will be referred to as a θ posture. In addition, the state of the posture having a projection angle of 0° (in other words, a 0° posture) will be referred to as an initial state.

For example, at the 0° posture, it is assumed that image data is input, and the light source is turned on. In the drum unit 10, light emitted from the light source is modulated based on the image data by the display element driven by the drive circuit and is incident to the optical system. Then, the light modulated based on the image data is projected from the projection lens 12 in a horizontal direction and is emitted to the projection face of the projection medium such as a screen or a wall face.

By operating the operation unit 14 and the like, the user can rotate the drum unit 10 around the rotation shaft 36 as its center while projection is performed from the projection lens 12 based on the image data. For example, by configuring the rotation angle to be 90° (90° posture) by rotating the drum unit 10 from the 0° posture in the forward direction, light emitted from the projection lens 12 can be projected vertically upwardly with respect to the bottom face of the base 20. In FIG. 3, State 502 illustrates the appearance of the drum unit 10 at the posture having a projection angle θ of 90°, in other words, a 90° posture.

The drum unit 10 can be rotated further in the forward direction from the 90° posture. In such a case, the projection direction of the projection lens 12 changes from the vertically upward direction with respect to the bottom face of the base 20 to the direction of the second face side. In FIG. 3, State 503 illustrates an appearance acquired when a posture having a projection angle θ of 180°, in other words, a 180° posture is formed as the drum unit 10 further rotates in the forward direction from the 90° posture of State 502. In the projector device 1 according to the embodiment, the protrusion 46b is detected by the photo interrupter 51a in this 180° posture, and it is determined that the drum has arrived at the end point of the rotation operation of the drum 30 by the rotation control unit 104 to be described later.

As will be described in detail later, the projector device 1 according to this embodiment rotates the drum unit 10, for example, as illustrated in States 501 to 503 with projection of an image being performed, thereby changing (moving) a projection area of image data in accordance with the projection angle according to the projection lens 12. Accordingly, changes in the content of a projected image and the projection position of the projected image in the projection medium and changes in the content and the position of the image area cut out as an image to be projected from the whole image area relating to input image data can be associated with each other. Accordingly, a user can intuitively perceive an area which is projected out of the whole image area relating to the input image data based on the position of the projected image in the projection medium and intuitively perform an operation of changing the content of the projected image.

In addition, the optical system includes an optical zoom mechanism and can enlarge or reduce the size at the time of projecting a projection image to the projection medium by operating the operation unit 14. Hereinafter, the enlarging or reducing of the size at the time of projecting the projection image to the projection medium according to the optical system may be simply referred to as "zooming". For example, in a case where the optical system performs zooming, the projection image is enlarged or reduced with the optical axis of the optical system at the time point of performing zooming as its center.

When the user ends the projection of the projection image using the projector device 1 and stops the projector device 1 by performing an operation for instructing the operation unit 14 to stop the projector device 1, first, rotation control is performed such that the drum unit 10 is returned to be in the housed state. When the drum unit 10 is positioned toward the vertical direction, and the return of the drum unit 10 into the housed state is detected, the light source is turned off, and, after a predetermined time required for cooling the light source, the power is turned off. By turning the power off after the drum unit 10 is positioned toward the vertical direction, the projection lens 12 can be prevented from getting dirty when the projection lens is not used.

Functional Configuration of Projector Device

Figure 4:
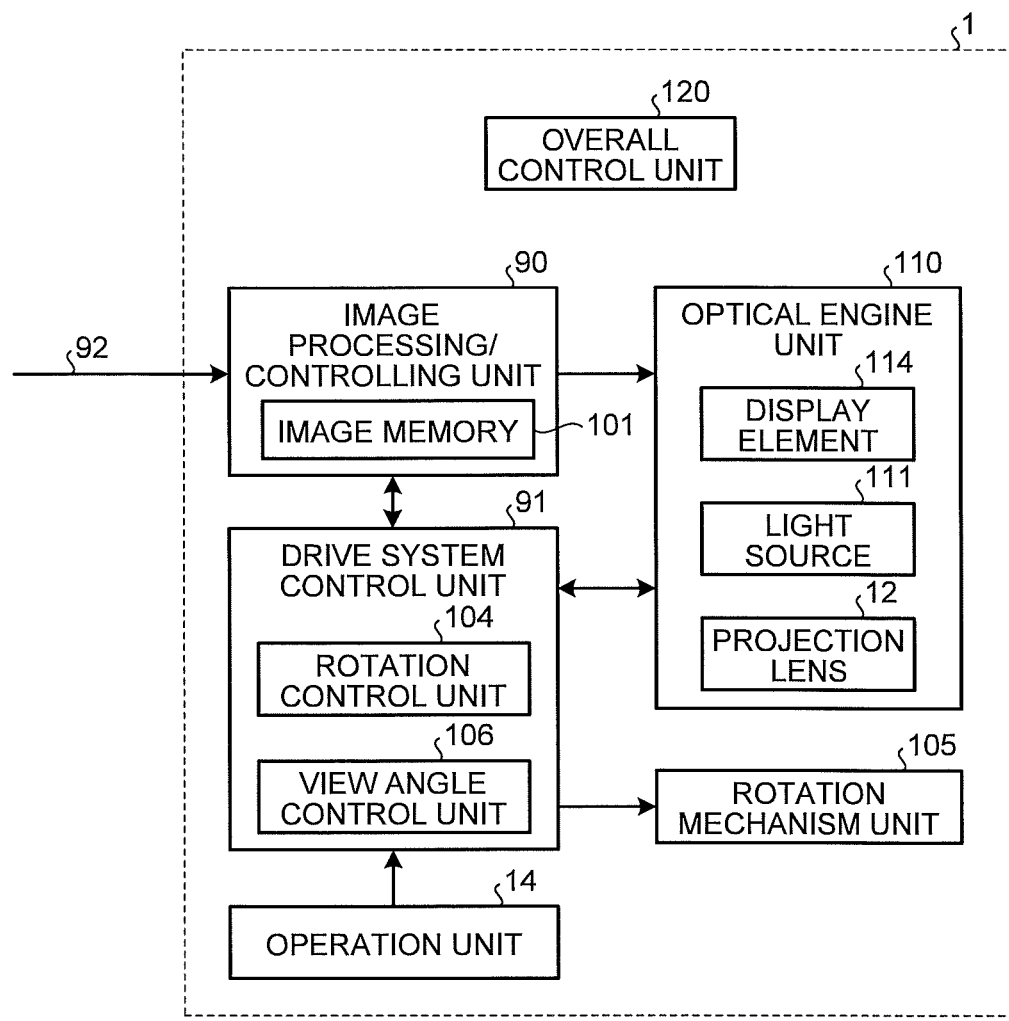
FIG. 4 is a block diagram that illustrates the functional configuration of the projector device that can be applied to be common to each embodiment.

Next, a configuration for realizing each function or operation of the projector device 1 according to each embodiment, as described above, will be described. FIG. 4 is a block diagram that illustrates the functional configuration of the projector device 1.

As illustrated in FIG. 4, the projector device 1 mainly includes: an optical engine unit 110, an image processing/controlling unit 90; a drive system control unit 91; an overall control unit 120; and an operation unit 14. Here, the optical engine unit 110 is disposed inside the drum unit 10. In addition, the image processing/controlling unit 90, the drive system control unit 91, and the overall control unit 120 are mounted on the substrate of a base 20 as a circuit unit.

The optical engine unit 110 includes a light source 111, a display element 114, and a projection lens 12. The light source 111, for example, includes three LEDs (Light Emitting Diode) respectively emitting red (R) light, green (G) light, and blue (B) light. Luminous fluxes of colors RGB that are emitted from the light source 111 irradiate the display element 114 through an optical system not illustrated in the figure.

In description presented below, the display element 114 is assumed to be a transmission-type liquid crystal display device and, for example, to have a size of horizontal 1280 pixels×vertical 720 pixels. However, the size of the display element 114 is not limited to this example. The display element 114 is driven by a drive circuit not illustrated in the figure and modulates luminous fluxes of the colors RGB based on image data and emits the modulated luminous fluxes. The luminous fluxes of the colors RGB that are emitted from the display element 114 and are modulated based on the image data are incident to the projection lens 12 through the optical system and are projected to the outside of the projector device 1.

In addition, the display element 114, for example, may be configured by a reflection-type liquid crystal display device using LCOS (Liquid Crystal on Silicon) or a DMD (Digital Micromirror Device). In such a case, the projector device is configured by an optical system and a drive circuit that correspond to the used display element.

The projection lens 12 includes a plurality of lenses that are combined together and a lens driving unit that drives the lenses according to a control signal. For example, the lens driving unit drives a lens included in the projection lens 12 based on a result of distance measurement that is acquired based on an output signal output from a distance sensor disposed in the window portion 13, thereby performing focus control. In addition, the lens driving unit changes the view angle by driving the lens in accordance with a zoom instruction supplied from a view angle control unit 106 to be described later included in the drive system control unit 91, thereby controlling the optical zoom.

As described above, the optical engine unit 110 is disposed inside the drum unit 10 that can be rotated by 360° by a rotation mechanism unit 105. The rotation mechanism unit 105 includes the drive unit 32 and the gear 35 that is a configuration of the drum unit 10 side described with reference to FIG. 2 and rotates the drum unit 10 in a predetermined manner using the rotation of the motor 40. In other words, the projection direction of the projection lens 12 is changed by the rotation mechanism unit 105.

In the circuit unit of the projector device 1, the overall control unit 120, for example, includes: a central processing unit (CPU), read only memory (ROM); and random access memory (RAM). In the overall control unit 120, the CPU performs overall control of various processes of the projector device 1 such as projecting a projection image, changing a projection angle, and cutting out of an image according to a program stored in the ROM in advance by using the RAM as a work memory.

For example, the overall control unit 120 controls each unit of the projector device 1 according to a program based on a control signal supplied from the operation unit 14 according to a user's operation. Accordingly, the projector device 1 can be operated according to a user's operation. However, the control operation is not limited thereto. Thus, the overall control unit 120, for example, may control each unit of the projector device 1 according to a script input from a data input unit not illustrated in the figure. In this way, the operation of the projector device 1 can be automatically controlled.

Image data 92 of a still image or a moving image is input to the projector device 1 and is supplied to the image processing/controlling unit 90. The image processing/controlling unit 90 stores the supplied image data 92 in an image memory 101. The image memory 101 stores the image data 92 in units of images. In other words, for each still image in a case where the image data 92 is still image data and for each frame image configuring moving image data in a case where the image data 92 is the moving image data, the image memory 101 stores corresponding data. The image memory 101, for example, in compliance with the standards of digital high vision broadcasting, can store one or a plurality of frame images of 1920 pixels and 1080 pixels.

In addition, it is preferable that the size of the image data 92 is shaped in advance into a size corresponding to the storage unit of the image data in the image memory 101, and resultant input image data is input to the projector device 1. In this example, the size of the input image data 92 is shaped into 1920 pixels×1080 pixels, and resultant image is input to the projector device 1. However, the configuration is not limited thereto, but, in the projector device 1, the image processing/controlling unit 90 may perform an image shaping process that shapes the input image data 92 input with an arbitrary size into image data of a size of 1920 pixels and 1080 pixels and then store the image data into the image memory 101.

The image processing/controlling unit 90 includes an image cutting-out unit that designates an area from which image data is cut out for the whole area of a frame image relating to the image data stored in the image memory 101. The image processing/controlling unit 90 cuts out a designated image area from the image data stored in the image memory 101 by using the image cutting-out unit and performs image processing for the cut-out image data.

For example, the image processing/controlling unit 90 performs a size converting process for image data acquired by cutting out the designated area from the image data stored in the image memory 101 such that the size coincides with the size of the display element 114. For example, the image processing/controlling unit 90 may perform the size converting process for the image data by using a general linear transformation process. In such a case, the size converting process may be omitted in a case where the size of the image data coincides with the size of the display element 114.

Other than the size converting process, the image processing/controlling unit 90 may perform various kinds of image processing. For example, the image processing/controlling unit 90 may perform a process relating to a so-called keystone correction (geometric distortion correction) for a projected image.

In addition, by performing interpolation (over sampling) with the aspect ratio of the image being maintained to be constant, the image processing/controlling unit 90 may enlarge a part or the whole of the image through an interpolation filter having a predetermined characteristic, in order to extract an aliasing distortion, by thinning out (sub sampling) the image through a low pass filter according to a reduction rate, the image processing/controlling unit 90 may reduce a part or the whole of the image, or the image processing/controlling unit 90 may maintain the size without causing the image to pass through a filter.

Furthermore, when an image is projected in an inclined direction, in order to prevent an out-of-focus image from being blurred in a peripheral portion, the image processing/controlling unit 90 may enhance the edge of a blurred image portion that is projected by performing an edge enhancement process using an operator (or applying one-dimensional filters in horizontal and vertical directions) such as Laplacian.

In addition, in order to prevent the brightness of the whole screen from changing due to a change in the projection size (area) according to the keystone correction described above or the like, the image processing/controlling unit 90 may perform adaptive luminance adjustment so as to maintain uniform brightness. In a case where a periphery portion of a projected image texture includes a diagonal line, in order not to allow an edge jag to be visually noticed, the image processing/controlling unit 90 may prevent the diagonal line from being observed as a jagged line by mixing a local halftone or applying a local low pass filter to shade off the edge jag.

The image data output from the image processing/controlling unit 90 is supplied to the display element 114. Actually, this image data is supplied to the drive circuit that drives the display element 114. The drive circuit drives the display element 114 based on the supplied image data.

The drive system control unit 91 includes: the rotation control unit 104 and the view angle control unit 106 described above. The rotation control unit 104, for example, receives an instruction according to a user's operation for the operation unit 14 and instructs the rotation mechanism unit 105 according to the instruction according to the user's operation. The rotation mechanism unit 105 includes the drive unit 32 and the photo interrupters 51a and 51b described above. The rotation mechanism unit 105 controls the drive unit 32 according to an instruction supplied from the rotation control unit 104 and controls the rotation operation of the drum unit 10 (drum 30). For example, the rotation mechanism unit 105 generates a drive pulse according to an instruction supplied from the rotation control unit 104, thereby driving a motor 40 that is, for example, a stepping motor. The rotation control unit 104, for example, generates a drive pulse in synchronization with a vertical synchronization signal VD supplied from a timing generator not illustrated in the figure.

Meanwhile, the outputs of the photo interrupters 51a and 51b described above and a drive pulse used for driving the motor 40 are supplied from the rotation mechanism unit 105 to the rotation control unit 104. The rotation control unit 104, for example, includes a counter and counts the pulse number of drive pulses. The rotation control unit 104 acquires the timing of detection of the protrusion 46a based on the output of the photo interrupter 51b and resets the pulse number counted by the counter at the timing of the detection of the protrusion 46a. The rotation control unit 104, based on the pulse number counted by the counter, can sequentially acquire the angle of the drum unit 10 (drum 30), thereby acquiring the posture (in other words, the projection angle of the projection lens 12) of the drum unit 10. The projection angle of the projection lens 12 is supplied to the drive system control unit 91. In this way, in a case where the projection direction of the projection lens 12 is changed, the rotation control unit 104 can derive an angle between a projection direction before change and a projection direction after the change.

In the drive system control unit 91, the view angle control unit 106, for example, through an input control unit 119 and gives a zoom instruction based on an instruction according to a user operation for the operation unit 14, in other words, an instruction for changing the view angle to the projection lens 12 based on the instruction according to the user operation. The lens driving unit of the projection lens 12 drives the lens based on the zoom instruction, thereby performing zoom control. The view angle control unit 106 supplies the zoom instruction and information of a view angle derived based on a zoom magnification relating to the zoom instruction to the image processing/controlling unit 90.

The image processing/controlling unit 90 designates an image cut-out area for which image data stored in the image memory 101 is cut out based on the information relating to the angle supplied from the rotation control unit 104 and the information relating to the view angle supplied from the view angle control unit 106. At this time, the image processing/controlling unit 90 designates a cut-out area of the image data based on a line position according to an angle between projection directions of the projection lens 12 before and after the change.

In the description presented above, while the image processing/controlling unit 90 and the drive system control unit 91 have been described as separate hardware, the configuration is not limited to such an example. For example, each of the units may be realized by a module of a program that operates on the CPU included in the overall control unit 120.

Cutting Out Process of Image Data

Figure 5:
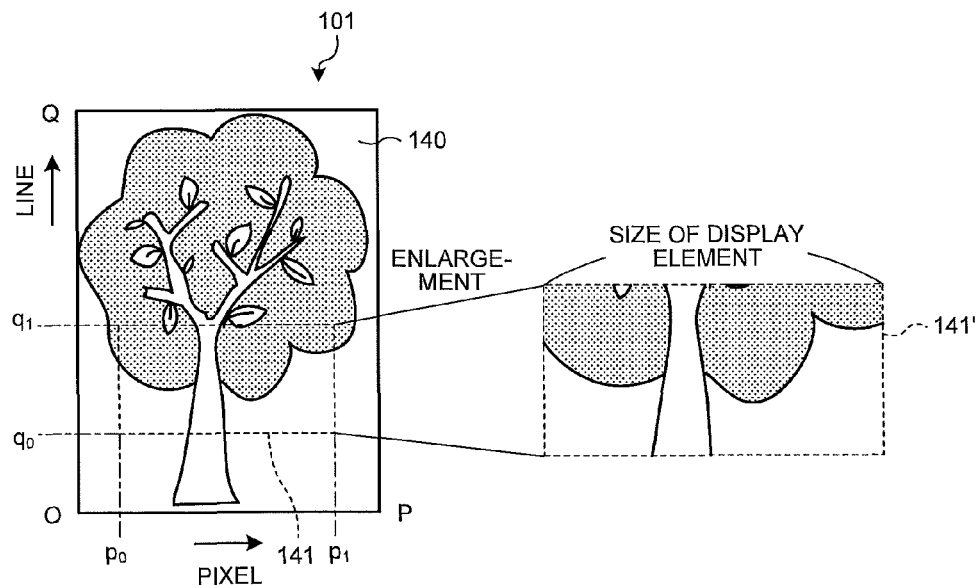
FIG. 5 is a conceptual diagram that illustrates a cutting out process of image data stored in an image memory that can be applied to be common to each embodiment.

Next, a cutting out process of image data stored in the image memory 101 that is performed by the image processing/controlling unit 90 according to each embodiment will be described. FIG. 5 is a conceptual diagram that illustrates the cutting out process of image data, which is stored in the image memory 101, according to each embodiment. An example of cutting out image data 141 of the cut-out area designated from image data 140 stored in the image memory 101 will be described with reference to a left diagram in FIG. 5.

In addition, in description presented below with reference to FIGS. 6 to 9, for simple description, a case where a geometric distortion correction is not performed for the image data and a case where the pixel size of the image data in the horizontal direction coincides with the pixel size of the display element 114 in the horizontal direction will be premised.

The image processing/controlling unit 90 designates addresses of lines $q_0$ and $q_1$ in the vertical direction and designates addresses of pixels $p_0$ and $p_1$ in the horizontal direction as a cut-out area of the image data 140 of Q lines×P pixels stored in the image memory 101. The image processing/controlling unit 90 reads lines within the range of the lines $q_0$ and $q_1$ over the pixels $p_0$ and $p_1$ from the image memory 101 in accordance with the designation of the addresses. At this time, as the sequence of reading, for example, it is assumed that the lines are read from the upper end toward the lower end of the image, and the pixels are read from the left end toward the right end of the image. The access control for the image memory 101 will be described in detail later.

The image processing/controlling unit 90 performs image processing for the image data 141 of the range of the lines $q_0$ and $q_1$ and the pixels $p_0$ and $p_1$ that has been read from the image memory 101. The image processing/controlling unit 90 performs a size conversion process in which the size of an image according to the supplied image data 141 is adjusted to the size of the display element 114. As an example, in a case where the size of the display element 114 is V lines×H pixels, a maximum multiplication m satisfying both Equations (1) and (2) as represented below is acquired. Then, the image processing/controlling unit 90 enlarges the image data 141 with this multiplication m and, as illustrated in a diagram disposed on the right side in FIG. 5 as an example, size-converted image data 141' is acquired.

$$m \times (p_1 - p_0) \leq H \quad (1)$$

$$m \times (q_1 - q_0) \leq V \quad (2)$$

Figure 6:
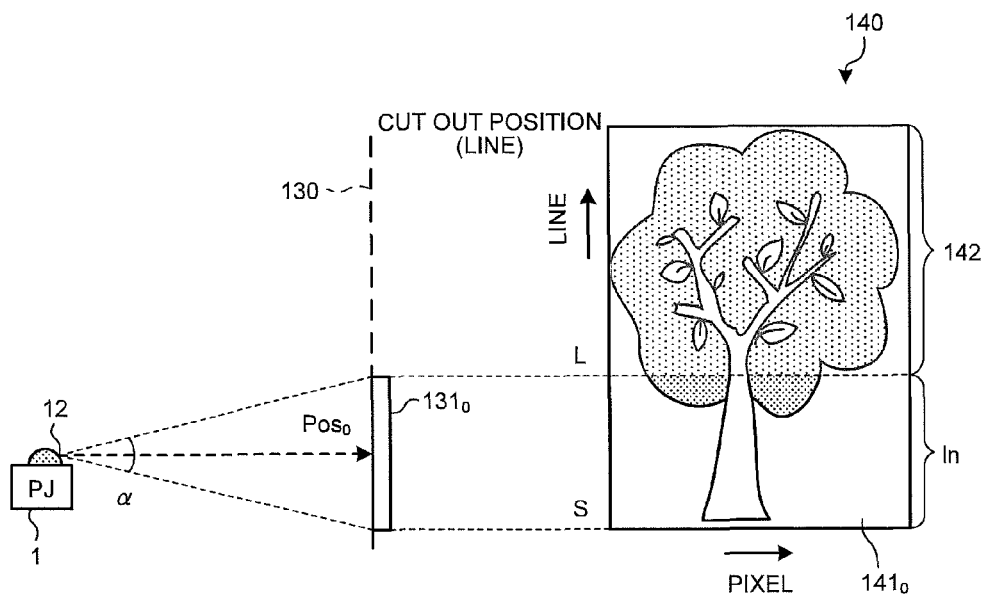
FIG. 6 is a schematic diagram that illustrates an example of designation of a cut-out area of a case where the drum unit that can be applied to be common to each embodiment is located at an initial position.

Next, the designation (update) of a cut-out area according to the projection angle according to each embodiment will be described. FIG. 6 illustrates an example of designation of a cut-out area of a case where the drum unit 10 is at the 0° posture, in other words, in a case where the projection angle is 0°.

Figure 7:
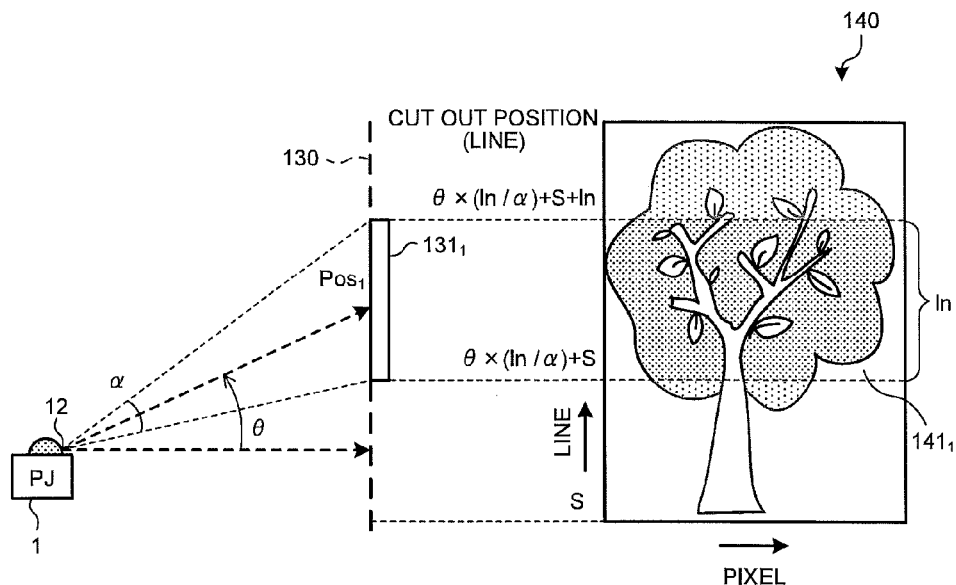
FIG. 7 is a schematic diagram that illustrates setting of a cut-out area for a projection angle θ that can be applied to be common to each embodiment.
Figure 8:
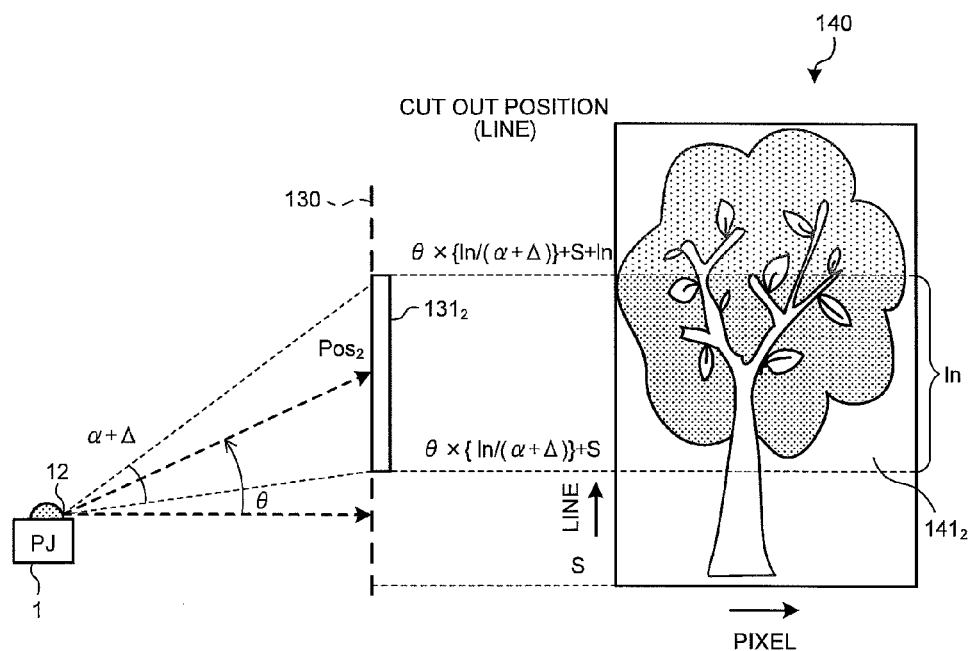
FIG. 8 is a schematic diagram that illustrates designation of a cut-out area of a case where optical zooming is performed that can be applied to be common to each embodiment.

In FIG. 5 described above, a case has been described as an example in which the image data 141 of the range of the pixels $p_0$ and $p_1$ that is a partial range of pixels of one line of the image data 140 of Q lines×P pixels stored in the image memory 101 is cut out. Also in examples illustrated in FIGS. 6 to 8, actually, pixels of a partial range of one line of the image data 140 stored in the image memory 101 may be cut out. However, in order to simplify the description of the designation (update) of a cut-out area according to the projection angle, the examples represented in FIGS. 6 to 8 illustrated below, all the pixels of one line are assumed to be cut out.

In the projector device (PJ) 1, a projection position of a case where an image $131_0$ is projected with a projection angle of 0° onto a projection face 130 that is a projection medium such as a screen by using a projection lens 12 having a view angle α is assumed to be a position $Pos_0$ corresponding to a center of luminous flux of light projected from the projection lens 12. In addition, at the projection angle of 0°, an image according to image data from the S-th line that is the lower end of an area designated in advance to the L-th line is assumed to be projected such that the image data stored in the image memory 101 is projected at the posture of a projection angle of 0°. In the area formed by lines of the S-th line to the L-th line, lines corresponding to the line number ln are included. In addition, a value representing a line position such as the S-th line or the L-th line, for example, is a value increasing from the lower end toward the upper end of the display element 114 with the line positioned at the lower end of the display element 114 set as the 0-th line.

Here, the line number ln is the number of lines of a maximal effective area of the display element 114. In addition, the view angle α is an angle for viewing a projection image in the vertical direction from the projection lens 12 in a case where the image is projected when an effective area in the vertical direction, in which the display is effective in the display element 114, has a maximum value, in other words, in a case where an image of the line number ln is projected.

The view angle α and the effective area of the display element 114 will be described using a more specific example. The display element 114 is assumed to have a size of 800 lines in the vertical direction. For example, in a case where the size of the projection image data is 800 lines in the vertical direction, and projection image data is projected using all the lines of the display element 114, the effective area of the display element 114 in the vertical direction has a maximum value of 800 lines (=line number ln). In this case, the view angle α is an angle for viewing 1st to 800th lines of the projection image from the projection lens 12.

In addition, a case may be also considered in which the size of projection image data in the vertical direction is 600 lines, and the projection image data is projected using only 600 lines out of 800 lines (=line number ln) of the display element 114. In such a case, the effective area of the display element 114 in the vertical direction is 600 lines. In this case, only a portion of the effective area according to the projection image data with respect to a maximal value of the effective area of the view angle α is projected.

The image processing/controlling unit 90 performs a process of cutting out and reading the S-th line to L-th line of the image data 140 stored in the image memory 101. Here, in the horizontal direction, all the image data 140 of the left end to the right end is read. The image processing/controlling unit 90 sets an area of the S-th line to the L-th line of the image data 140 as a cut-out area and reads the image data 141 of the set cut-out area. In the example illustrated in FIG. 6, onto the projection face 130, an image 131$_0$ according to image data 141$_0$ of the line number ln from the S-th line to the L-th line of the image data 140 is projected. In such a case, an image according to image data 142 of an area relating to the L-th line to the upper-end line out of the whole area of the image data 140 is not projected.

Next, a case will be described in which the drum unit 10 is rotated, for example, according to a user operation for the operation unit 14, and the projection angle of the projection lens 12 becomes an angle θ. In each embodiment, in a case where the drum unit 10 is rotated, and the projection angle according to the projection lens 12 is changed, the cut-out area from the image memory 101 of the image data 140 is changed in accordance with the projection angle θ.

The setting of a cut-out area for the projection angle θ will be described more specifically with reference to FIG. 7. For example, a case will be considered in which the drum unit 10 is rotated in the forward direction from a projection position of the 0° posture according to the projection lens 12, and the projection angle of the projection lens 12 becomes an angle θ (>0°). In such a case, the projection position for the projection face 130 moves to a projection position Pos$_1$ that is located on the upper side of a projection position Pos$_0$ corresponding to a projection angle of 0°. At this time, the image processing/controlling unit 90 designates a cut-out area for the image data 140 stored in the image memory 101 based on the following Equations (3) and (4). Equation (3) represents an R$_S$-th line located at the lower end of the cut-out area, and Equation (4) represents an R$_L$-th line located at the upper end of the cut-out area.

$$R_S = \theta \times (ln/\alpha) + S \quad (3)$$

$$R_L = \theta \times (ln/\alpha) + S + ln \quad (4)$$

In Equations (3) and (4), a value ln represents the number of lines (for example, the number of lines of the display element 114) included within the projection area. In addition, a value α represents a view angle of the projection lens 12, and a value S represents a position of a line located at the lower end of the cut-out area at the 0° posture described with reference to FIG. 6.

In Equations (3) and (4), (ln/α) represents the concept of the number of lines (including a concept of an approximately averaged number of lines changing in accordance with the shape of the projection face) per unit view angle of a case where the view angle α projects the line number ln. Accordingly, θ×(ln/α) represents the number of lines corresponding to the projection angle θ according to the projection lens 12 in the projector device 1. This means that, when the projection angle changes by an angle Δθ, the position of the projection image is moved by a distance corresponding to the number of lines {Δθ×(ln/α)} in the projection image. Accordingly, Equations (3) and (4) respectively represent the positions of lines located at the lower end and the upper end of the image data 140 in the projection image of a case where the projection angle is the angle θ. This corresponds to a read address for the image data 140 on the image memory 101 at the projection angle θ.

In this way, in each embodiment, an address at the time of reading the image data 140 from the image memory 101 is designated in accordance with the projection angle θ. Accordingly, for example, in the example illustrated in FIG. 7, image data 141$_1$ of the image data 140 that is located at a position corresponding to the projection angle θ is read from the image memory 101, and an image 131$_1$ relating to the read image data 141$_1$ is projected to the projection position Pos$_1$ corresponding to the projection angle θ of the projection face 130.

Thus, according to each embodiment, in a case where the image data 140 having a size larger than the size of the display element 114 is projected, a correspondence relation between the position within the projected image and the position within the image data is maintained. In addition, since the projection angle θ is acquired based on a drive pulse of the motor 40 used for driving the drum 30 to be rotated, the projection angle θ can be acquired in a state in which there is substantially no delay with respect to the rotation of the drum unit 10, and the projection angle θ can be acquired without being influenced by the projection image or the surrounding environment.

Next, the setting of a cut-out area of a case where optical zooming according to the projection lens 12 is performed will be described. As described above, in the case of the projector device 1, the view angle α of the projection lens 12 is increased or decreased by driving the lens driving unit, whereby optical zooming is performed. An increase in the view angle according to the optical zooming is assumed to be an angle Δ, and the view angle of the projection lens 12 after the optical zooming is assumed to be a view angle (α+Δ).

In such a case, even when the view angle is increased according to the optical zooming, the cut-out area for the image memory 101 does not change. In other words, the number of lines included in a projection image according to the view angle α before the optical zooming and the number of lines included in a projection image according to the view angle (α+Δ) after the optical zooming are the same. Accordingly, after the optical zooming, the number of lines included per unit angle is changed from that before the optical zooming.

The designation of a cut-out area of a case where optical zooming is performed will be described more specifically with reference to FIG. 8. In the example illustrated in FIG. 8, optical zooming is performed in which the view angle α is increased by an amount corresponding to the view angle Δ in the state of the projection angle θ. By performing the optical zooming, for example, a projection image projected onto the projection face 130, as illustrated as an image 131₂, is enlarged by an amount corresponding to the view angle Δ with respect to that of a case where the optical zooming is not performed with the center (the projection position Pos₂) of the luminous fluxes of light projected to the projection lens 12.

In a case where optical zooming corresponding to the view angle Δ is performed, when the number of lines designated as a cut-out area for the image data 140 is ln, the number of lines included per unit angle is represented by $\{ln/(\alpha+\Delta)\}$. Accordingly, the cut-out area for the image data 140 is designated based on the following Equations (5) and (6). The meaning of each variable in Equations (5) and (6) is common to that in Equations (3) and (4) described above.

$$R_S = 0 \times \{ln/(\alpha+\Delta)\} + S \quad (5)$$

$$R_L = 0 \times \{ln/(\alpha+\Delta)\} + S + ln \quad (6)$$

Image data 141₂ of an area represented in Equations (5) and (6) is read from the image data 140, and an image 131₂ relating to the read image data 141₂ is projected to a projection position Pos₂ of the projection face 130 by the projection lens 12.

In this way, in a case where optical zooming is performed, the number of lines included per unit angle is changed with respect to a case where the optical zooming is not performed, and the amount of change in the number of lines with respect to a change in the projection angle θ is different from that of a case where the optical zooming is not performed. This is a state in which a gain corresponding to the view angle Δ increased according to the optical zooming is changed in the designation of a read address according to the projection angle θ for the image memory 101.

In this embodiment, an address at the time of reading the image data 140 from the image memory 101 is designated in accordance with the projection angle θ and the view angle α of the projection lens 12. In this way, even in a case where optical zooming is performed, the address of the image data 141₂ to be projected can be appropriately designated for the memory 101. Accordingly, even in a case where the optical zooming is performed, in a case where the image data 140 of a size larger than the size of the display element 114 is projected, a correspondence relation between the position within the projected image and the position within the image data is maintained.

Figure 9:
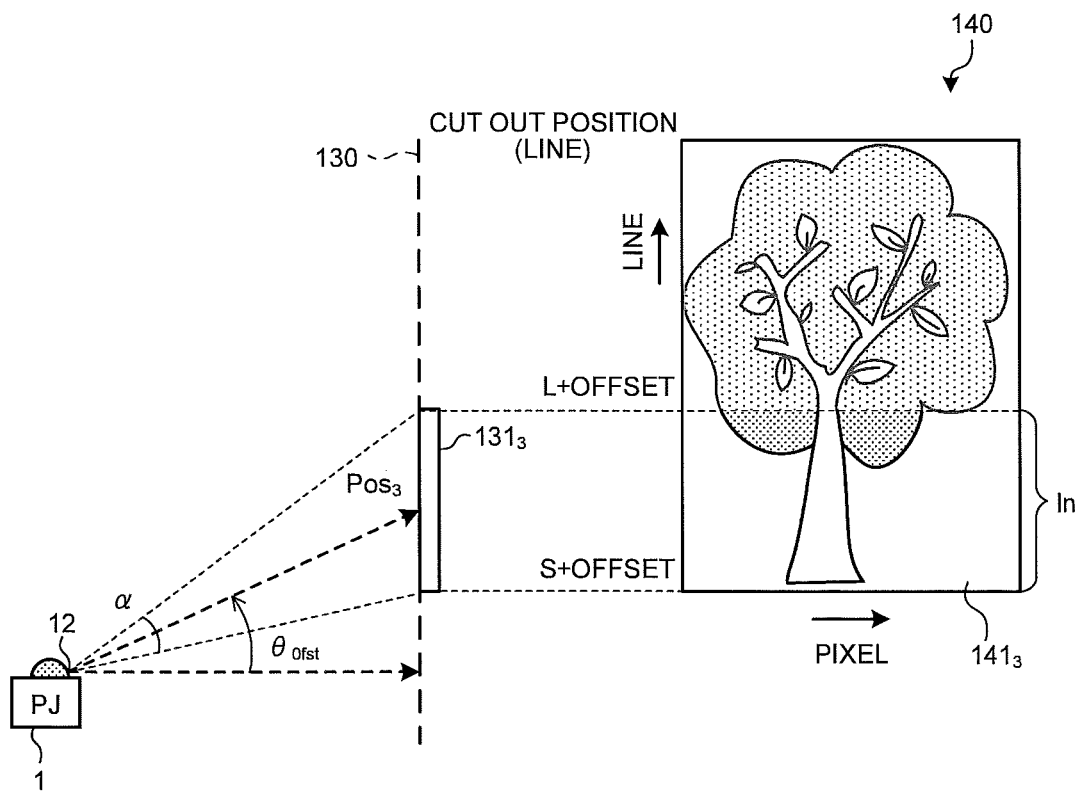
FIG. 9 is a schematic diagram that illustrates a case where an offset is given for a projection position of an image that can be applied to be common to each embodiment.

Next, a case will be described with reference to FIG. 9 in which an offset is given to the projection position of the image. When the projector device 1 is used, it cannot be determined that the 0° posture (projection angle 0°) is necessarily the lowest end of the projection position. For example, as illustrated in FIG. 9, a case may be considered in which a projection position Pos₃ according to a predetermined projection angle $\theta_{ofst}$ is set as the projection position located at the lowest end. In such a case, the image 131₃ according to the image data 141₃ is projected to a position shifted to the upper side by a height corresponding to the projection angle $\theta_{ofst}$ compared to a case where the offset is not given. The projection angle θ at the time of projecting an image having a line located at the lowest end of the image data 140 as its lowest end is set as the offset angle $\theta_{ofst}$ according to the offset.

In such a case, for example, a case may be considered in which the offset angle $\theta_{ofst}$ is regarded as the projection angle 0°, and a cut-out area for the memory 101 is designated. By applying Equations (3) and (4) described above, the following Equations (7) and (8) are formed. The meaning of each variable in Equations (7) and (8) is common to that in Equations (3) and (4) described above.

$$R_S = (\theta - \theta_{ofst}) \times (ln/\alpha) + S \quad (7)$$

$$R_L = (\theta - \theta_{ofst}) \times (ln/\alpha) + S + ln \quad (8)$$

The image data 141₃ of the area represented in Equations (7) and (8) is read from the image data 140, and the image 131₃ relating to the read image data 141₃ is projected to the projection position Pos₃ of the projection face 130 by the projection lens 12.

Memory Control

Next, access control of the image memory 101 will be described. In the image data, for each vertical synchronization signal VD, pixels are sequentially transmitted from the left end toward the right end of an image for each line in the horizontal direction, and lines are sequentially transmitted from upper end toward the lower end of the image. Hereinafter, a case will be described as an example in which the image data has a size of horizontal 1920 pixels×vertical 1080 pixels (lines) corresponding to the digital high vision standard.

Figure 10:
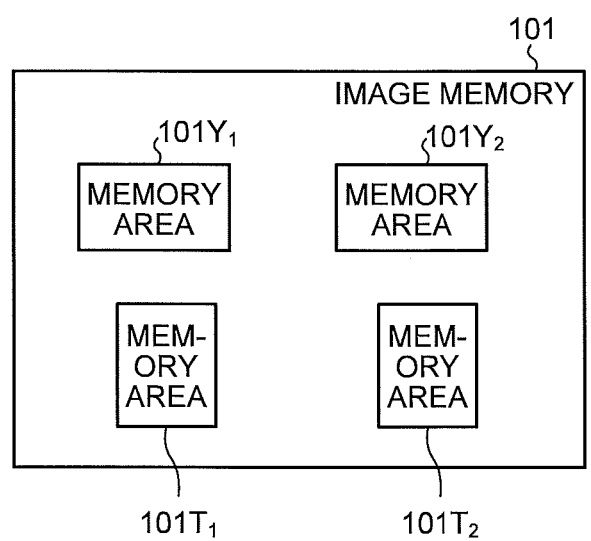
FIG. 10 is a schematic diagram that illustrates access control of a memory that can be applied to be common to each embodiment.

Hereinafter, an example of the access control of a case where the image memory 101 includes four memory areas for which the access control can be independently performed will be described. In other words, as illustrated in FIG. 10, in the image memory 101, areas of memories 101Y₁ and 101Y₂ used for writing and reading image data with a size of horizontal 1920 pixels and vertical 1080 pixels (line) and areas of memories 101T₁ and 101T₂ used for writing and reading image data with a size of horizontal 1080 pixels× vertical 1920 pixels (lines) are arranged. Hereinafter, the areas of memories 101Y₁, 101Y₂, 101T₁, and 101T₂ will be described as memories $Y_1$, $Y_2$, $T_1$, and $T_2$.

Figure 11:
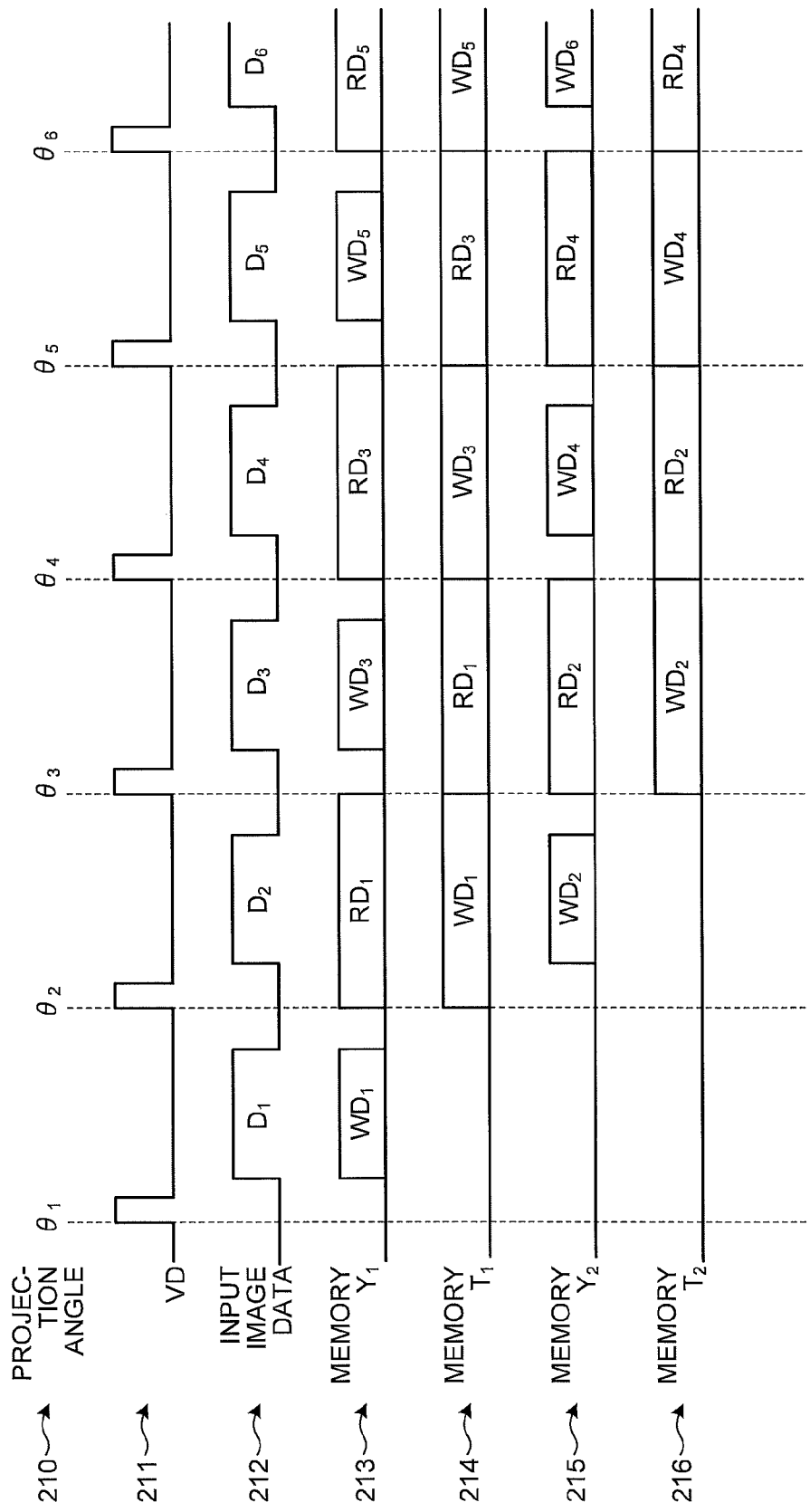
FIG. 11 is a schematic diagram that illustrates the access control of the memory that can be applied to be common to each embodiment.

FIG. 11 is an example of a timing diagram that illustrates access control of the image memory 101 using the image processing/controlling unit 90 according to each embodiment. In FIG. 11, Chart 210 represents the projection angle θ of the projection lens 12, and Chart 211 represents the vertical synchronization signal VD. In addition, Chart 212 represents input timings of image data $D_1$, $D_2$, and . . . input to the image processing/controlling unit 90, and Charts 213 to 216 represent examples of accesses to the memories $Y_1$, $Y_2$, $T_1$, and $T_2$ from the image processing/controlling unit 90. In addition, in Charts 213 to 216, each block to which "R" is attached represents reading, and each block to which "W" is attached represents writing.

For every vertical synchronization signal VD, image data $D_1$, $D_2$, $D_3$, $D_4$, $D_5$, $D_6$, . . . each having an image size of 1920 pixels×1080 lines are input to the image processing/controlling unit 90. Each of the image data $D_1$, $D_2$, . . . is synchronized with the vertical synchronization signal VD and is input after the vertical synchronization signal VD. In addition, the projection angles of the projection lens 12 corresponding to the vertical synchronization signals VD are denoted as projection angles $\theta_1$, $\theta_2$, $\theta_3$, $\theta_4$, $\theta_5$, $\theta_6$, . . . . The projection angle θ is acquired for every vertical synchronization signal VD as above.

First, the image data $D_1$ is input to the image processing/controlling unit 90. As described above, the projector device 1 according to each embodiment changes the projection angle θ according to the projection lens 12 by rotating the drum unit 10 so as to move the projection position of the projection image and designates a read position for the image data in accordance with the projection angle θ. Accordingly, it is preferable that the image data is longer in the vertical direction. Generally, image data frequently has a horizontal-direction size longer than a vertical-direction size. Thus, for example, it may be considered for a user to rotate the camera by 90° in an imaging process and input image data acquired by the imaging process to the projector device 1.

Figure 12A:
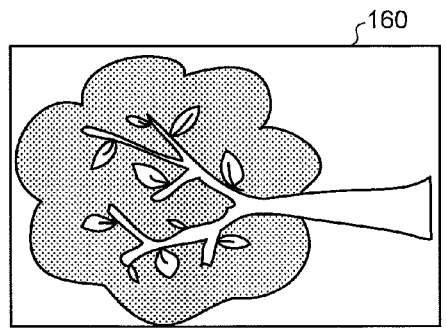
FIG. 12A is a schematic diagram that illustrates the access control of the memory that can be applied to be common to each embodiment.

In other words, an image according to the image data $D_1$, $D_2$, . . . input to the image processing/controlling unit 90, similar to an image 160 illustrated as an image in FIG. 12A, is an image facing the side acquired by rotating a right-direction image by 90° that is determined based on the content of the image.

Figure 12B:
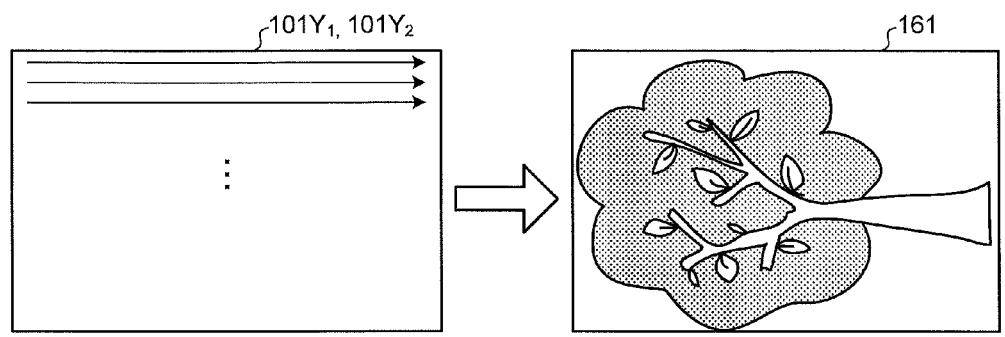
FIG. 12B is a schematic diagram that illustrates the access control of the memory that can be applied to be common to each embodiment.

The image processing/controlling unit 90 writes the input image data $D_1$, first, into the memory $Y_1$ at timing $WD_1$ corresponding to the input timing of the image data $D_1$ (timing $WD_1$ illustrated in Chart 213). The image processing/controlling unit 90 writes the image data $D_1$ into the memory $Y_1$, as illustrated on the left side of FIG. 12B, in the sequence of lines toward the horizontal direction. On the right side of FIG. 12B, an image 161 according to the image data $D_1$ written into the memory $Y_1$ as such is illustrated as an image. The image data $D_1$ is written into the memory $Y_1$ as the image 161 that is the same as the input image 160.

Figure 12C:
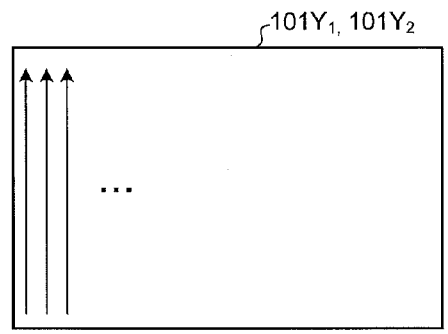
FIG. 12C is a schematic diagram that illustrates the access control of the memory that can be applied to be common to each embodiment.

The image processing/controlling unit 90, as illustrated in FIG. 12C, reads the image data $D_1$ written into the memory $Y_1$ from the memory $Y_1$ at timing $RD_1$ that is the same as the timing of start of a next vertical synchronization signal VD after the vertical synchronization signal VD for writing the image data $D_1$ (timing $RD_1$ illustrated in Chart 213).

At this time, the image processing/controlling unit 90 sequentially reads the image data $D_1$ in the vertical direction over the lines for each pixel with a pixel positioned on the lower left corner of the image being set as a reading start pixel. When pixels positioned at the upper end of the image are read, next, pixels are read in the vertical direction with a pixel positioned on the right side neighboring to the pixel positioned at the reading start pixel of the vertical direction being set as a reading start position. This operation is repeated until the reading of a pixel positioned on the upper right corner of the image is completed.

In other words, the image processing/controlling unit 90 sequentially reads the image data $D_1$ from the memory $Y_1$ for each line in the vertical direction from the left end toward the right end of the image for each pixel with the line direction being set as the vertical direction from the lower end toward the upper end of the image.

Figure 13A:
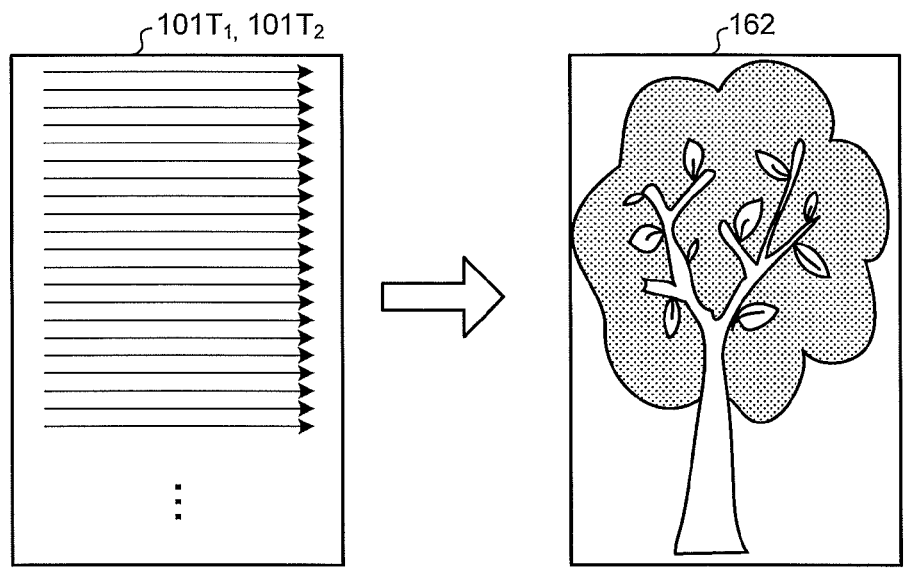
FIG. 13A is a schematic diagram that illustrates the access control of the memory that can be applied to be common to each embodiment.

The image processing/controlling unit 90 sequentially writes the pixels of the image data $D_1$ read from the memory $Y_1$ in this way, as illustrated on the left side in FIG. 13A, into the memory $T_1$ toward the line direction for each pixel (timing $WD_1$ illustrated in Chart 214). In other words, for example, every time when one pixel is read from the memory $Y_1$, the image processing/controlling unit 90 writes one pixel that has been read into the memory $T_1$.

On the right side in FIG. 13A, the image 162 according to the image data $D_1$ written into the memory $T_1$ in this way is illustrated. The image data $D_1$ is written into the memory $T_1$ with a size of horizontal 1080 pixels×vertical 1920 pixels (lines) and is the image 162 acquired by rotating the input image 160 by 90° in the clockwise direction and interchanging the horizontal direction and the vertical direction.

The image processing/controlling unit 90 designates an address of the designated cut-out area to the memory $T_1$ and reads image data of the area designated as the cut-out area from the memory $T_1$. The timing of this reading process, as represented by timing $RD_1$ in Chart 214, is delayed from the timing at which the image data $D_1$ is input to the image processing/controlling unit 90 by two vertical synchronization signals VD.

The projector device 1 according to each embodiment, as described above, moves the projection position of the projection image by rotating the drum unit 10 so as to change the projection angle θ according to the projection lens 12 and designates a reading position for image data in accordance with the projection angle θ. For example, the image data $D_1$ is input to the image processing/controlling unit 90 at the timing of the projection angle $θ_1$. The projection angle θ at the timing when an image according to the image data $D_1$ is actually projected may be changed from the projection angle $θ_1$ to a projection angle $θ_3$ different from the projection angle $θ_1$.

Accordingly, the cut-out area at the time of reading the image data $D_1$ from the memory $T_1$ is read from a range that is larger than the area of image data corresponding to the projected image in consideration of a change in the projection angle θ.

Figure 13B:
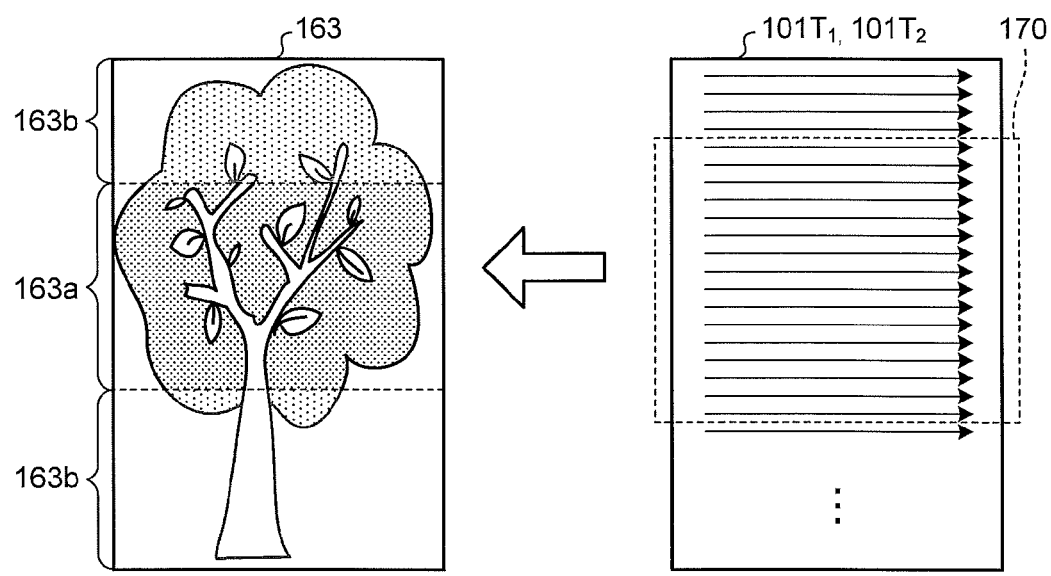
FIG. 13B is a schematic diagram that illustrates the access control of the memory that can be applied to be common to each embodiment.

The description will be presented more specifically with reference to FIG. 13B. The left side in FIG. 13B illustrates an image 163 according to the image data $D_1$ stored in the memory $T_1$. In this image 163, an area that is actually projected is represented as a projection area 163a, and the other area 163b is represented as a non-projection area. In this case, the image processing/controlling unit 90 designates the cut-out area 170 that is larger than the area of the image data corresponding to the image of the projection area 163a by at least the number of lines corresponding to a change of a case where the projection angle θ according to the projection lens 12 maximally changes during a period of two vertical synchronization signals VD for the memory $T_1$.

The image processing/controlling unit 90 reads the image data from this cut-out area 170 at the timing of a next vertical synchronization signal VD after the vertical synchronization signal VD for writing the image data $D_1$ into the memory $T_1$. In this way, at the timing of the projection angle $θ_3$, the image data to be projected is read from the memory $T_1$, is supplied to the display element 114 with necessary image processing being performed therefor in a later stage, and is projected from the projection lens 12.

At the timing of the next vertical synchronization signal VD after the vertical synchronization signal VD for which the image data $D_1$ is input, the image data $D_2$ is input to the image processing/controlling unit 90. At this timing, the image data $D_1$ is written into the memory $Y_1$. Accordingly, the image processing/controlling unit 90 writes the image data $D_2$ into the memory $Y_2$ (timing $WD_2$ illustrated in Chart 215). The sequence of writing the image data $D_2$ into the memory $Y_2$ at this time is similar to the sequence of writing the image data $D_1$ described above into the memory $Y_1$, and the sequence for the image is similar to that described above (see FIG. 12B).

In other words, the image processing/controlling unit 90 sequentially reads the image data $D_2$ in the vertical direction over the lines for each pixel up to the pixel positioned at the upper end of the image with a pixel positioned on the lower left corner of the image being set as a reading start pixel, and next, pixels are read in the vertical direction with a pixel positioned on the right side neighboring to the pixel positioned at the reading start position of the vertical direction being set as a reading start pixel (timing $RD_2$ illustrated in Chart 215). This operation is repeated until the reading of a pixel positioned on the upper right corner of the image is completed. The image processing/controlling unit 90 sequentially writes (timing $WD_2$ represented in Chart 216)

the pixel of the image data $D_2$ read from the memory $Y_2$ in this way into the memory $T_2$ toward the line direction for each pixel (see the left side in FIG. 13A).

The image processing/controlling unit 90 designates an address of the designated cut-out area to the memory $T_2$ and reads image data of the area designated as the cut-out area from the memory $T_2$ at timing $RD_2$ represented in Chart 216. At this time, as described above, the image processing/controlling unit 90 designates an area lager than the area of the image data corresponding to the projected image as the cut-out area 170 in consideration of a change in the projection angle θ for the memory $T_2$.

The image processing/controlling unit 90 reads the image data from this cut-out area 170 at the timing of a next vertical synchronization signal VD after the vertical synchronization signal VD for writing the image data $D_2$ into the memory $T_2$. In this way, the image data of the cut-out area 170 of the image data $D_2$ input to the image processing/controlling unit 90 at the timing of the projection angle $θ_2$ is read from the memory $T_2$ at the timing of the projection angle $θ_4$, is supplied to the display element 114 with necessary image processing being performed therefor in a later stage, and is projected from the projection lens 12.

Thereafter, similarly, for the image data $D_3$, $D_4$, $D_5$, ..., the process is sequentially performed using a set of the memories $Y_1$ and $T_1$ and a set of the memories $Y_2$ and $T_2$ in an alternate manner.

As described above, according to each embodiment, in the image memory 101, an area of the memories $Y_1$ and $Y_2$ used for writing and reading image data with the size of horizontal 1920 pixels×vertical 1080 pixels (lines) and an area of the memories $T_1$ and $T_2$ used for writing and reading image data with the size of horizontal 1080 pixels×vertical 1920 pixels (lines) are arranged. The reason for this is that, generally, DRAM (Dynamic Random Access Memory) used in an image memory has an access speed for the vertical direction that is lower than an access speed for the horizontal direction. In a case where another memory, which is easily randomly accessible, having access speeds of the same level for the horizontal direction and the vertical direction is used, a configuration may be employed in which a memory having a capacity corresponding to the image data is used in both the cases.

Geometric Distortion Correction

Next, the geometric distortion correction for the image data that is performed by the projector device 1 according to this embodiment will be described.

Figure 14:
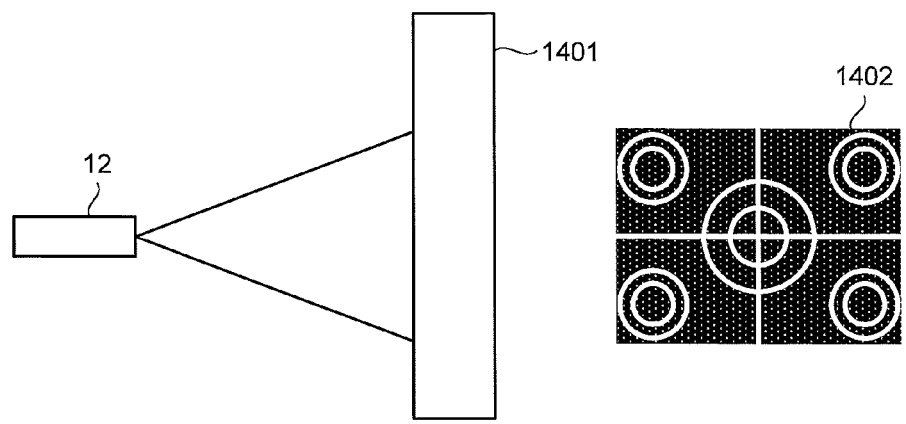
FIG. 14 is a diagram that illustrates the relation between a projection direction and a projection image projected onto a screen that can be applied to be common to each embodiment.
Figure 15:
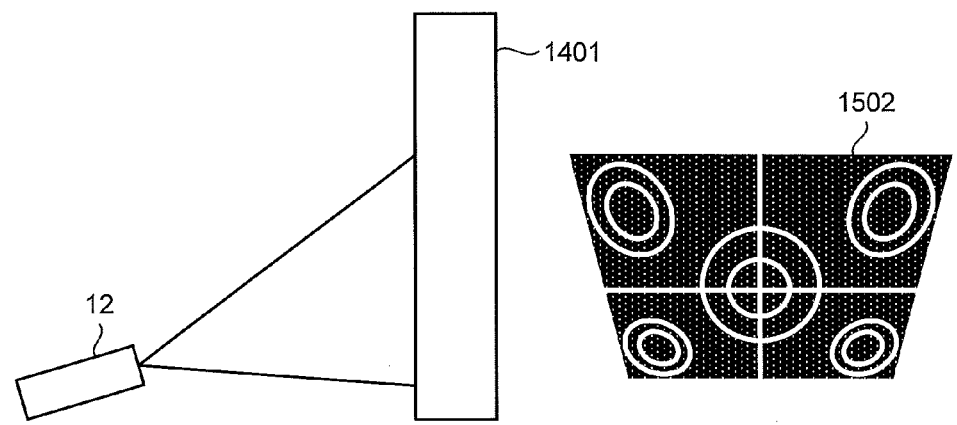
FIG. 15 is a diagram that illustrates the relation between the projection direction and the projection image projected onto the screen that can be applied to be common to each embodiment.

FIGS. 14 and 15 are diagrams that illustrate the relation between the projection direction of the projection lens 12 of the projector device 1 for a screen 1401 and the projection image projected onto the screen 1401 that is the projection face. As illustrated in FIG. 14, in a case where the projection angle is 0°, and the optical axis of the projection lens 12 is perpendicular to the screen 1401, a projection image 1402 has a rectangular shape that is the same as the image data projected from the projector device 1, and a distortion does not occur in the projection image 1402.

However, as illustrated in FIG. 15, in a case where the image data is projected in an inclined state with respect to the screen 1401, the projection image 1502 to be a rectangular shape is distorted to be in a trapezoidal shape, in other words, a so-called trapezoidal distortion occurs.

Figure 16A:
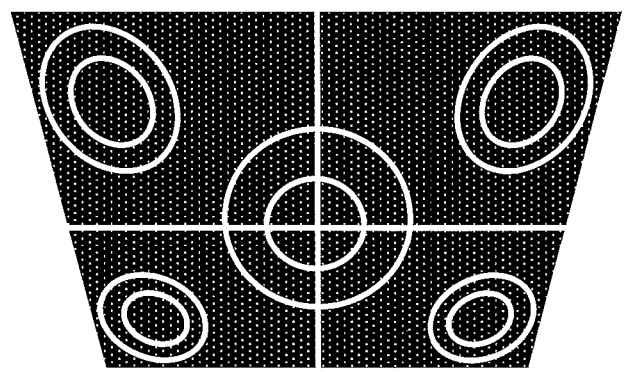
FIG. 16A is a diagram that illustrates a conventional trapezoidal distortion correction.
Figure 16B:
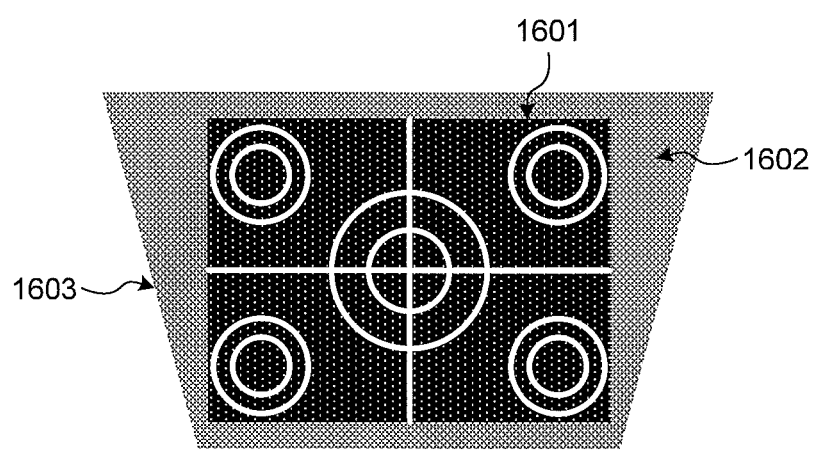
FIG. 16B is a diagram that illustrates the conventional trapezoidal distortion correction.

For this reason, conventionally, by performing a geometric distortion correction such as a trapezoidal distortion correction (keystone correction) transforming image data to be projected into a trapezoidal shape in a direction opposite to a trapezoidal shape generated in a projection image on a projection face such as a screen, as illustrated in FIGS. 16A and 16B, a projection image having a rectangular shape without any distortion on the projection face is displayed on the projection face. FIG. 16A illustrates an example of a projection image before a geometric distortion correction is performed for the image data of the projection image.

FIG. 16B illustrates an example of a projection image after a geometric distortion correction is performed for the image data of the projection image illustrated in FIG. 16A. In the conventional trapezoidal distortion correction, in order not to perform display of a peripheral area 1602 of a corrected projection image 1601, in other words, display of the area 1602 of a difference between an area 1603 of the projection image of a case where a correction is not performed and the area of the projection image 1601 after the correction, image data corresponding to black is input to the display device, or the display device is controlled so as not to be driven.

The method of designating a cut-out area using Equations (3) and (4) described above is based on a cylindrical model in which the projection face 130, for which projection is performed by the projection lens 12, is assumed to be a cylinder having the rotation shaft 36 of the drum unit 10 as its center. However, actually, the projection face 130 is frequently considered to be a perpendicular face (hereinafter, simply referred to as a "perpendicular face") forming an angle of 90° with respect to the projection angle θ=0°. In a case where image data of the same number of lines is cut out from the image data 140 and is projected to the perpendicular face, as the projection angle θ increases, an image projected to the perpendicular face grows in the vertical direction. Thus, after the process of the cutting-out unit, the image processor performs image processing as below.

Figure 17:
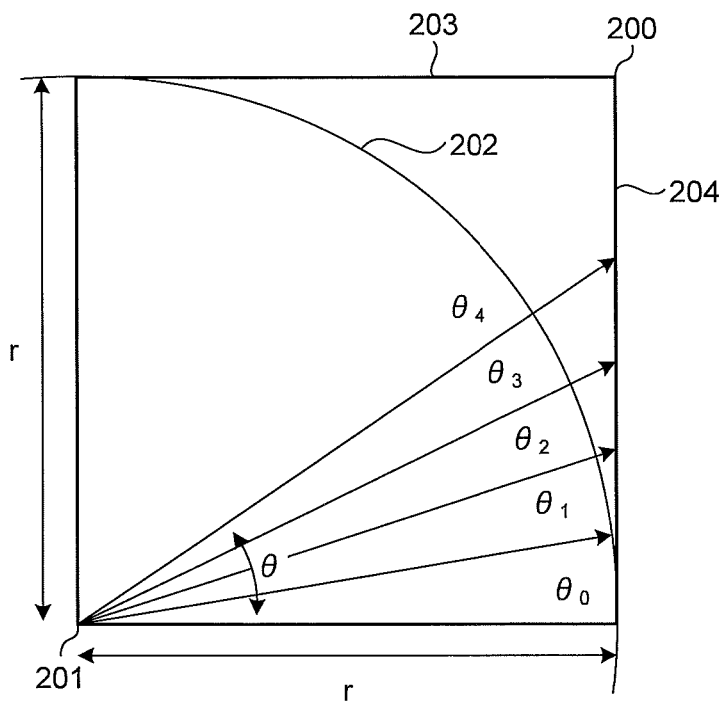
FIG. 17 is a diagram that illustrates an image projected onto a perpendicular face that can be applied to be common to each embodiment.

An image that is projected onto a perpendicular face will be described with reference to FIGS. 17 and 18. As illustrated in FIG. 17, a case will be considered in which an image is projected from the projection lens 12 onto a projection face 204 that is disposed to be separate from a position 201 by a distance r with the position 201 being the position of the rotation shaft 36 of the drum unit 10.

In the cylindrical model described above, a projection image is projected with an arc 202 that has the position 201 as its center and has a radius r being the projection face. Each point on the arc 202 has the same distance from the position 201, and the center of the luminous fluxes of light projected from the projection lens 12 is a radius of a circle including the arc 202. Accordingly, even when the projection angle θ is increased from an angle $θ_0$ of 0° to an angle $θ_1$, an angle $θ_2$, ..., the projection image is projected to the projection face with the same size all the time.

On the other hand, in a case where an image is projected from the projection lens 12 onto the projection face 204 that is a perpendicular face, when the projection angle θ is increased from an angle $θ_0$ to an angle $θ_1$, an angle $θ_2$, ..., a position on the projection face 204 to which the center of luminous fluxes of light emitted from the projection lens 12 is projected changes according to the characteristics of a tangent function as a function of the angle θ. Accordingly, the projection image grows to the upper side according to a ratio M represented in the following Equation (9) as the projection angle θ increases.

$$M = (180 \times \tan θ)/(θ \times \pi) \quad (9)$$

According to Equation (9), for example, in the case of the projection angle θ=45°, the projection image grows at the ratio of about 1.27 times. In addition, in a case where the projection face W is much higher than the length of the radius r, and projection at the projection angle θ=60° can be performed, in the case of the projection angle θ=60°, the projection image grows at the ratio of about 1.65 times.

Figure 18:
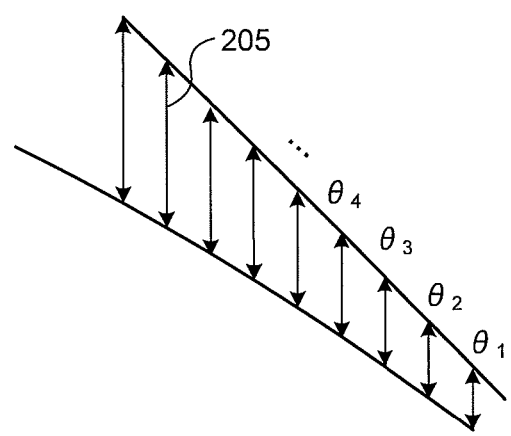
FIG. 18 is a diagram that illustrates the image projected onto the perpendicular face that can be applied to be common to each embodiment.

In addition, as illustrated in FIG. 18 as an example, a line gap 205 in the projection image on the projection face 204 is widened as the projection angle θ increases. In this case, the line gap 205 is widened based on Equation (9) described above in accordance with the position on the projection face 204 within one projection image.

Thus, projector device 1 performs a reduction process at the ratio of the reciprocal of Equation (9) described above according to the projection angle θ of the projection lens 12 for the image data of an image to be projected. In this reduction process, image data is preferably larger than the image data cut out based on the cylindrical model. In other words, while the image data depends on the height of the projection face 204 that is a perpendicular face, in the case of the projection angle θ=45°, the projection image grows at the ratio of about 1.27 times, and accordingly, the image data is reduced at the ratio of the reciprocal thereof that is about 78%.

As an example, when image data input to the projector device 1 is stored in the image memory 101, the image processing/controlling unit 90, for the image data, by using the ratio of the reciprocal of Equation (9) described above, performs a reduction process for the image data in advance for each line of an image at the time of projecting the image data. In the reduction process, a low pass filter process is performed for lines (pixels in the vertical direction) with a reduction rate depending on the projection angle θ by using a low pass filter of several taps, thereby thinning out the lines. More precisely, in the low pass filter process, it is preferable that a limit value of the band of the low pass filter is also changed depending on the projection angle θ. However, the reduction process is not limited thereto, but general linear interpolation may be used in which the characteristic of the filter is determined to be uniform with a reduction rate corresponding to a maximum projection angle θ, or the characteristic of the filter is determined to be uniform with a reduction rate corresponding to almost ½ of the maximum projection angle θ. In addition, after the filter process, for the lines to be thinned out, it is preferable that sub-sampling is performed depending on the projection angle θ within the screen.

The process is not limited thereto. Thus, a process of uniformly performing a thinning-out process with a reduction rate corresponding to a maximum projection angle θ, uniformly performing a thinning-out process with a reduction rate corresponding to almost ½ of the maximum projection angle θ, or the like may be performed. In a case where the low pass filter process and the thinning-out process are to be performed more precisely, by dividing image data into several areas in the direction of the lines and uniformly performing the process for each divided area, a more improved characteristic can be acquired.

In addition, in each embodiment, while the image processing using this Equation (9) is performed when the image processing/controlling unit 90 stores image data in the image memory 101, the present invention is not limited thereto. For example, the image processing using Equation (9) may be configured to be performed for the image data read from the image memory 101.

Furthermore, in an environment in which the projector device 1 is actually used, there is a limit on the height of the projection face 204, and it is considered that there are many cases where the face 203 is formed at a position 200 of a certain height to be repeatedly turned by 90°. This face 203 can be used as the projection face of the projector device 1. In such a case, an image projected onto the projection face 203 is reduced with a characteristic opposite to that of the image projected onto the projection face 204 described above as the projection angle θ further increases, and the projection position passes through the position 200 and faces toward a right above side (projection angle θ=90°).

For this reason, in a case where an image according to the image data is projected at projection angles 0° and 90°, the reduction process using Equation (9) is not performed for the image data to be projected. In addition, in a case where the length (height) of the projection face 204 and the length of the projection face 203 are almost the same, the reduction process using Equation (9) for the image data to be projected is performed as a symmetrical process of a reduction process from the projection angle 0° to the position 200 of the uppermost portion of the projection face W and a reduction process from the position 200 to the projection angle 90°. Accordingly, a load for the reduction process performed by the image processing/controlling unit 90 can be decreased.

In the example described above, the description has been presented with a perpendicular face forming an angle of 90° with respect to the projection angle θ=0° being assumed. Depending on the rotation angle of the drum unit 10, a case may be considered in which projection is performed for a flat face forming an angle of 180° with respect to the projection angle θ=0°. In a case where image data of the same lines is cut out from the image data 140 and is projected onto the face, a projected image is reduced in the vertical direction as the projection angle θ increases. Thus, for the image data read from the image memory 101, image processing that is opposite to that described above is performed.

In other words, as the projection angle θ is increased from the angle $\theta_0$ to the angle $\theta_1$, and the angle $\theta_2$, a distance from the projection unit to the projection face is changed to decrease. Thus, opposite to the description presented above, the projector device 1 performs an enlargement process for the image data of an image to be projected according to the projection angle θ of the projection lens 12.

As above, in a case where the distance from the projection lens 12 to the projection face decreases as the projection direction is changed from the first projection direction to the second projection direction, the image cutting-out unit of the projector device 1 may perform an enlargement process based on the projection angle θ for each pixel of the cut-out image data.

First Embodiment

Figure 19:
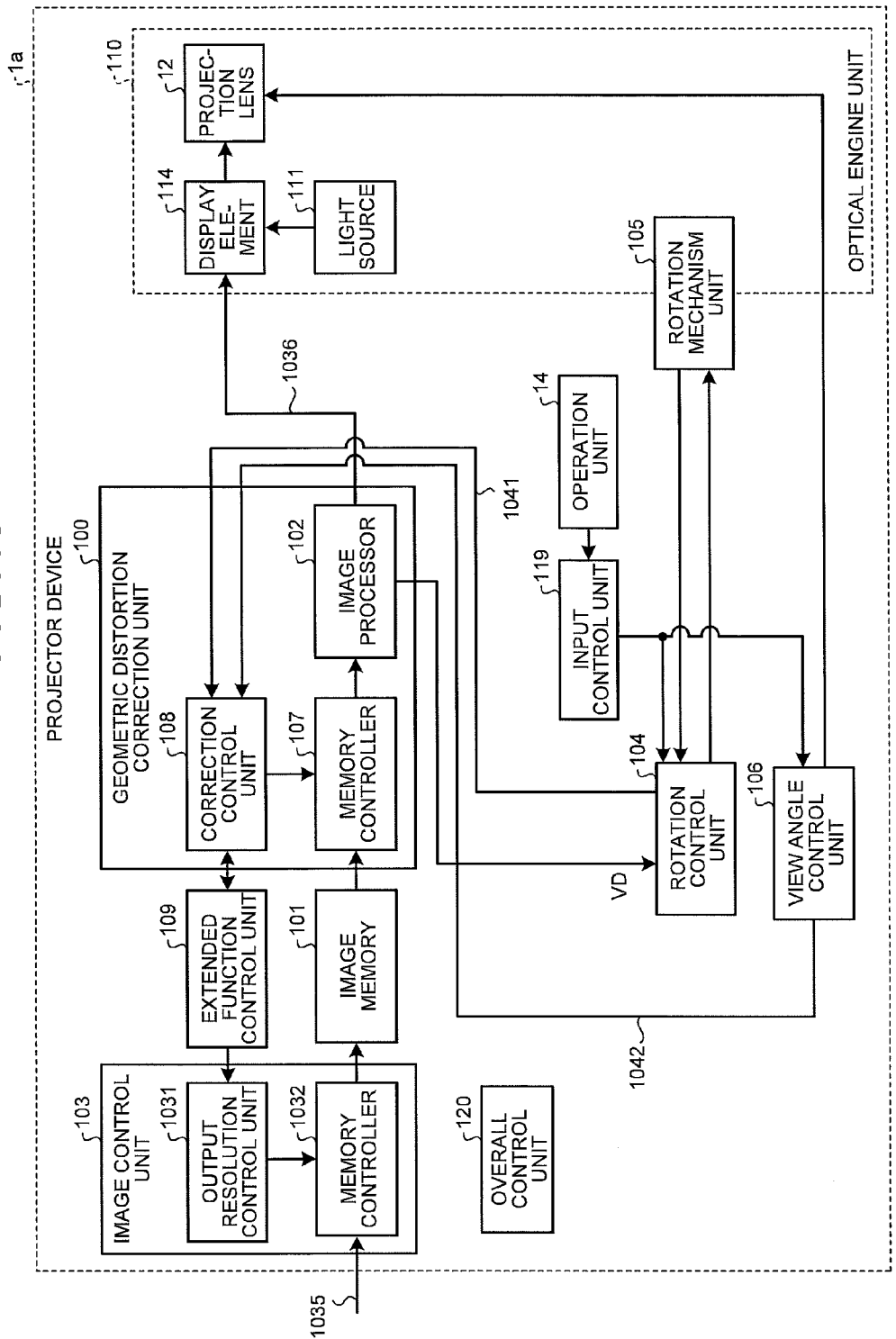
FIG. 19 is a block diagram that illustrates the functional configuration of a projector device according to a first embodiment.

Next, a first embodiment will be described. FIG. 19 is a block diagram that illustrates an example of the functional configuration of a projector device 1a according to the first embodiment. In FIG. 19, the same reference numeral is assigned to each portion common to that illustrated in FIG. 4 described above, and detailed description thereof will not be presented.

The external appearance and the structure of the projector device 1a according to the first embodiment are similar to those of the projector device 1 described with reference to FIGS. 1A, 1B, 2A, and 2B.

In the case illustrated in FIG. 19, the image processing/controlling unit 90 illustrated in FIG. 4 includes: a geometric distortion correction unit 100; an image memory 101; an image control unit 103; and an extended function control unit 109. In addition, an input control unit 119 receives a user's operation input from an operation unit 14 as an event.

The input control unit 119, for example, forms a part of the function of the overall control unit 120.

The image control unit 103 receives image data as an input and stores the image data with designated output resolution in the image memory 101. The image control unit 103, as illustrated in FIG. 19, includes an output resolution control unit 1031 and a memory controller 1032.

The output resolution control unit 1031 receives resolution from the geometric distortion correction unit 100 through the extended function control unit 109 and outputs the received resolution to the memory controller 1032 as output resolution.

The memory controller 1032 receives image data 1035 of 1920 pixels×1080 pixels of a still image or a moving image as an input and stores the input image data 1035 of 1920 pixels×1080 pixels in the image memory 101 with the output resolution input from the output resolution control unit 1031.

In addition, an image shaping unit, which shapes the input image data 1035 input with an arbitrary size into image data of the size of 1920 pixels×1080 pixels, may be disposed on the former stage of the memory controller 1032.

The geometric distortion correction unit 100 calculates a first correction coefficient relating to a trapezoidal distortion correction of the horizontal direction (first direction) of a geometric distortion and a second correction coefficient relating to a geometric distortion correction according to slow extension in the vertical direction (second direction), acquires a cut-out range, cuts out an image of an area of the cut-out range from image data stored in the image memory 101, performs a geometric distortion correction and image processing therefor, and outputs the processed image to the display element 114. In description presented below, in a case where the first correction coefficient and the second correction coefficient are not discriminated from each other or do not need to be discriminated from each other, the first correction coefficient and the second correction coefficient will be simply referred to as correction coefficients.

The geometric distortion correction unit 100, as illustrated in FIG. 19, includes: a correction control unit 108; a memory controller 107; and an image processor 102. In addition, a zoom instruction and a view angle 1042 derived based on a zoom magnification relating to the zoom instruction are supplied from the view angle control unit 106 to the geometric distortion correction unit 100.

The correction control unit 108 receives a projection angle 1041 from the rotation control unit 104 as an input and receives a view angle 1042 from the view angle control unit 106 as an input. Then, the correction control unit 108, based on the projection angle 1041 and the view angle 1042 that have been input, calculates the first correction coefficient and the second correction coefficient used for eliminating a geometric distortion occurring in a projected image according to the projection direction, and outputs the first correction coefficient and the second correction coefficient to the memory controller 107.

In addition, the correction control unit 108, based on the projection angle 1041, the view angle 1042, the first correction coefficient, and the second correction coefficient, determines a cut-out range of the image data 1035 such that the size of image data after the geometric distortion correction includes a displayable size of the display element 114 and outputs the determined cut-out range to the memory controller 107 and the extended function control unit 109. At this time, the correction control unit 108 designates a cut-out area of the image data based on the angle of the projection direction of the projection lens 12.

The memory controller 107 cuts out (extracts) an image area of the cut-out range determined by the correction control unit 108 from all the area of a frame image relating to image data stored in the image memory 101 and outputs the image area as image data.

In addition, the memory controller 107 performs a geometric distortion correction for the image data cut out from the image memory 101 by using the first correction coefficient and the second correction coefficient and outputs image data after the geometric distortion correction to the image processor 102. Here, the first correction coefficient, the second correction coefficient, and the geometric distortion correction will be described later in detail.

The image data output from the memory controller 107 is supplied to the image processor 102. The image processor 102, for example, by using a memory not illustrated in the figure, performs image processing for the supplied image data and outputs the processed image data to the display element 114 as image data 1036 of 1280 pixels×720 pixels. For example, the image processor 102 performs a size converting process for the image data supplied from the memory controller 107 such that the size coincides with the size of the display element 114.

In addition to that, the image processor 102 may perform various kinds of image processing such as the size conversion process executed through a general linear transformation process, which is described in the image processing/controlling unit 90 illustrated in FIG. 4, an interpolation process, a thinning out process, an edge enhancement process, a low pass filter process, and a halftone mixing process.

The image data 1036 output from the image processor 102 is supplied to the display element 114. Actually, this image data is supplied to the drive circuit that drives the display element 114. The drive circuit drives the display element 114 based on the supplied image data.

The extended function control unit 109 receives a cut-out range from the correction control unit 108 as an input and outputs resolution including the cut-out range to the output resolution control unit 1031 as output resolution.

However, as already described with reference to FIG. 16B, in the conventional trapezoidal correction (keystone correction) process, in order not to perform display for the peripheral area 1602 of the corrected projection image 1601, in other words, the area 1602 of a difference between the area 1603 of a projected image of a case where any correction is not performed and the area of a projection image 1601 after a correction, image data corresponding to black is controlled to be input to the display device, or the display device is controlled not to be driven. Accordingly, the pixel area of the display device is not effectively used, and a decrease in the brightness of the actual projection area is caused.

Recently, in accordance with wide use of high-resolution digital cameras and the like, the resolution of video content is improved, and there are cases where the resolution of the video content is higher than the resolution of the display device. For example, in a projector device supporting up to the full HD of 1920 pixels×1080 pixels as an input image for a display device having resolution of 1280 pixels×720 pixels, the input image is scaled in a former stage of the display device, and accordingly, the resolution is matched for enabling the whole input image to be displayed on the display device.

Figure 20A:
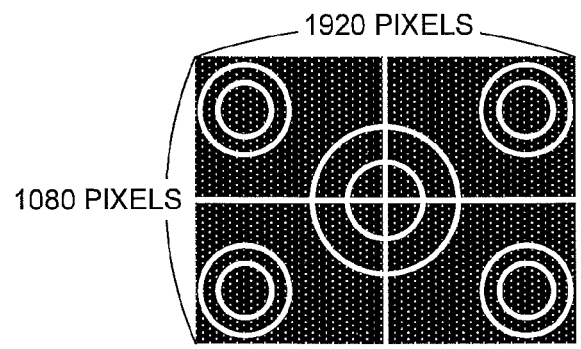
FIG. 20A is a diagram that illustrates cutting out an image of a partial area of input image data.
Figure 20B:
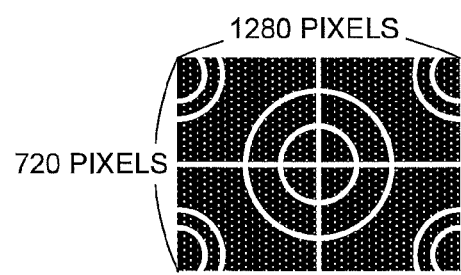
FIG. 20B is a diagram that illustrates the cutting out the image of the partial area of the input image data.
Figure 21A:
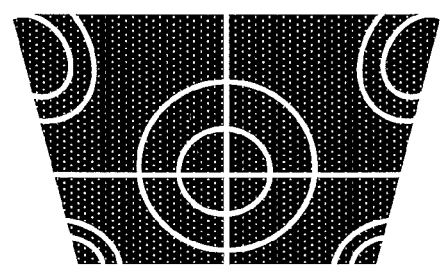
FIG. 21A is a diagram that illustrates the cutting out the image of the partial area of the input image data.
Figure 21B:
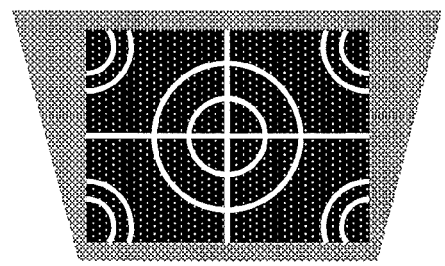
FIG. 21B is a diagram that illustrates the cutting out the image of the partial area of the input image data.

On the other hand, instead of performing such a scaling process, as illustrated in FIGS. 20A and 20B, an image of a partial area of input image data may be cut out and displayed on the display device. For example, from input image data having 1920 pixels×1080 pixels illustrated in FIG. 20A, as illustrated in FIG. 20B, an image of an area of 1280 pixels×720 pixels corresponding to the resolution of an output device is cut out and is displayed on the display device. Even in such a case, when the projection lens is inclined, as illustrated in FIG. 21A, a trapezoidal distortion occurs in the projection image. Thus, when the trapezoidal distortion correction (keystone correction) is performed, as illustrated in FIG. 21B, in order not to perform display of a differential area between the area of the projection image of a case where any correction is not performed and the area of the projection image after the correction, image data corresponding to black is input to the display device, or the display device is controlled so as not to be driven. Accordingly, a state is formed in which the pixel area of the display device is not effectively used. However, in such a case, as illustrated in FIGS. 20A and 20B, the projection image that is output is a part of the input image data.

Figure 22:
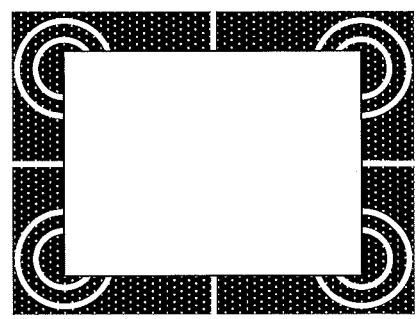
FIG. 22 is a diagram that illustrates an image of an unused area remaining after the cutting from the input image data according to the first embodiment.

For this reason, according to the projector device 1a according to this first embodiment, as illustrated in FIG. 22, an image of the unused area remaining after being originally cut out from the input image data is used for the peripheral area 1602 of the image data after the correction described above, and, for example, as illustrated in FIG. 23, all the input image data is cut out, and the projection image is displayed such that the center of the projection image in the vertical direction coincides with that of the projection image for which the geometric distortion correction has not been performed, and the amount of information lacking in the peripheral area 1602 is supplemented. In this way, according to this first embodiment, by effectively utilizing the image of the unused area, the effective use of the displayable area is realized. By comparing FIG. 23 with FIG. 21B, it can be understood that the area of the peripheral area is decreased in FIG. 23, and more information can be represented (effectively used). Hereinafter, details of such a geometric distortion correction, first, the calculation of correction coefficients used for performing the geometric distortion correction and next, a method of supplementing the amount of information will be described.

The correction control unit 108 of the geometric distortion correction unit 100, as described above, calculates a first correction coefficient and a second correction coefficient based on the projection angle 1041 and the view angle 1042. Here, the first correction coefficient is a correction coefficient for performing a correction of the image data in the horizontal direction, and the second correction coefficient is a correction coefficient for performing a correction of the image data in the vertical direction. The correction control unit 108 may be configured to calculate the second correction coefficient for each line configuring the image data (cut-out image data) of the cut-out range.

In addition, the correction control unit 108, for each line from the upper side to the lower side of the image data of the cut-out range, calculates a linear reduction rate for each line based on the first correction coefficient.

Figure 24:
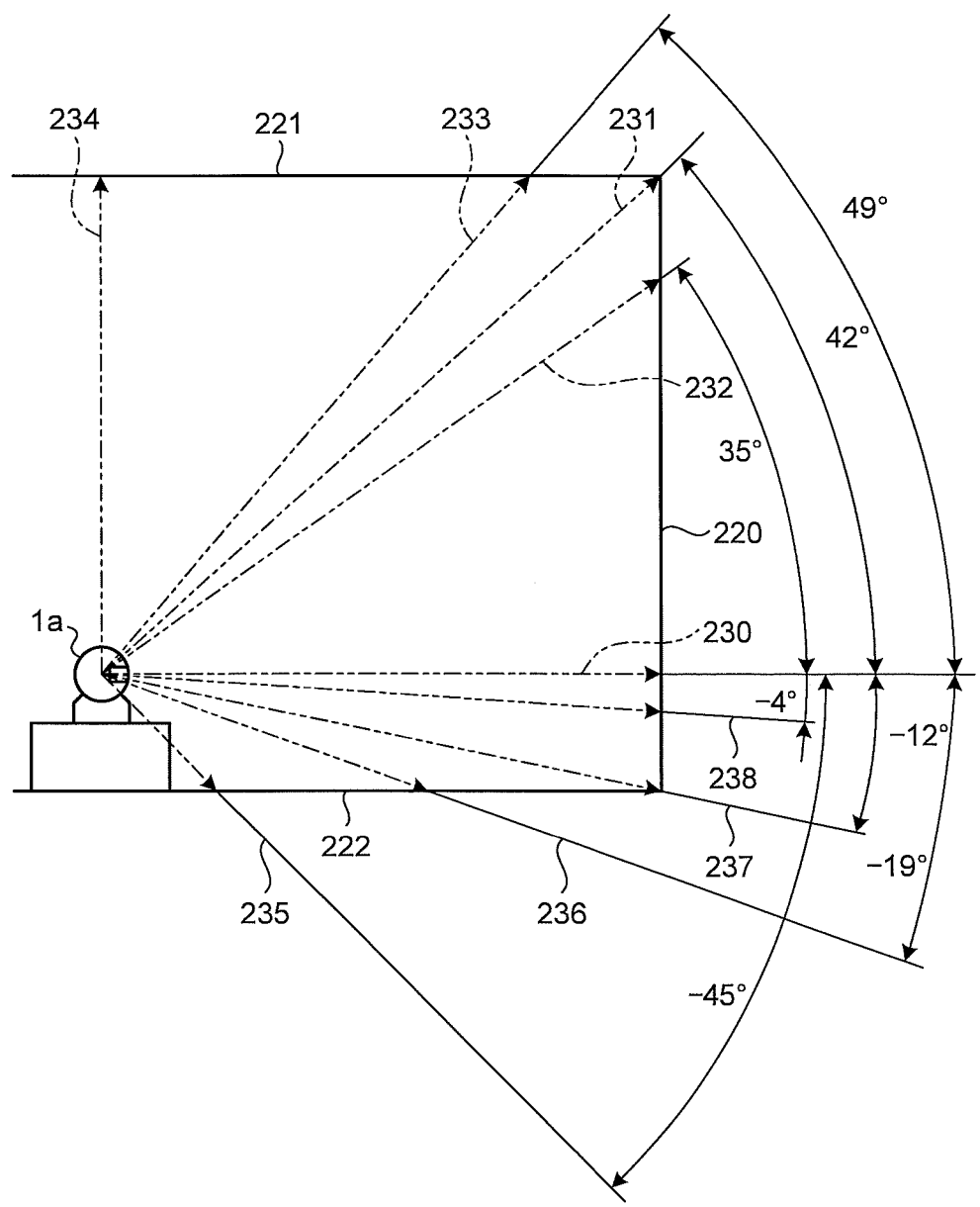
FIG. 24 is a diagram that illustrates major projection directions and projection angles of the projection face according to the first embodiment.

The relation between the projection angle 1041 and the correction coefficient and the correction coefficient and a correction amount for a trapezoidal distortion calculated based on the projection angle 1041 will be described in detail. FIG. 24 is a diagram that illustrates major projection directions and projection angles θ of the projection face according to the first embodiment.

Here, the projection angle θ is an inclination angle of the optical axis of projection light emitted from the projection lens 12 with respect to the horizontal direction. Hereinafter, an inclination angle of a case where the optical axis of the projection light is in the horizontal direction is set as 0°, a case where the drum unit 10 including the projection lens 12 is rotated to the upper side, in other words, the elevation angle side will be defined as positive, and a case where the drum unit 10 is rotated to the lower side, in other words, the depression angle side will be defined as negative. In such a case, a housed state in which the optical axis of the projection lens 12 faces a floor face 222 disposed right below corresponds to a projection angle of −90°, and a horizontal state in which the projection direction faces the front side of a wall face 220 corresponds to a projection angle of 0°, and a state in which the projection direction faces a ceiling 221 disposed right above corresponds to a projection angle of +90°.

A projection direction 231 is a direction of a boundary between the wall face 220 and the ceiling 221 that are two projection faces adjacent to each other. A projection direction 232 is, the projection direction of the projection lens 12 in a case where an upper face, which corresponds to a first side, of one pair of sides disposed in a direction perpendicular to the vertical direction that is the moving direction of a projection image approximately coincides with the boundary in the projection image on the wall face 220.

A projection direction 233 is the projection direction of the projection lens 12 in a case where a lower side, which corresponds to a second side, of the above-described one pair of sides of the projection image of the ceiling 221 approximately coincides with the boundary. A projection direction 234 is the direction of the ceiling 221 right above the projector device 1a and corresponds to a state in which the optical axis of the projection lens 12 and the ceiling 221 cross each other at right angles. The projection angle at this time is 90°.

In the example illustrated in FIG. 24, the projection angle θ in the case of the projection direction 230 is 0°, the projection angle in the case of the projection direction 232 is 35°, the projection angle θ in the case of the projection direction 231 is 42°, and the projection angle θ in the case of the projection direction 233 is 49°.

A projection direction 235 is a direction in which projection is started by the projector device 1a that is acquired by rotating the projection lens from a state in which the projection lens is positioned toward the right below side (−90°), and the projection angle θ at this time is −45°. A projection direction 236 is the projection direction of the projection lens in a case where an upper face, which corresponds to a first side, of one pair of sides disposed in a direction perpendicular to the moving direction of a projection image approximately coincides with a boundary between the floor face 222 and the wall face 220 in the projection image on the floor face 222. The projection angle θ at this time will be referred to as a second boundary start angle, and the second boundary start angle is −19°.

A projection direction 237 is a direction of a boundary between the floor face 222 and the wall face 220 that are two projection faces adjacent to each other. The projection angle θ at this time will be referred to as a second boundary angle, and the second boundary angle is −12°.

A projection direction 238 is the projection direction of the projection lens in a case where a lower face, which corresponds to a second face, of the above-described one pair of sides of the projection image on the wall face 220 approximately coincides with a boundary between the floor face 222 and the wall face 220. The projection angle θ at this time will be referred to as a second boundary end angle, and the second boundary end angle is −4°.

Figure 25:
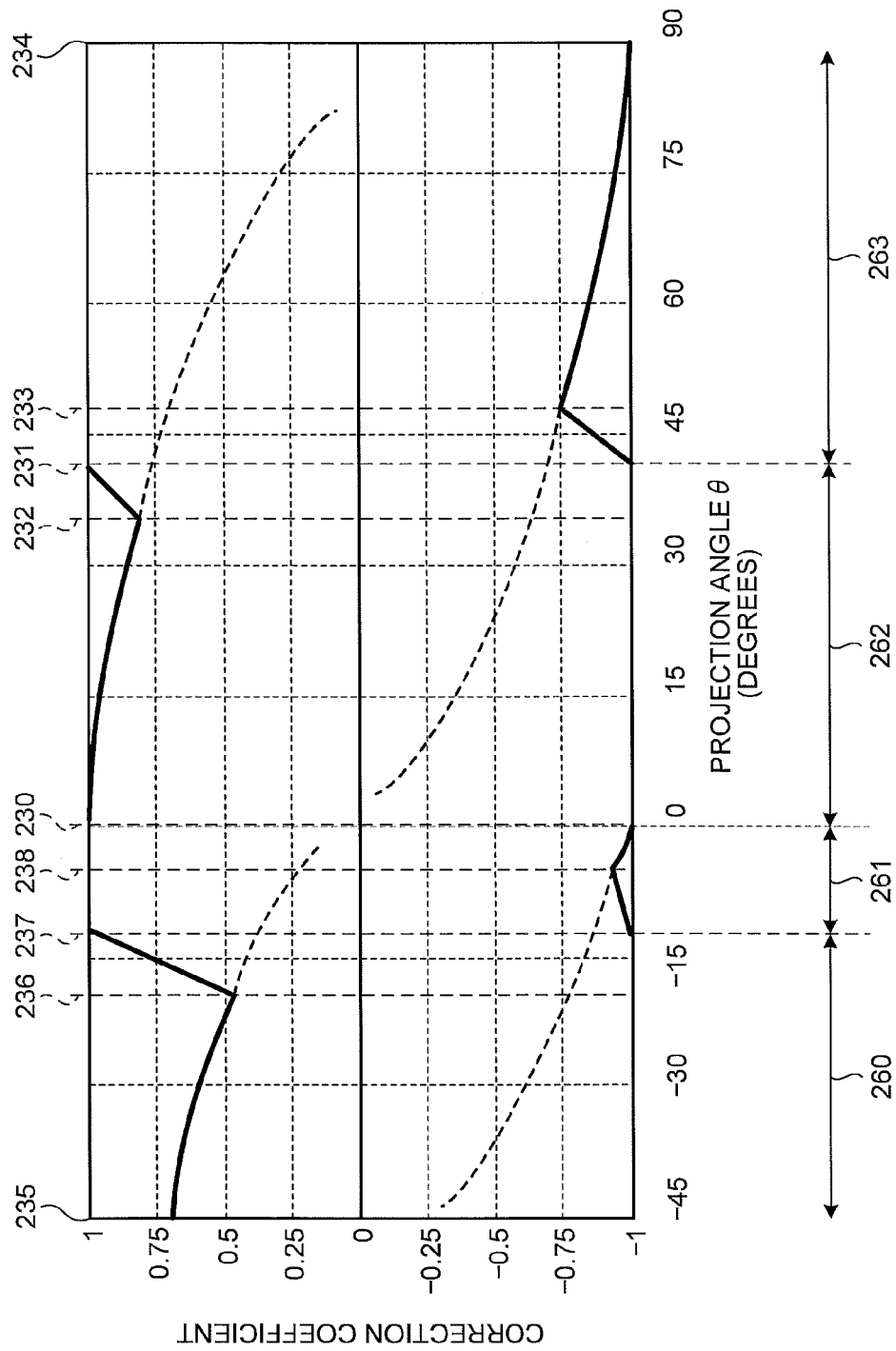
FIG. 25 is a graph that illustrates relation between a projection angle and a correction coefficient according to the first embodiment.

Hereinafter, an example of the geometric distortion correction (the trapezoidal distortion correction will be used as an example) will be described. FIG. 25 is a graph that illustrates a relation between the projection angle and the first correction coefficient according to the first embodiment. In FIG. 25, the horizontal axis represents the projection angle θ, and the vertical axis represents the first correction coefficient.

The first correction coefficient takes a positive value or a negative value. In a case where the first correction coefficient is positive, it represents a correction direction for compressing the length of the upper side of the trapezoid of the image data. On the other hand, in a case where the first correction coefficient is negative, it represents a correction direction for compressing the length of the lower side of the trapezoid of the image data. In addition, as described above, in a case where the first correction coefficient is "1" or "−1", the correction amount for the trapezoidal distortion is zero, whereby the trapezoidal distortion correction is completely cancelled.

In FIG. 25, the projection directions 235, 236, 237, 238, 230, 232, 231, 233, and 234 illustrated in FIG. 24 are illustrated in association with projection angles thereof. As illustrated in FIG. 25, in a range 260 from a projection angle of −45° for the projection direction 235 to a projection angle of −12° for the projection direction 237, the projection lens projects the floor face 222.

In addition, as illustrated in FIG. 25, in a range 261 from a projection angle of −12° for the projection direction 237 to a projection angle of 0° for the projection direction 230, the projection lens projects the wall face 220 downward. Furthermore, as illustrated in FIG. 25, in a range 262 from a projection angle of 0° for the projection direction 230 to a projection angle of 42° for the projection direction 231, the projection lens projects the wall face 220 upward.

In addition, as illustrated in FIG. 25, in a range 263 from a projection angle of 42° for the projection direction 231 to a projection angle of 90° for the projection direction 234, the projection lens projects the ceiling 221.

The correction control unit 108 calculates a trapezoidal distortion correction amount based on a first correction coefficient according to each projection angle θ denoted by a solid line in FIG. 25 and performs a trapezoidal distortion correction for the image data based on the calculated correction amount. In other words, the correction control unit 108 calculates a first correction coefficient corresponding to the projection angle output from the rotation control unit 104. In addition, the correction control unit 108, based on the projection angle, determines whether the projection direction of the projection lens 12 is the projection direction that is an upward projection direction with respect to the wall face, the projection direction toward the face of the ceiling, the projection direction that is a downward direction with respect to the wall face, or the projection direction toward the floor face and derives a correction direction of the trapezoidal distortion correction for the image data in accordance with the projection direction.

The correction control unit 108 calculates a trapezoidal distortion correction amount based on a correction coefficient according to each projection angle θ denoted by a solid line in FIG. 25 and performs a trapezoidal distortion correction for the image data based on the calculated correction amount. In other words, the correction control unit 108 calculates a first correction coefficient corresponding to the projection angle 1041 output from the rotation control unit 104. In addition, the correction control unit 108, based on the projection angle θ, determines whether the projection direction of the projection lens 12 is the projection direction that is an upward projection direction with respect to the wall face 220, the projection direction toward the face of the ceiling 221, the projection direction that is a downward direction for the wall face 220, or the projection direction toward the floor face 222 and derives a correction direction of the trapezoidal distortion correction for the image data in accordance with the projection direction.

Here, as illustrated in FIG. 25, between a projection angle of −45° at the time of the projection direction 235 and the second boundary start angle (−19°) that is the projection angle θ at the time of the projection direction 236 and between a projection angle of 0° at the time of the projection direction 230 and the first boundary start angle (35°) that is the projection angle at the time of the projection direction 232, the correction coefficient is positive and gradually decreases, and the correction amount for the trapezoidal distortion gradually increases. Here, the previous correction coefficient or the previous correction amount is used for maintaining the shape of the projection image projected onto the projection face to be a rectangle.

On the other hand, as illustrated in FIG. 25, between the second boundary start angle (−19°) that is the projection angle θ at the time of the projection direction 236 and the second boundary angle (−12°) that is the projection angle θ at the time of the projection direction 237 and between the first boundary start angle (35°) that is the projection angle θ of the projection direction 232 and the first boundary angle (42°) that is the projection angle θ at the time of the projection direction 231, the correction coefficient is positive and gradually increases so as to decrease a difference from "1" and is in a direction (a direction for cancelling the trapezoidal distortion correction) for weakening the degree of the trapezoidal distortion correction. In the projector device 1a according to this first embodiment, as described above, the correction coefficient is positive and gradually increases, and the correction amount for the trapezoidal distortion gradually decreases. Here, this increase may not be a gradual linear increase but may be an exponential increase or a geometric increase as long as the increase is a continuous gradual increase.

In addition, as illustrated in FIG. 25, between the second boundary angle (−12°) that is the projection angle θ at the time of the projection direction 237 and the second boundary end angle (−4°) that is the projection angle θ at the time of the projection direction 238 and between the first boundary angle (42°) that is the projection angle θ of the projection direction 231 and the first boundary end angle (49°) that is the projection angle θ at the time of the projection direction 233, the correction coefficient is negative and gradually increases, and the correction amount for the trapezoidal distortion gradually increases. In the projector device 1a according to this first embodiment, as described above, the correction coefficient is negative and gradually increases, and the correction amount for the trapezoidal distortion gradually increases. Here, this increase may not be a gradual linear increase but may be an exponential increase or a geometric increase as long as the increase is a continuous gradual increase.

Here, as illustrated in FIG. 25, between the second boundary end angle (−4°) that is the projection angle θ at the time of the projection direction 238 and a projection angle of 0° at the time of the projection direction 230 and between the first boundary end angle (49°) that is the projection angle θ at the time of the projection direction 233 and a projection angle of 90° at the time of the projection direction 234, the correction coefficient is negative and gradually decreases, and the correction amount for the trapezoidal distortion gradually decreases. Here, the previous correction coefficient or the previous correction amount is used for maintaining the shape of the projection image projected onto the projection face to be a rectangle.

Here, a technique for calculating the correction coefficient will be described. In description presented below, a case will be described as an example in which the projector device 1*a* shifts the projection direction from a state directly opposing the projection face of a projection medium to the vertically upward direction. In addition, a correction coefficient of a case where the projector device 1*a* shifts the projection direction from the state of directly opposing the projection face of a projection medium in the horizontal direction can be similarly calculated.

Figure 26:
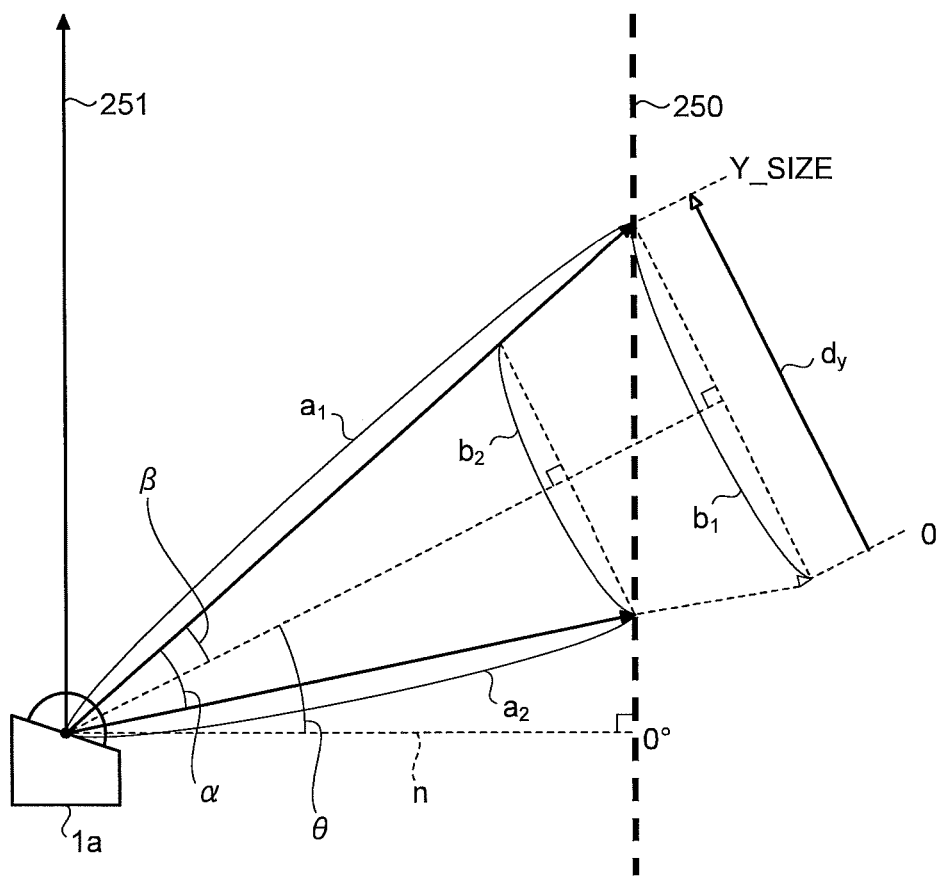
FIG. 26 is a diagram that illustrates the calculation of the correction coefficient according to the first embodiment.

FIG. 26 is a diagram that illustrates the calculation of the first correction coefficient. In FIG. 26, a projection distance until light emitted from the upper end (or the right end) of the display element 114 of the projector device 1*a* arrives at the projection face 250 is denoted by $a_1$, and a projection distance until light emitted from the lower end (or the right end) of the display element 114 arrives at the projection face 250 is denoted by $a_2$. In the case illustrated in FIG. 26, the projection distance $a_1$ is a longest distance, and the projection distance $a_2$ is a shortest distance. In addition, in the case illustrated in FIG. 26, a ½ angle of the view angle α is an angle β. Furthermore, the length of the base of an isosceles triangle that has the view angle α as its apex angle and has a hypotenuse of a length $a_1$ is denoted by $b_1$, and the length of the base of an isosceles triangle that has the same apex angle of 2β and has the hypotenuse having a length $a_2$ is denoted by $b_2$. Furthermore, the vertical coordinate $d_y$ (or the horizontal coordinate $d_x$) of the lower end (or the right end) of the display element 114 is denoted as zero, and the vertical coordinate (or the horizontal coordinate) of the upper end (or the left end) is denoted by Y_SIZE (or X_SIZE). In addition, an arrow 251 represents the vertical direction.

The first correction coefficient is the reciprocal (or the reciprocal of a ratio between the left side and the right side) of a ratio between the upper side and the lower side of the projection image that is projected to a projection medium so as to be displayed thereon and is the same as $b_2/b_1$ illustrated in FIG. 26. Accordingly, in the trapezoidal distortion correction, the upper side or the lower side (or the left side or the right side) of the image data is reduced by $b_2/b_1$ times.

Here, as illustrated in FIG. 26, $b_2/b_1$ is represented in the following Equation (10) by using the projection distances $a_1$ and $a_2$.

$$\frac{b_2}{b_1} = \frac{a_2}{a_1} \tag{10}$$

In the case illustrated in FIG. 26, when θ represents the projection angle, and n represents a shortest distance from the projector device 1*a* to the projection face 250, the following Equation (11) is satisfied. Here, 0° 0<90°. A straight line representing the shortest projection distance n from the projector device 1*a* to the projection face 250 is a perpendicular line with respect to the projection face 250.

$$n = a_1 \cos(\theta+\beta) = a_2 \cos(\theta-\beta) \tag{11}$$

By transforming Equation (11), the first correction coefficient can be acquired in the following Equation (12).

$$\frac{a_2}{a_1} = \frac{\cos(\theta+\beta)}{\cos(\theta-\beta)} = k(\theta, \beta) \tag{12}$$

As above, the first correction coefficient is determined based on the angle β that is ½ of the view angle α and the projection angle θ. Based on this Equation (12), in a case where the projection angle θ is 0°, in other words, in a case where the projection image is projected in a direction perpendicular to the projection face 250, the first correction coefficient is "1", and the trapezoidal distortion correction amount is zero.

In addition, based on Equation (12), the first correction coefficient decreases as the projection angle θ increases. The trapezoidal distortion correction amount increases according to the value of the first correction coefficient, and accordingly, the trapezoidal distortion of the projection image that becomes remarkable according to an increase in the projection angle θ can be appropriately corrected.

Furthermore, in a case where the projection image is projected to the ceiling, the correction direction of the trapezoidal distortion correction changes, and accordingly, the correction coefficient is $a_1/a_2$. In addition, as described above, the sign of the first correction coefficient is negative.

In this embodiment, the correction control unit 108 calculates the first correction coefficient based on Equation (12) when the projection angle θ is between the projection angle of −45° at the time of the projection direction 235 and the second boundary start angle (−19°) that is the projection angle at the time of the projection direction 236, between the projection angle of 0° at the time of the projection direction 230 and the first boundary start angle (35°) that is the projection angle at the time of the projection direction 232, between the second boundary end angle (−4°) that is the projection angle at the time of the projection direction 238 and the projection angle of 0° at the time of the projection direction 230, or between the first boundary end angle (49°) that is the projection angle of the projection direction 233 and the projection angle of 90° at the time of the projection direction 234, described above.

On the other hand, the correction control unit 108 calculates the first correction coefficient in a direction for lowering the degree of the correction without using Equation (12) when the projection angle is between the second boundary start angle (−19°) that is the projection angle at the time of the projection direction 236 and the second boundary angle (−12°) that is the projection angle at the time of the projection direction 237 or between the first boundary start angle (35°) that is the projection angle at the time of the projection direction 232 and the first boundary angle (42°) that is the projection angle at the time of the projection direction 231.

In addition, the correction control unit 108 calculates the first correction coefficient in a direction for raising the degree of the correction without using Equation (12) when the projection angle θ is between the second boundary angle (−12°) that is the projection angle at the time of the projection direction 237 and the second boundary end angle (−4°) that is the projection angle at the time of the projection direction 238 or between the first boundary angle (42°) that is the projection angle at the time of the projection direction 231 and the first boundary end angle (49°) that is the projection angle at the time of the projection direction 233.

The calculation of the first correction coefficient is not limited to that described above, and the correction control unit 108 may be configured to calculate the first correction coefficient using Equation (12) for all the projection angles θ.

In addition, the correction control unit 108, as represented in the following Equation (13), multiplies the length $H_{act}$ of the line of the upper side of the image data by a first correction coefficient $k(θ, β)$ represented in Equation (12), thereby calculating the length $H_{act}(θ)$ of the line of the upper side after the correction.

$$H_{act}(θ) = k(θ, β) \times H_{act} \quad (13)$$

Figure 27:
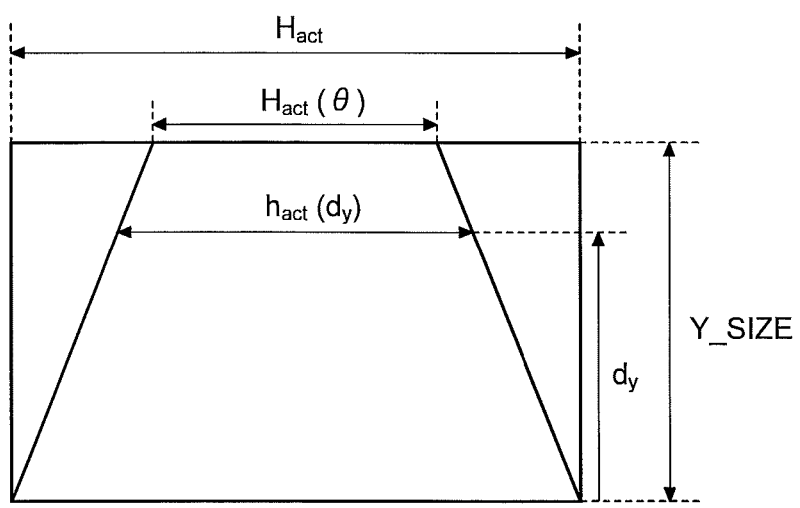
FIG. 27 is a diagram that illustrates the calculation of lengths of lines from the upper side to the lower side according to the first embodiment.

The correction control unit 108, in addition to the length $H_{act}(θ)$ of the upper side of the image data, calculates a reduction rate of the length of each line in a range from the line of the upper side to the line of the lower side. FIG. 27 is a diagram that illustrates the calculation of lengths of lines from the upper side to the lower side.

As illustrated in FIG. 27, the correction control unit 108 calculates the length $h_{act}(d_y)$ of each line from the upper side to the lower side of the image data so as to be linear by using the following Equation (14). Here, Y_SIZE represents the height of the image data, in other words, the number of lines. Thus, Equation (14) is an equation for calculating the length $h_{act}(d_y)$ of the line at a position of $d_y$ from the lower side.

$$h_{act}(d_y) = K_H(d_y) \times H_{act} \quad (14)$$
$$= \left\{ 1 - \left(1 - \frac{\cos(θ + β)}{\cos(θ - β)}\right) \times \frac{d_y}{Y\_SIZE} \right\} \times H_{act}$$

In Equation (14), a part represented inside braces { } represents a reduction rate for each line. Thus, the reduction rate $k_H(d_y)$ is represented as in the following Equation (15). As above, the reduction rate can be acquired based on the projection angle θ and the view angle α (=2β).

$$k_H(d_y) = 1 - \left(1 - \frac{\cos(θ + β)}{\cos(θ - β)}\right) \times \frac{d_y}{Y\_SIZE} \quad (15)$$

Another method of calculating the first correction coefficient will now be described. The first correction coefficient may be calculated from a ratio between the length of the side of the projection image at the projection angle 0° and the length of the side of the projection image at the projection angle θ. In such a case, the length $h_{act}(d_y)$ of each line from the upper side to the lower side of the image data can be represented as in the following Equation (16).

$$h_{act}(d_y) = \cos\left((θ + β) - 2β \times \frac{Y\_SIZE - d_y}{Y\_SIZE}\right) \times H_{act} \quad (16)$$

Figure 28:
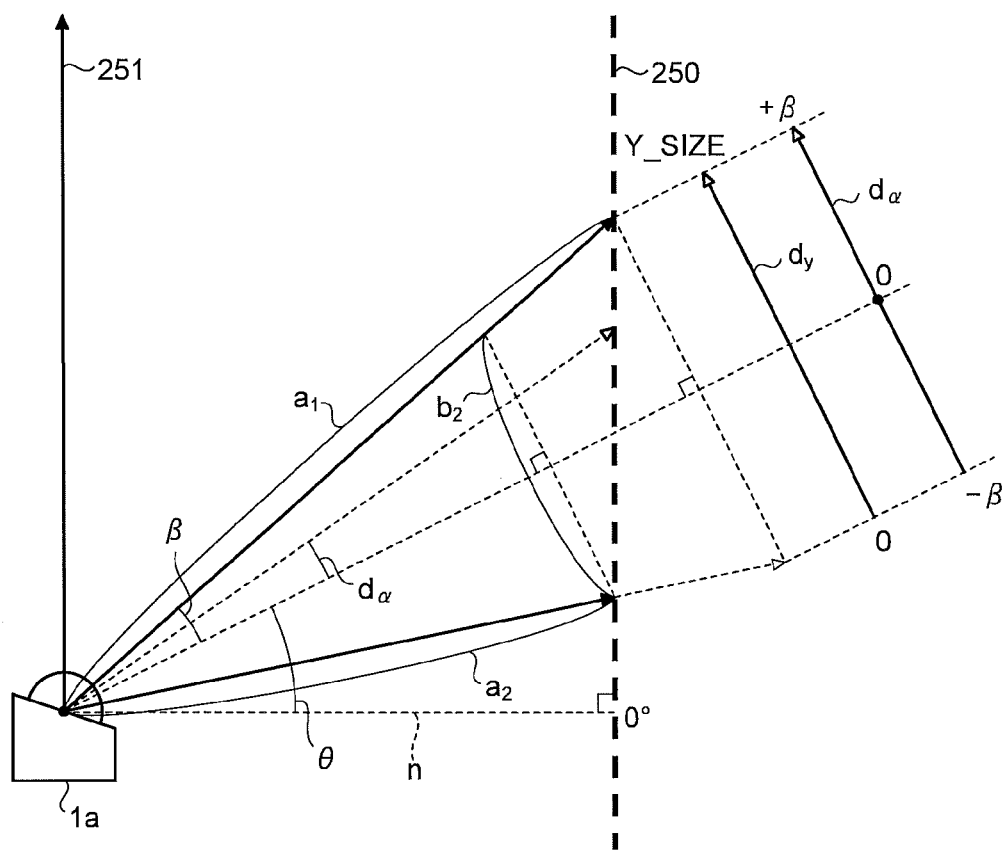
FIG. 28 is a diagram that illustrates the calculation of a second correction coefficient according to the first embodiment.

Next, the calculation of a second correction coefficient will be described. FIG. 28 is a diagram that illustrates the calculation of the second correction coefficient. The method of designating a cut-out area using Equations (3) and (4) described above is based on a cylindrical model in which the projection face, for which projection is performed by the projection lens 12, is assumed to be a cylinder having the rotation shaft 36 of the drum unit 10 as its center. However, actually, the projection face is frequently considered to be a perpendicular face (hereinafter, simply referred to as a "perpendicular face") forming an angle of 90° with respect to the projection angle θ=0°. In a case where image data of the same number of lines is cut out from the image data 140 and is projected to the perpendicular face, as the projection angle θ increases, an image projected to the perpendicular face grows in the vertical direction. Thus, the correction control unit 108 calculates the second correction coefficient as below, and a geometric distortion correction for the image data is performed using the second correction coefficient by the memory controller 107.

A projection space illustrated in FIG. 28 is the same as the projection space illustrated in FIG. 26. In the calculation of the second correction coefficient, first, by using the following Equation (17), the vertical coordinate $d_y$ on the display element 114 is converted into an angle $d_α$ of which the value is zero at the center of the view angle α. In such a case, the angle $d_α$, as represented in the following Equation (17), can take a value from −β to +β.

$$d_α = \frac{2β}{Y\_SIZE} \times d_y - β - 2β \leq d_α \leq β \quad (17)$$

Here, a reduction coefficient $k_V(d_α)$ of the vertical direction for each vertical coordinate $d_y$ can be acquired by using the following Equation (18).

$$k_V(d_α) = \cos(θ) - \sin(θ)\tan(d_α) \quad (18)$$

Thus, the second correction coefficient $k_V(d_y)$ is acquired in the following Equation (19) based on Equations (17) and (18) described above.

$$k_V(d_y) = \cos(θ) - \sin(θ)\tan\left(\frac{2β}{Y\_SIZE} \times d_y - β\right) \quad (19)$$

In this way, the correction control unit 108 calculates the second correction coefficient by using Equation (19) described above in accordance with the projection angle θ of the projection lens 12 and multiples image data read from the memory controller 107 by the second correction coefficient according to the height (vertical coordinate $d_y$) of the line, thereby performing a reduction process for the image data to be projected. Accordingly, a geometric distortion of the projection image formed in the vertical direction is corrected.

In addition, the second correction coefficient may be used for each vertical coordinate by using Equation (19) described above or may be acquired by performing linear interpolation based on the second correction coefficient acquired by using Equation (19) described above for a specific vertical line.

Figure 29:
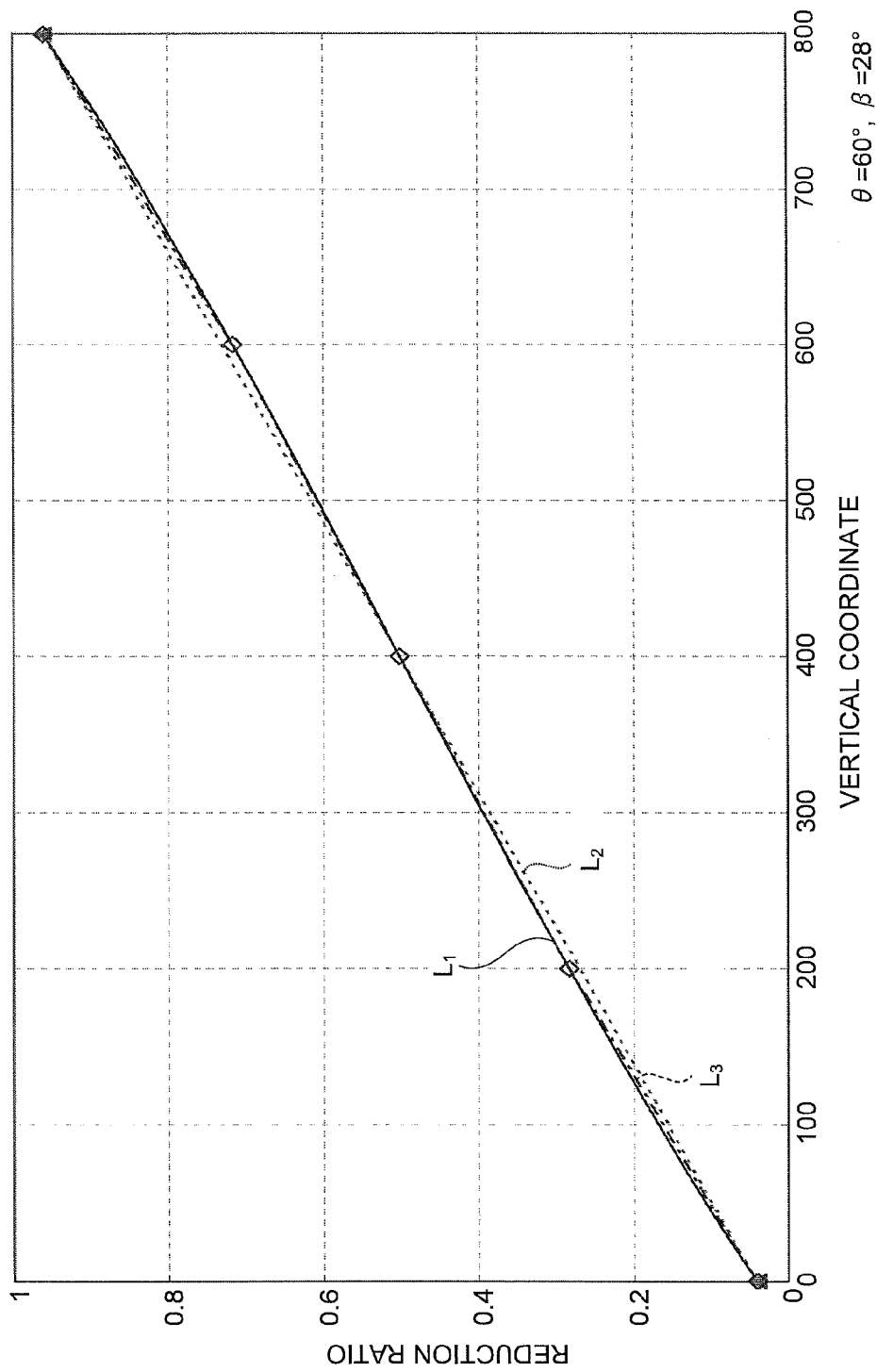
FIG. 29 is a graph that illustrates the relation between the vertical coordinate and the second correction coefficient according to the first embodiment.

FIG. 29 is a graph that illustrates the relation between the vertical coordinate and the second correction coefficient. In addition, FIG. 29 illustrates a case where Y_SIZE=800, the projection angle θ is set to 60°, and the ½ view angle β is set to 28°. In FIG. 29, a characteristic line $L_1$ represents a value (a second correction coefficient: a theoretical value) acquired by using Equation (19), a characteristic line $L_2$ represents a second correction coefficient acquired by performing linear interpolation based on values (second correction coefficients: theoretical values) of two points acquired by using Equation (19) for the upper and lower ends ($d_y$=0 and $d_y$=Y_SIZE) of the image data, and a characteristic line $L_3$ represents a second correction coefficient that is acquired by performing linear interpolation of values (second correction coefficients: theoretical values) acquired by using Equation (19) for the upper and lower ends of the image data and one or more vertical coordinates (in the case illustrated in FIG. 29, three points of $d_y=200$, $d_y=400$, and $d_y=600$) positioned to be equally spaced therebetween. As above, by acquiring the second correction coefficient through the linear interpolation and correcting the geometric distortion of the image for the vertical direction, the processing load for the correction control unit 108 can be decreased.

In addition, the correction control unit 108 acquires a cut-out range of the image data based on the first correction coefficient, the reduction rate, and the second correction coefficient calculated as described above and outputs the cut-out range to the extended function control unit 109 and the memory controller 107.

For example, in a case where the view angle α is 10°, and the projection angle θ is 30°, the projection image is distorted to be in a trapezoidal shape, and the length of the upper side of the trapezoid is about 1.28 times of the length of the lower side. Accordingly, in order to correct the horizontal-direction distortion, the correction control unit 108 calculates the first correction coefficient as 1/1.28, reduces the first line of the upper side of the image data at 1/1.28 times, and sets reduction rates of lines to be linear such that the final line is scaled to the original size. In other words, the number of pixels for the first line of the output of the image data is reduced from 1280 pixels to 1000 pixels (1280/1.28=1000), whereby the trapezoidal distortion is corrected.

Figure 23:
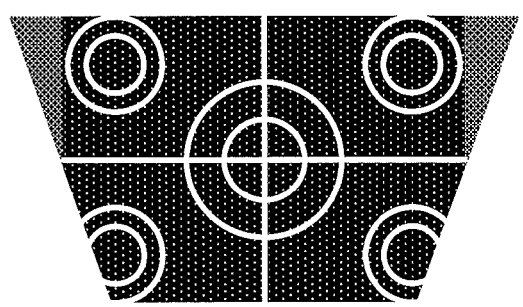
FIG. 23 is a diagram that illustrates a projection image of a case where a geometric distortion correction according to the first embodiment is performed.

However, in this state, as described above, for the first line, image data of 280 pixels (1280−1000=280) is not projected, and the number of effective projection pixels decreases. Thus, in order to supplement the amount of information as illustrated in FIG. 23, the memory controller 107, for the first line, reads a signal of 1.28 times of the horizontal resolution of the image data from the image memory 101, and the correction control unit 108 determines a cut-out range of the image data so as to perform this process for each line.

The extended function control unit 109 achieves the role of associating the image control unit 103 with the geometric distortion correction unit 100. In other words, in an area for which all the outputs of the image data is painted in black according to the geometric distortion correction in a conventional case, information of the image data is represented. For this reason, the extended function control unit 109, in accordance with the cut-out range input from the correction control unit 108, sets the output resolution to be higher than the resolution of 1280 pixels×720 pixels at the time of outputting the image data in the output resolution control unit 1031. In the example described above, since the enlargement/reduction rate is one, the extended function control unit 109 sets the output resolution as 1920 pixels× 1080 pixels.

In this way, the memory controller 1032 of the image control unit 103 stores the input image data in the image memory 101 with the resolution of 1920 pixels×1080 pixels. Accordingly, the image data in the cut-out range can be cut out in the state as illustrated in FIG. 23 in which the amount of information is supplemented from the memory controller 107 of the geometric distortion correction unit 100.

In addition, the memory controller 107 performs the geometric distortion correction as below by using the first correction coefficient, the reduction rate, and the second correction coefficient calculated as described above. In other words, the memory controller 107 multiplies the upper side of the image data of the cut-out range by the first correction coefficient and multiplies each line of the upper side to the lower side of the image data of the cut-out range by a reduction rate. In addition, the memory controller 107 generates lines corresponding to a display pixel number from the image data of the lines configuring the image data of the cut-out range based on the second correction coefficient.

Next, an example of the cutting out of image data and the geometric distortion correction performed by the geometric distortion correction unit 100 according to this embodiment will be described with being compared with a conventional case. In FIG. 23 described above, an example has been described in which all the input image data is cut out, and the projection image is displayed such that the center of the projection image in the vertical direction coincides with the projection image for which the geometric distortion correction has not been performed. Hereinafter, with reference to FIGS. 30A to 30D, 31A to 31D, 32A to 32D, and 33A to 33D, an example will be described in which the input image data is cut out in accordance with the number of pixels of the display element 114, and the geometric distortion correction is performed with the cut-out range also including the area of the geometric distortion that may occur in the projection image in accordance with the projection direction being set as the cut-out image data.

Figure 30A:
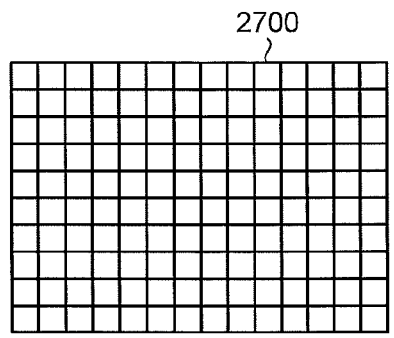
FIG. 30A is a diagram that illustrates an example of cutting out of image data, image data on a display element, and a projection image according to the first embodiment in a case where the projection angle is 0°.
Figure 30B:
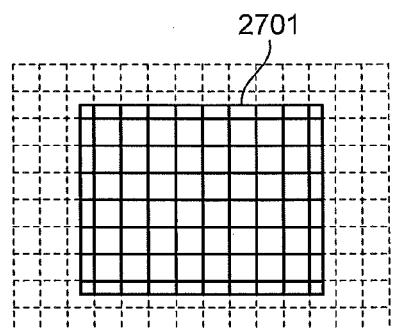
FIG. 30B is a diagram that illustrates an example of the cutting out of the image data, the image data on the display element, and the projection image according to the first embodiment in a case where the projection angle is 0°.
Figure 30C:
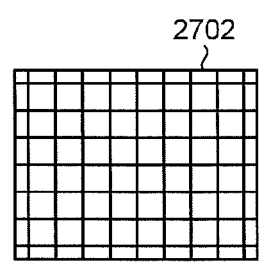
FIG. 30C is a diagram that illustrates an example of the cutting out of the image data, the image data on the display element, and the projection image according to the first embodiment in a case where the projection angle is 0°.
Figure 30D:
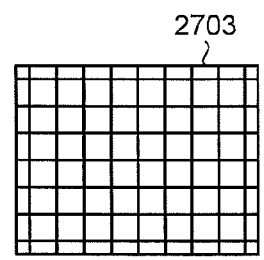
FIG. 30D is a diagram that illustrates an example of the cutting out of the image data, the image data on the display element, and the projection image according to the first embodiment in a case where the projection angle is 0°.

FIGS. 30A to 30D are diagrams that illustrate examples of cutting out of image data, image data on the display element 114, and the projection image in a case where the projection angle is 0°. In a case where the projection angle is 0°, when image data 2700 of 1920 pixels×1080 pixels is input (FIG. 30A), the memory controller 107 cuts outs a range of 1280 pixels×720 pixels that is the resolution of the display element 114 from the image data (image data 2701 illustrated in FIG. 30B). For the convenience of description, a center portion is assumed to be cut out (hereinafter, the same). Then, the memory controller 107 does not perform a geometric distortion correction (image data 2702 illustrated in FIG. 30C) but, as illustrated in FIG. 30D, projects the cut-out image data onto the projection face as a projection image 2703.

FIGS. 31A to 31D are diagrams that illustrate examples of cutting out of image data, image data on the display element 114, and a projection image in a case where the projection angle is greater than 0°, and a geometric distortion correction is not performed.

Figure 31A:
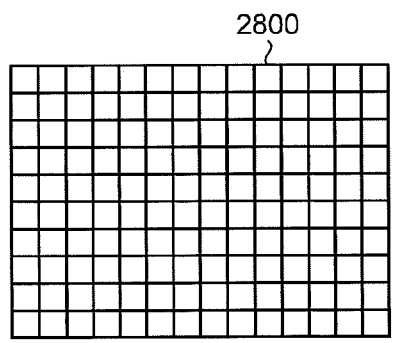
FIG. 31A is a diagram that illustrates an example of cutting out of image data, image data on a display element, and a projection image according to the first embodiment in a case where the projection angle is greater than 0°, and the geometric distortion correction is not performed.
Figure 31B:
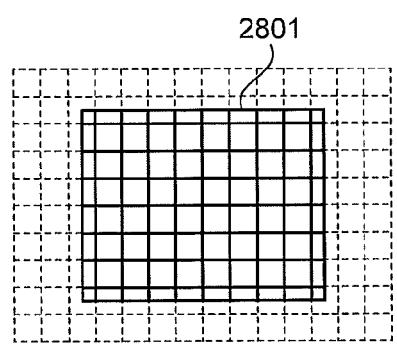
FIG. 31B is a diagram that illustrates an example of the cutting out of the image data, the image data on the display element, and the projection image according to the first embodiment in a case where the projection angle is greater than 0°, and the geometric distortion correction is not performed.
Figure 31C:
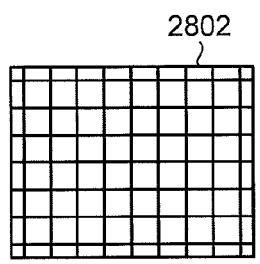
FIG. 31C is a diagram that illustrates an example of the cutting out of the image data, the image data on the display element, and the projection image according to the first embodiment in a case where the projection angle is greater than 0°, and the geometric distortion correction is not performed.
Figure 31D:
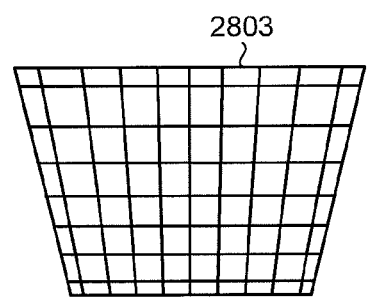
FIG. 31D is a diagram that illustrates an example of the cutting out of the image data, the image data on the display element, and the projection image according to the first embodiment in a case where the projection angle is greater than 0°, and the geometric distortion correction is not performed.

In a case where the projection angle is greater than 0°, when image data 2800 of 1920 pixels×1080 pixels is input (FIG. 31A), a range of 1280 pixels×720 pixels that is the resolution of the display element 114 is cut out from the image data (image data 2801 illustrated in FIG. 31B). Then, since the geometric distortion correction (trapezoidal distortion correction) is not performed (image data 2802 illustrated in FIG. 31C), as illustrated in FIG. 31D, a projection image 2803 in which a trapezoidal distortion has occurred is projected to the projection face. In other words, in the horizontal direction, the projection image is distorted in a trapezoidal shape in accordance with the projection angle, and, in the vertical direction, a distance of the projection face is different in accordance with the projection angle, whereby a vertical distortion in which the height of the line increases in the upward vertical direction occurs.

FIGS. 32A to 32D are diagrams that illustrate examples of cutting out of image data, image data on a display element 114, and a projection image in a case where the projection angle is greater than 0°, and a conventional trapezoidal distortion correction is performed.

Figure 32A:
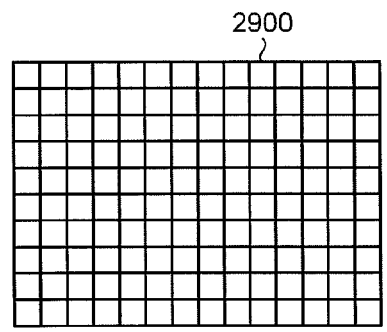
FIG. 32A is a diagram that illustrates an example of cutting out of image data, image data on a display element, and a projection image according to the first embodiment in a case where the projection angle is greater than 0°, and a conventional trapezoidal distortion correction is performed.
Figure 32B:
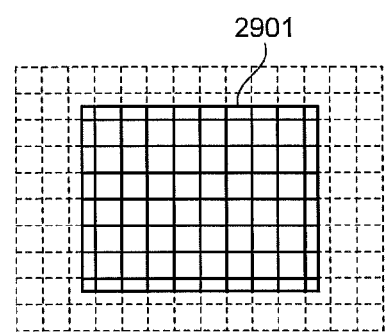
FIG. 32B is a diagram that illustrates an example of the cutting out of the image data, the image data on the display element, and the projection image according to the first embodiment in a case where the projection angle is greater than 0°, and the conventional trapezoidal distortion correction is performed.
Figure 32C:
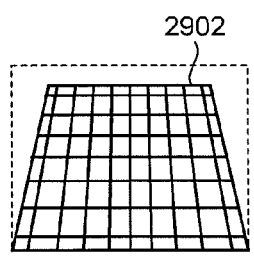
FIG. 32C is a diagram that illustrates an example of the cutting out of the image data, the image data on the display element, and the projection image according to the first embodiment in a case where the projection angle is greater than 0°, and the conventional trapezoidal distortion correction is performed.
Figure 32D:
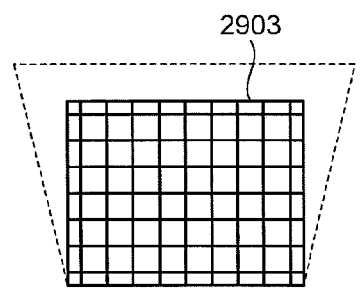
FIG. 32D is a diagram that illustrates an example of the cutting out of the image data, the image data on the display element, and the projection image according to the first embodiment in a case where the projection angle is greater than 0°, and the conventional trapezoidal distortion correction is performed.

In a case where the projection angle is greater than 0°, when image data 2900 of 1920 pixels×1080 pixels is input (FIG. 32A), a range of 1280 pixels×720 pixels that is the resolution of the display element 114 is cut out from the image data (image data 2901 illustrated in FIG. 32B). Then, for the image data of the cut-out range, a conventional trapezoidal distortion correction is performed (image data 2902 illustrated in FIG. 32C). More specifically, in the horizontal direction, the image data is corrected in a trapezoidal shape in accordance with the projection angle as illustrated in FIG. 32C, and, in the vertical direction, a distortion correction in which the height of the line increases in the vertical downward direction is performed. Then, image data after the correction is projected onto the projection face, and, as illustrated in FIG. 32D, a projection image 2903 having a rectangular shape is displayed. In such a case, while the distortion is corrected in both the horizontal direction and the vertical direction for the projection image, there are pixels not contributing to the display.

FIGS. 33A to 33D are diagrams that illustrate examples of cutting out of image data, image data on a display element 114, and a projection image in a case where the projection angle is greater than 0°, and the geometric distortion correction (trapezoidal distortion correction) according to this first embodiment is performed.

Figure 33A:
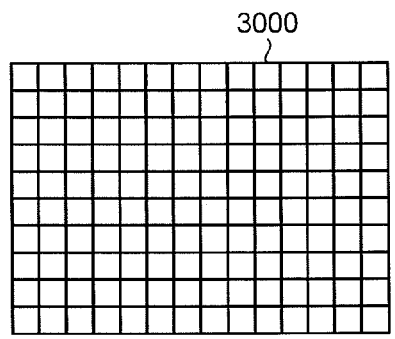
FIG. 33A is a diagram that illustrates an example of cutting out of image data, image data on a display element, and a projection image according to the first embodiment in a case where the projection angle is greater than 0°, and a geometric distortion correction according to the first embodiment is performed.
Figure 33B:
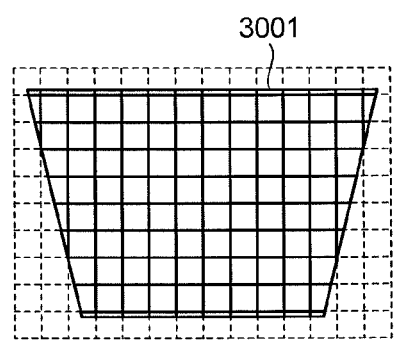
FIG. 33B is a diagram that illustrates an example of the cutting out of the image data, the image data on the display element, and the projection image according to the first embodiment in a case where the projection angle is greater than 0°, and the geometric distortion correction according to the first embodiment is performed.

In a case where the projection angle is greater than 0°, when image data 3000 of 1920 pixels×1080 pixels is input (FIG. 33A), the memory controller 107, from this image data, cuts out image data of a range of an area of a trapezoidal shape of a cut-out range according to the projection angle from the image memory 101 (image data 3001 illustrated in FIG. 33B). Here, as the cut-out range, by the correction control unit 108, the horizontal lower side is calculated as 1280 pixels, and the horizontal upper side is calculated as a value acquired by multiplying 1280 pixels by the reciprocal of the first correction coefficient according to the projection angle θ, and, as the range in the vertical direction, a value acquired by multiplying the height of the input image data by the reciprocal of the second correction coefficient is calculated.

Figure 33C:
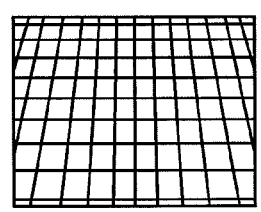
FIG. 33C is a diagram that illustrates an example of the cutting out of the image data, the image data on the display element, and the projection image according to the first embodiment in a case where the projection angle is greater than 0°, and the geometric distortion correction according to the first embodiment is performed.
Figure 33D:
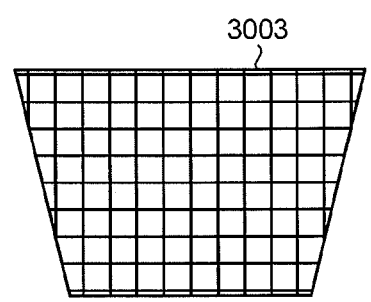
FIG. 33D is a diagram that illustrates an example of the cutting out of the image data, the image data on the display element, and the projection image according to the first embodiment in a case where the projection angle is greater than 0°, and the geometric distortion correction according to the first embodiment is performed.

Then, the memory controller 107 performs the geometric distortion correction for the image data of the cut-out range. More specifically, the memory controller 107, in the horizontal direction, as illustrated in FIG. 33C, corrects the image data in a trapezoidal shape according to the projection angle, and, in the vertical direction, performs a distortion correction in which the height of the line increases in the downward vertical direction. Here, as illustrated in FIG. 33B, since the memory controller 107 cuts out pixels corresponding to the area of the trapezoidal shape according to the projection angle, an image of 1280 pixels×720 pixels is expanded on the display element 114, and, as illustrated as a projection image 3003 in FIG. 33D, the cut-out area is projected without being reduced.

As illustrated in the examples represented in FIGS. 33A to 33D, an image of the unused area that originally remains after the cutting out of the input image data is used for the area of the periphery of the image data after the geometric distortion correction (trapezoidal distortion correction), whereby the projection image is displayed, and the amount of information lacking in the area of the periphery in the horizontal direction and the vertical direction is supplemented. Accordingly, compared to the conventional technique illustrated in FIGS. 32A to 32D, the image of the conventionally unused area can be effectively used, whereby effective use of the displayable area after the geometric distortion correction (trapezoidal distortion correction) is realized.

Process of Projecting Image Data

Figure 34:
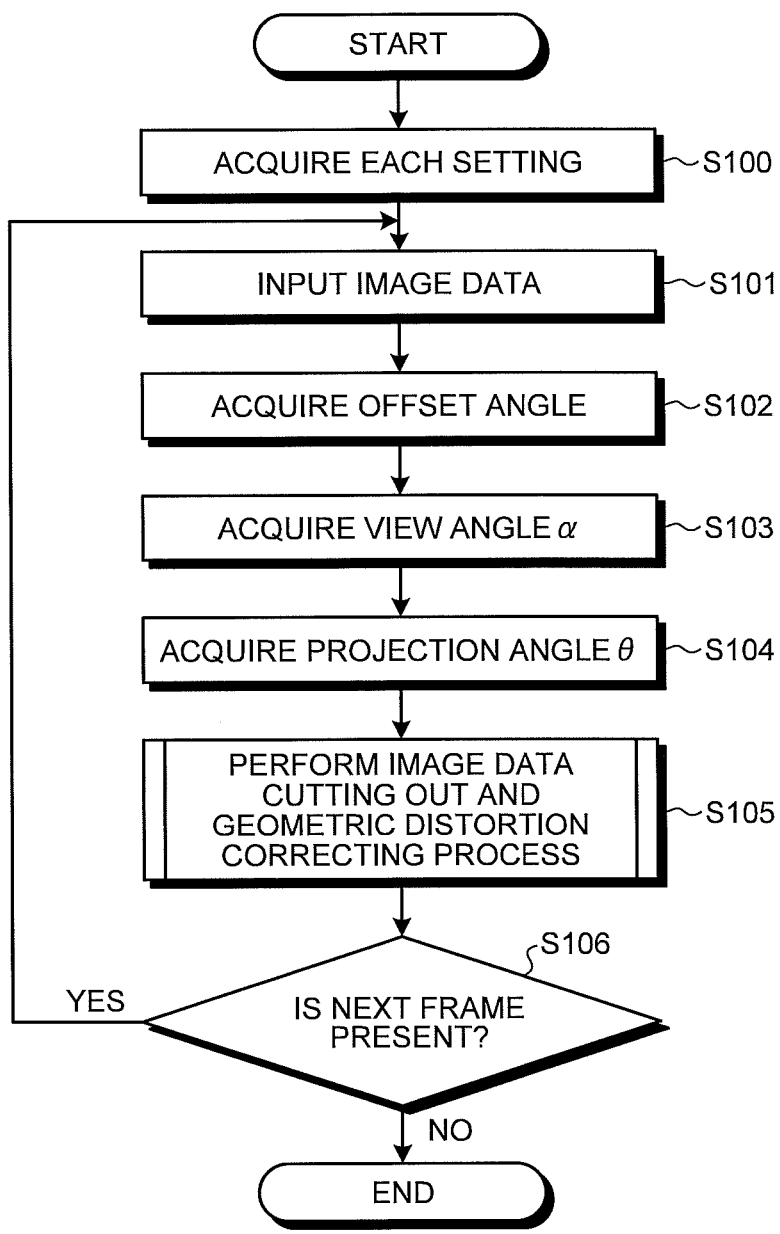
FIG. 34 is a flowchart that illustrates the sequence of an image projection process according to the first embodiment.

Next, the flow of the process performed when an image according to the image data is projected by the projector device 1a will be described. FIG. 34 is a flowchart that illustrates the sequence of an image projection process according to the first embodiment.

In Step S100, in accordance with input of image data, various set values relating to the projection of an image according to the image data are input to the projector device 1a. The input various set values, for example, are acquired by the input control unit 119 and the like. The various set values acquired here, for example, include a value representing whether or not the image according to the image data is rotated, in other words, whether or not the horizontal direction and the vertical direction of the image are interchanged, an enlargement rate of the image, and an offset angle $\theta_{ofst}$ at the time of projection. The various set values may be input to the projector device 1a as data in accordance with the input of the image data to the projector device 1a or may be input by operating the operation unit 14.

In next Step S101, image data corresponding to one frame is input to the projector device 1a, and the input image data is acquired by the memory controller 1032. The acquired image data is written into the image memory 101.

In next Step S102, the image control unit 103 acquires the offset angle $\theta_{ofst}$. In next Step S103, the correction control unit 108 acquires the view angle α from the view angle control unit 106. In addition, in next Step S104, the correction control unit 108 acquires the projection angle θ of the projection lens 12 from the rotation control unit 104.

Figure 35:
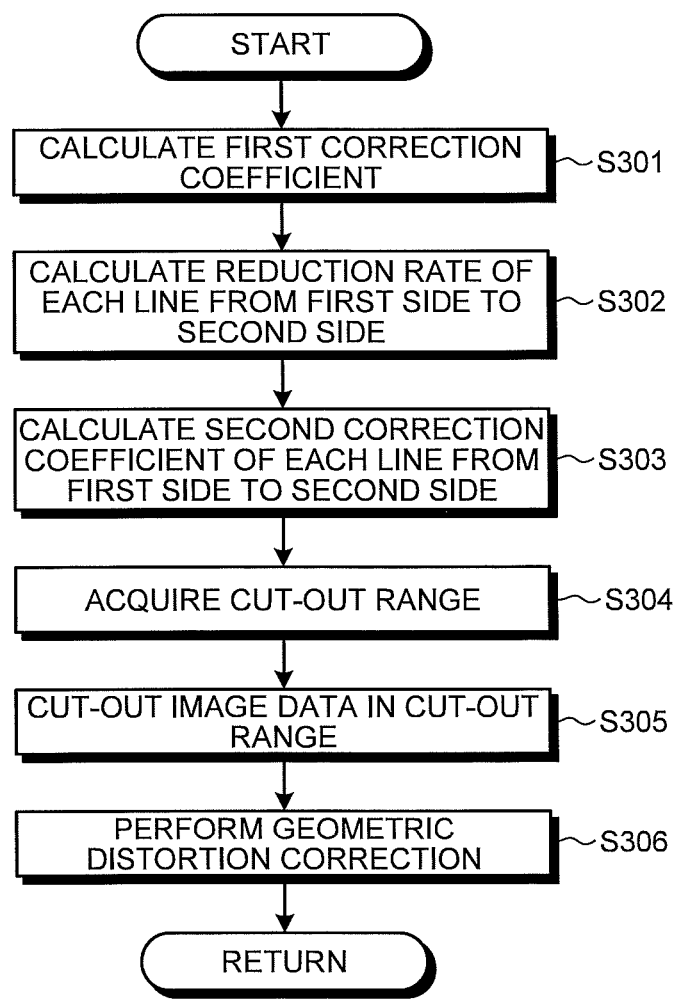
FIG. 35 is a flowchart that illustrates the sequence of an image data cutting out and geometric distortion correction process according to the first embodiment.

In next Step S105, the image data cutting out and geometric distortion correction process are performed. Here, the image data cutting out and geometric distortion correction process will be described in detail. FIG. 35 is a flowchart that illustrates the sequence of the image data cutting out and geometric distortion correction process according to the first embodiment.

First, in Step S301, the correction control unit 108 calculates the first correction coefficient using Equation (12). In next Step S302, the correction control unit 108 calculates the reduction rate of each line from the upper side (first side) to the lower side (second side) of the image data using Equation (15). In addition, in Step S303, the correction control unit 108 acquires the second correction coefficient for each line by using Equation (19) described above.

Then, next, in Step S304, the correction control unit 108 acquires the cut-out range based on the first correction coefficient and the second correction coefficient as described above.

Next, in Step S305, the memory controller 107 cuts out image data of the cut-out range from the image data stored in the image memory 101. Then, in Step S306, the memory controller 107 performs the geometric distortion correction described above for the image data of the cut-out range using the first correction coefficient, the reduction rate, and the second correction coefficient and ends the process.

Returning to FIG. 34, when the image data cutting out and geometric distortion correction process are completed in Step S105, in Step S106, the overall control unit 120 determines whether or not an input of image data of a next frame of the image data input in Step S101 described above is present.

In a case where the input of the image data of the next frame is determined to be present, the overall control unit 120 returns the process to Step S101 and performs the processes of Steps S101 to S105 described above for the image data of the next frame. In other words, the processes of Steps S101 to S105, for example, is repeated in units of frames of the image data in accordance with a vertical synchronization signal VD of the image data. Accordingly, the projector device 1a can cause each process to follow a change in the projection angle θ in units of frames.

On the other hand, in Step S106, in a case where the image data of the next frame is determined not to have been input, the overall control unit 120 stops the image projecting operation in the projector device 1a. For example, the overall control unit 120 controls the light source 111 so as to be turned off and issues an instruction for returning the posture of the drum unit 10 to be in the housed state to the rotation mechanism unit 105. Then, after the posture of the drum unit 10 is returned to be in the housed state, the overall control unit 120 stops the fan cooling the light source 111 and the like.

As above, according to this first embodiment, in a case where the geometric distortion correction is performed for the image data, a projection image is displayed by using an image of the unused area originally remaining after the cutting out of the input image data for the area of the periphery of the image data after the geometric distortion correction, and the amount of information lacking in the area of the periphery in the horizontal direction and the vertical direction is supplemented. For this reason, according to this first embodiment, compared to a conventional technology, by effectively using the image of the unused area, the geometric distortion correction is performed for the content of the projection image, and a high-quality projection image effectively using the displayable area can be acquired.

Particularly, in a case where, for example, environment video such as the sky or the night sky is projected using the projector device 1a according to this first embodiment, even in a case where the projection image is displayed in a trapezoidal shape, when the amount of information to be displayed is large, a sense of presence can be more effectively acquired. In addition, in a case where a map image, or the like is projected using the projector device 1a according to this embodiment, compared to a conventional technique, a relatively broad range of peripheral information can be projected.

Modified Example of First Embodiment

According to the projector device 1a of the first embodiment, a horizontal distortion and a vertical distortion of the projection image that occur in accordance with the projection angle are eliminated by the geometric distortion correction, and the amount of information is supplemented for both areas of the horizontal-direction area and the vertical-direction area. However, according to a modified example of the first embodiment, a horizontal distortion is eliminated by a geometric distortion correction, and the amount of information is supplemented for the horizontal-direction area, but a distortion correction is not performed for the vertical direction.

The external appearance, the structure, and the functional configuration of the projector device 1a according to the first embodiment described above may be applied to the modified example of the first embodiment.

In this modified example of the first embodiment, the correction control unit 108 calculates the first correction coefficient used for a horizontal distortion correction based on the projection angle input from the rotation control unit 104 and the view angle input from the view angle control unit 106 by using Equation (12) described above and calculates the reduction rate for each line by using Equation (15) but does not calculate the second correction coefficient used for a vertical distortion correction.

In addition, based on the projection angle, the view angle, and the first correction coefficient, the correction control unit 108 determines a cut-out range from the input image data such that image data after the geometric distortion correction includes a displayable size of the display device and outputs the determined cut-out range to the memory controller 107 and the extended function control unit 109.

The memory controller 107 cuts out (extracts) an image area of the cut-out range determined by the correction control unit 108 from the whole area of a frame image relating to the image data stored in the image memory 101 and outputs the image area that has been cut out as image data.

In addition, the memory controller 107 performs a geometric distortion correction for the image data cut out from the image memory 101 by using the first correction coefficient and outputs the image data after the geometric distortion correction to the image processor 102.

Figure 36:
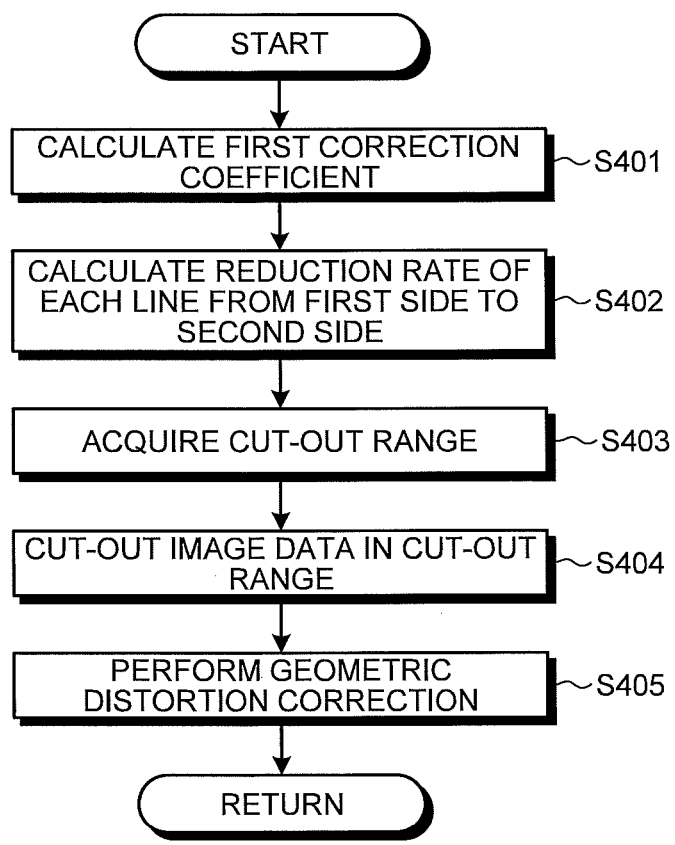
FIG. 36 is a flowchart that illustrates the sequence of an image data cutting out and geometric distortion correction process according to a modified example of the first embodiment.

The flow of the process of projecting the image data according to the modified example of the first embodiment is similar to that of the first embodiment described with reference to FIG. 34. In the modified example of the first embodiment, an image data cutting out and geometric distortion correction process in Step S105 illustrated in FIG. 34 is different from that of the first embodiment. FIG. 36 is a flowchart that illustrates the sequence of the image data cutting out and geometric distortion correction process according to the modified example of the first embodiment.

First, in Step S401, the correction control unit 108 calculates the first correction coefficient by using Equation (12). In next Step S402, the correction control unit 108 calculates the reduction rate of each line from the upper side (first side) to the lower side (second side) of the image data by using Equation (15).

Then, next, in Step S403, the correction control unit 108 acquires a cut-out range based on the first correction coefficient as described above.

Next, in Step S404, the memory controller 107 cuts out image data of the cut-out range from the image data stored in the image memory 101. Then, in Step S405, the memory controller 107 performs the geometric distortion correction described above for the image data of the cut-out range using the first correction coefficient and the reduction rate and ends the process.

Next, an example of the cutting out of image data and the geometric distortion correction performed by the geometric distortion correction unit 100 according to this modified example of the first embodiment will be described.

FIGS. 37A to 37D are diagrams that illustrate examples of cutting out of image data, image data on the display element 114, and a projection image in a case where the projection angle θ is greater than 0°, and the geometric distortion correction according to this embodiment is performed.

Figure 37A:
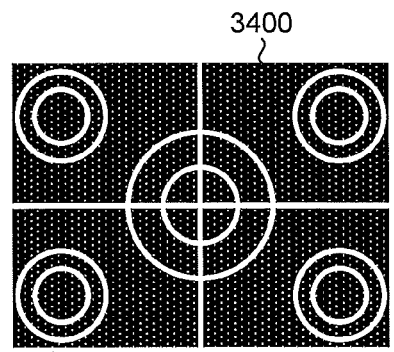
FIG. 37A is a diagram that illustrates an example of cutting out of image data, image data on a display element, and a projection image in a case where the projection angle is greater than 0°, and a geometric distortion correction according to a modified example of the first embodiment is performed.
Figure 37B:
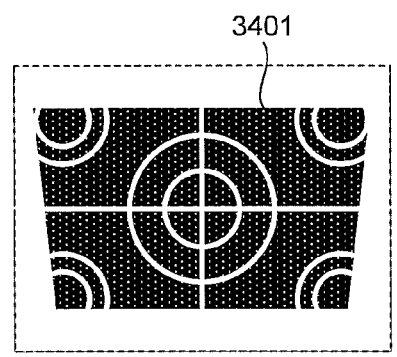
FIG. 37B is a diagram that illustrates an example of the cutting out of the image data, the image data on the display element, and the projection image in a case where the projection angle is greater than 0°, and the geometric distortion correction according to the modified example of the first embodiment is performed.

In a case where the projection angle θ is greater than 0°, when image data 3400 of 1920 pixels×1080 pixels is input (FIG. 37A), the memory controller 107, from this image data 3400, cuts out image data 3401 of a range of an area of a trapezoidal shape of a cut-out range according to the projection angle from the image memory 101 (FIG. 37B). Here, as the cut-out range, by the correction control unit 108, the horizontal lower side is calculated as 1280 pixels, and the horizontal upper side is calculated as a value acquired by multiplying 1280 pixels by the reciprocal of the first correction coefficient according to the projection angle.

Figure 37C:
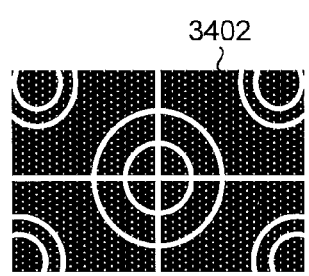
FIG. 37C is a diagram that illustrates an example of the cutting out of the image data, the image data on the display element, and the projection image in a case where the projection angle is greater than 0°, and the geometric distortion correction according to the modified example of the first embodiment is performed.
Figure 37D:
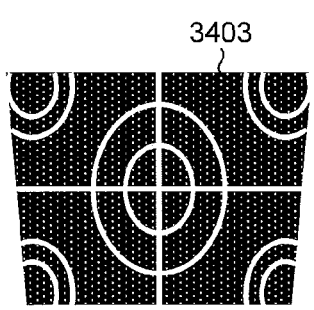
FIG. 37D is a diagram that illustrates an example of the cutting out of the image data, the image data on the display element, and the projection image in a case where the projection angle is greater than 0°, and the geometric distortion correction according to the modified example of the first embodiment is performed.

Then, the memory controller 107 performs the geometric distortion correction for the image data 3401 of the cut-out range (FIG. 37C). More specifically, the memory controller 107, in the horizontal direction, corrects the image data in a trapezoidal shape according to the projection angle, as illustrated as image data 3402 in FIG. 37C. Here, as illustrated in FIG. 37B, since the memory controller 107 cuts out pixels corresponding to the area of the trapezoidal shape according to the projection angle, an image of 1280 pixels× 720 pixels is expanded on the display element 114, and, as represented as a projection image 3403 in FIG. 37D, the cut-out area is projected without being reduced.

As above, according to this modified example of the first embodiment, the horizontal distortion is eliminated by the geometric distortion correction, and the amount of information is supplemented for the horizontal-direction area, but the geometric distortion correction is not performed for the vertical direction. Accordingly, not only the same advantages as those of the first embodiment are acquired, but the processing load of the correction control unit 108 can be reduced.

In the first embodiment and the modified example of the first embodiment, the method has been described in which the projection angle is derived by changing the projection direction of the projection unit such that the projection unit is moved while projecting the projection image onto the projection face, and a correction amount used for eliminating the geometric distortion according to the projection angle θ is calculated, but a change in the projection direction does not need to be dynamic. In other words, as illustrated in FIGS. 14 and 15, the correction amount may be calculated using a fixed projection angle in the stopped state.

In addition, the calculation of the correction amount and the detection method are not limited to those described in this embodiment, and a cut-out range including also an area other than the above-described image data area after the correction may be determined according to the correction amount.

Each of the projector devices 1a according to the first embodiment and the modified example of the first embodiment has a configuration that includes hardware such as a control device such as a CPU (Central Processing Unit), storage devices such as ROM (Read Only Memory) and RAM (Random Access Memory), an HDD (Hard Disk Drive), and an operation unit 14.

In addition, the rotation control unit 104, the view angle control unit 106, the image control unit 103 (and each unit thereof), the extended function control unit 109, the geometric distortion correction unit 100 (and each unit thereof), the input control unit 119, and the overall control unit 120 mounted as circuit units of the projector devices 1a of the first and the modified example of the first embodiment may be configured to be realized by software instead of being configured by hardware.

In a case where the projector device is realized by the software, an image projection program (including an image correction program) executed by the projector devices 1a according to the first embodiment and the modified example of the first embodiment is built in ROM or the like in advance and is provided as a computer program product.

The image projection program executed by the projector devices 1a according to the first embodiment and the modified example of the first embodiment may be configured to be recorded on a computer-readable recording medium such as a compact disk-ROM (CD-ROM), a flexible disk (FD), a compact disk-R (CD-R), or a digital versatile disk (DVD) so as to be provided as a file having an installable form or an executable form.

In addition, the image projection program executed by the projector devices 1a according to the first embodiment and the modified example of the first embodiment may be configured to be stored in a computer connected to a network such as the Internet and be provided by being downloaded through the network. In addition, the image projection program executed by the projector devices 1a according to the first embodiment and the modified example of the first embodiment may be configured to be provided or distributed through a network such as the Internet.

The image projection program executed by the projector devices 1a according to the first embodiment and the modified example of the first embodiment has a module configuration including the above-described units (the rotation control unit 104, the view angle control unit 106, the image control unit 103 (and each unit thereof), the extended function control unit 109, the geometric distortion correction unit 100 (and each unit thereof), the input control unit 119, and the overall control unit 120). As actual hardware, as the CPU reads the image projection program from the ROM and executes the read image projection program, the above-described units are loaded into a main memory device, the rotation control unit 104, the view angle control unit 106, the image control unit 103 (and each unit thereof), the extended function control unit 109, the geometric distortion correction unit 100 (and each unit thereof), the input control unit 119, and the overall control unit 120 are generated on the main storage device.

Second Embodiment

Next, a second embodiment will be described. In the projector devices 1 and 1a described above, when the projection angle is shifted from an angle perpendicular to the projection medium, the size of a projection image projected onto the projection medium becomes different from that of a case where the projection angle is perpendicular to the projection medium. Accordingly, there is concern that an expected desired projection image cannot be acquired. An object of the second embodiment is to provide a projector device capable of suppressing a change in the size of the projection image in a case where the projection angle is changed.

Figure 38:
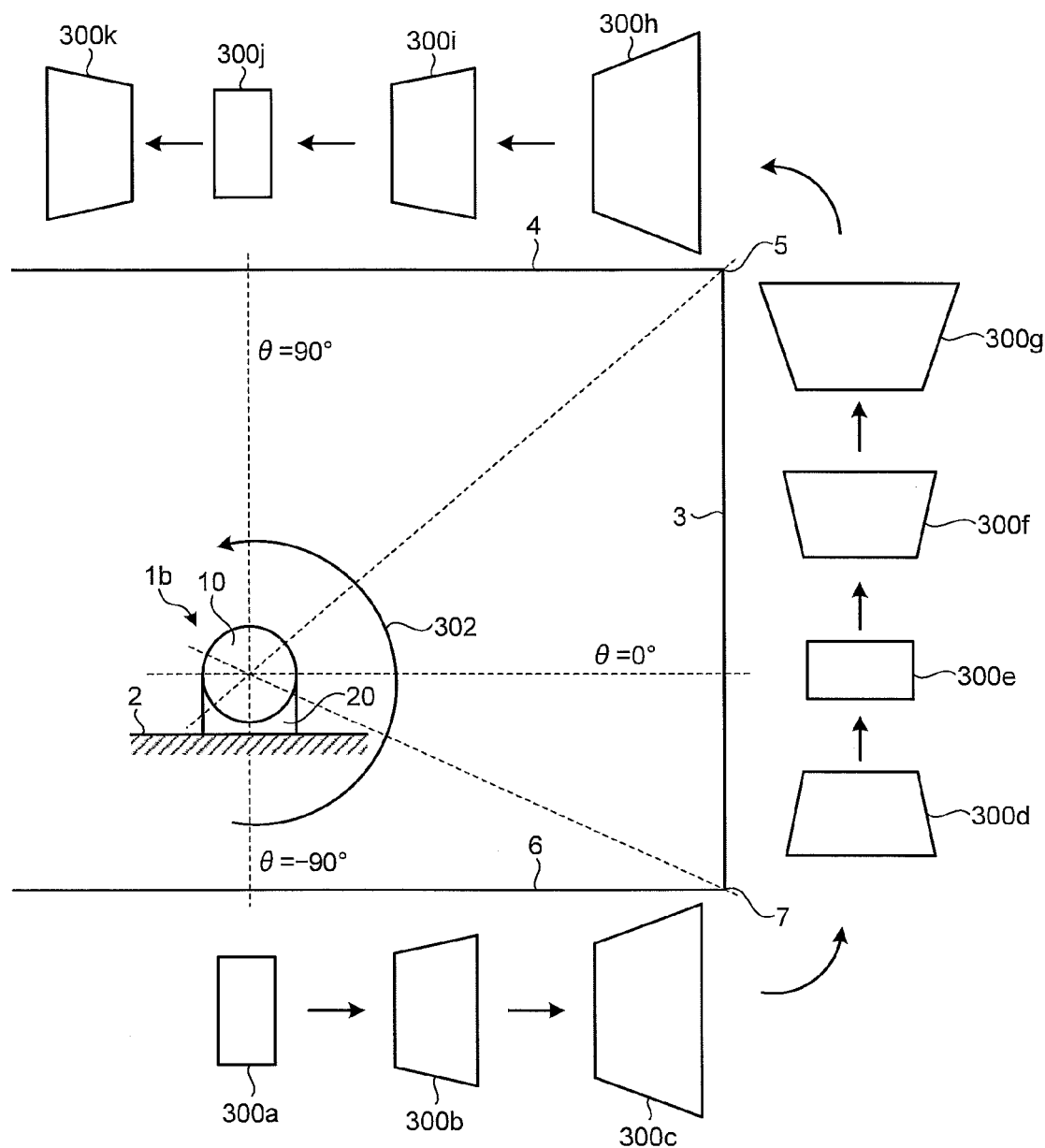
FIG. 38 is a diagram that illustrates a change in a projection image according to a change of the projection angle θ in a case where a keystone correction is not performed.

Here, a change of a projection image according to a change in the projection angle θ in a case where the above-described trapezoidal distortion correction (keystone correction) is not performed will be described with reference to FIG. 38. FIG. 38 illustrates an example in which the projection angle θ of a projection lens 12 is increased from a projection angle θ=−90° by rotating a drum unit 10 of a projector device 1b disposed on a horizontal base 2 in a rotation direction denoted by an arrow 302 in the figure. At this time, it is assumed that a floor 6 and a ceiling 4 are horizontal with respect to the base 2, and a wall 3 is perpendicular to the base 2. In other words, when the projection angle θ=0°, 90°, and −90°, the projection direction of the projection lens 12 is perpendicular to the wall 3 and the ceiling 4.

In this case, at the projection angle of −90°, the projection direction of the projection lens 12 is perpendicular to the floor 6, and a projection image 300a having no distortion can be acquired. When the projection angle θ is increased from −90°, like projection images 300b and 300c, a trapezoidal distortion occurs in the projection image. In other words, in the projection image, the front side is sequentially lengthened toward a direction in which the projection angle θ increases, the rear side is further lengthened than the front side, and the vertical size also grows toward the direction in which the projection angle θ increases.

When the projection angle θ is further increased, and the projection direction exceeds a boundary 7 between the floor 6 and the wall 3, to the contrary to the case until then, the distortion decreases according to an increase in the projection angle θ, and the size of the projection image is decreased as well (projection images 300d and 300e). Then, when the projection angle θ=0°, the projection image 300e having no distortion is acquired. In the case illustrated in FIG. 38, a distance from the projector device 1b to the projection image 300e is longer than a distance from the projector device 1b to the projection image 300a. Accordingly, the projection image 300e is projected in a size larger than that of the projection image 300a. When the projection angle θ is increased from 0°, like projection images 300f and 300g, the distortion increases according to an increase in the projection angle θ, and the size of the projection image is increased as well.

When the projection angle θ is further increased, and the projection direction exceeds a boundary 5 between the wall 3 and the ceiling 4, to the contrary to the case until then, the distortion decreases according to an increase in the projection angle θ, and the size of the projection image is decreased as well (projection images 300h and 300i). Then, at the projection angle θ=90°, a projection image 300j having no distortion is acquired, and, when the projection angle θ is further increased, the distortion increases according to an increase in the projection angle θ, and the size of the projection image is increased as well (a projection image 300k).

Figure 39:
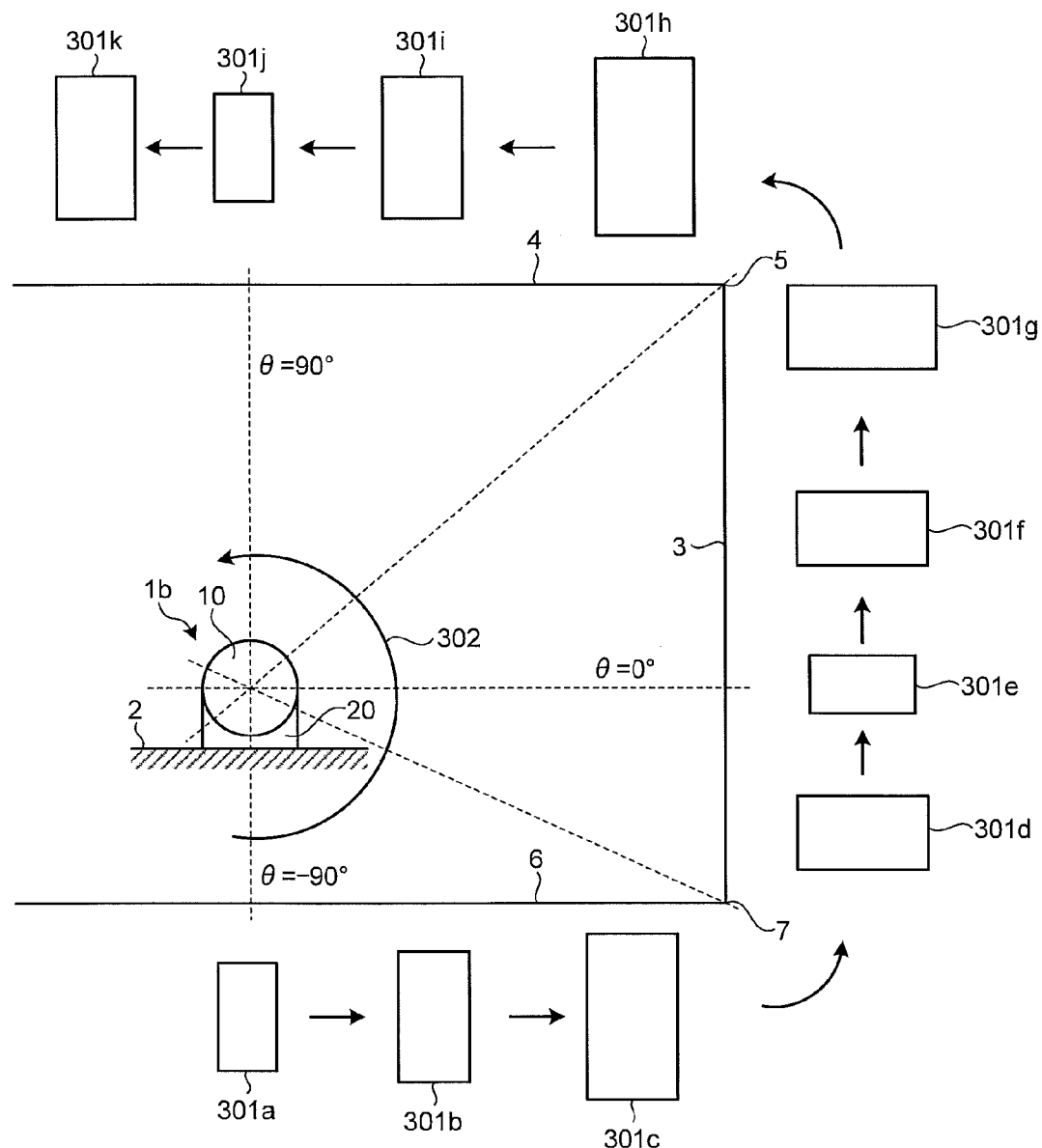
FIG. 39 is a diagram that illustrates an example of a case where a trapezoidal distortion correction is performed for a projection image in which a trapezoidal distortion is generated.

FIG. 39 illustrates an example of a case where a trapezoidal distortion correction (keystone correction) according to an existing technology is performed for a projection image in which a trapezoidal distortion occurs as illustrated in FIG. 38. In the keystone correction according to the existing technology, a correction is performed such that the projection image maintains the aspect ratio of the original image with respect to a shorter side (hereinafter, referred to as a shorter side) of the upper base and the lower base of a trapezoidal shape distorted according to the projection angle θ. As illustrated in FIG. 38, the shorter side of the projection image in which the trapezoidal distortion occurs is changed according to the projection angle θ. Accordingly, the size of the projection image for which the keystone correction is performed is changed according to the projection angle θ.

In the example illustrated in FIG. 39, for example, between the projection direction of the projection angle θ=−90° and the direction of the boundary 7, according to changes in the lengths of the shorter sides of projection images 300a to 300c for which the keystone correction has not been performed, the sizes of corrected projection images 301a, 301b, and 301c are increased according to an increase in the projection angle θ. Between the direction of the boundary 7 and the direction of the boundary 5, according to changes in the lengths of the shorter sides of projection images 300d to 300g for which the correction has not been performed, the sizes of corrected projection images 301d to 301g are changed. More specifically, according to an increase in the projection angle θ, the sizes of the projection images 301d to 301g are decreased between the direction of the boundary 7 and the projection angle θ=0° and are increased between the projection angle θ=0° and the boundary 5. In addition, similarly, in a direction after the boundary 5, according to changes in the lengths of the shorter sides of projection images 300h to 300k for which the correction has not been performed, the sizes of corrected projection images 301h to 301k are changed.

Figure 40:
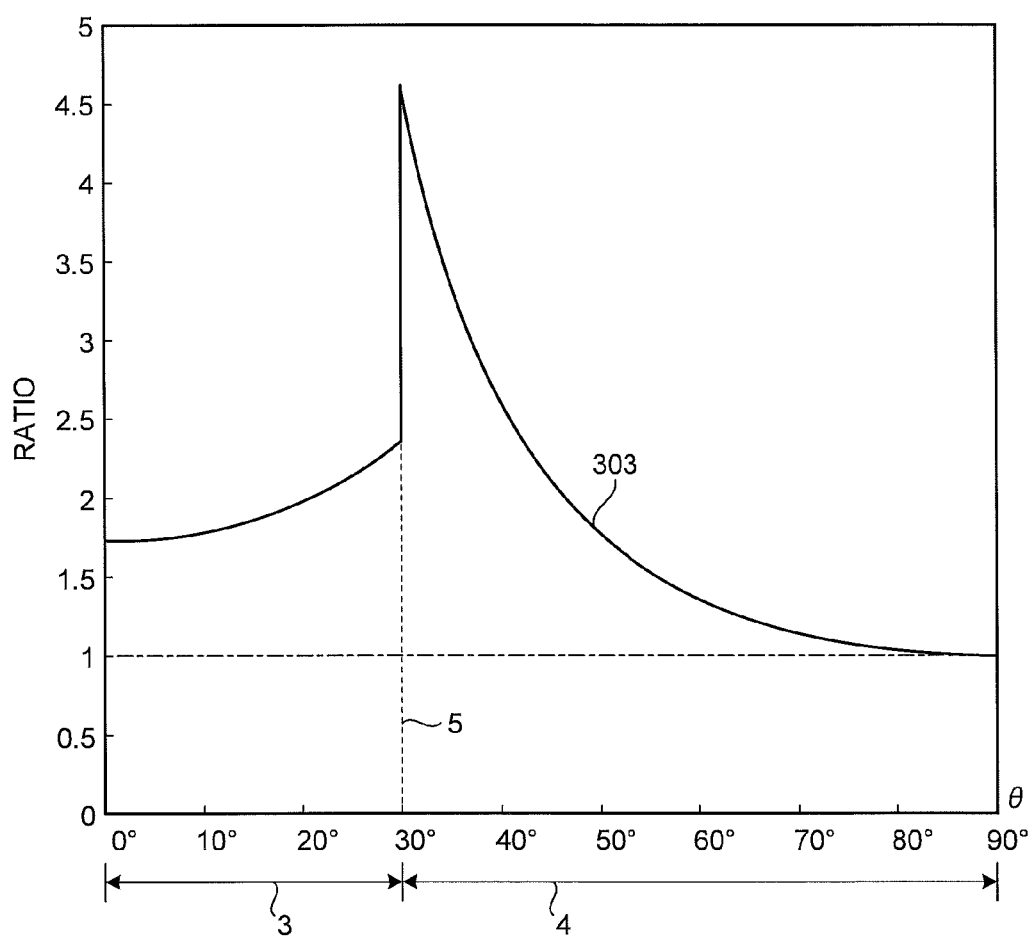
FIG. 40 is a diagram that illustrates an example of a change in the vertical-direction size of a projection image according to the projection angle θ.

FIG. 40 is a diagram that illustrates an example of a change in the vertical-direction size of a projection image according to the projection angle θ. In FIG. 40, a line 303 represents an example of a change in the height H according to the projection angle θ using a ratio with respect to the height $H_0$ of the projection image of a case where a distance toward the projection direction for the projection medium is shortest. In this example, out of projection angles θ=0° and 90° at which the projection direction is perpendicular to the projection medium, in a case where the projection angle θ=90°, in other words, in a case where the projection direction is perpendicular to the ceiling 4, the distance toward the projection direction for the projection medium is shortest. This projection angle θ at which the distance toward the projection direction for the projection medium is shortest is denoted by a projection angle $\theta_{MIN}$.

As illustrated in FIG. 40, the height H of the projection image that is minimal in a case where the projection angle θ=90° is increased as the projection angle θ decreases, and the projection direction becomes closer to the boundary 5 between the ceiling 4 and the wall 3. In this example, a projection angle θ=30° corresponds to the projection direction of the boundary 5. In the projection direction corresponding to the boundary 5, as the angle of the projection medium with respect to the projection direction is discontinuous, a change in the height H with respect to the projection angle θ is discontinuous.

In this way, in a case where the size of the projection image on the projection medium changes according to the projection angle θ, when the drum unit 10 is rotated, a projection image having a size different from an initial projection image is presented to the user, whereby there is concern that the user feels discomfort. In order to solve this, in this second embodiment, a reduction process is performed for image data to be projected in the vertical and horizontal directions such that the size of the projection image on the projection medium is constant at projection angles θ.

The projector device 1b, which has a functional configuration represented in FIG. 43 to be described later, according to this second embodiment performs a keystone correction for a projection image of each projection angle θ. Then, in the second embodiment, the projector device 1b performs a reduction process for image data before the keystone correction such that the height H and the length W of the shorter side of the projection image, for which the keystone correction has been performed, that is projected onto the projection medium coincide with the height H (referred to as a height $H_0$) and the length W (referred to as a length $W_0$) of the shorter side of the projection image at the projection angle $\theta_{MIN}$.

Here, in a case where the projection direction for the projection medium is the projection angle $\theta_{MIN}$, the size of the projection image projected onto the projection medium is smallest of all the sizes of the projection images of the case of being projected at projection angles θ. In the embodiment, the size of the projection image of which the projection direction is each projection angle θ is reduced by performing a size correcting process with the size of the projection image of a case where the projection direction is the projection angle $\theta_{MIN}$ being set as the lower limit size.

More specifically, the projector device 1b acquires a reduction rate $R_W(\theta)$ for the length W(θ) of the shorter side of the projection image for causing the size of the projection image of each projection angle θ to coincide with the size of the projection image of the projection angle $θ_{MIN}$. In other words, the reduction rate $R_W(θ)$, as represented in the following Equation (20), is each ratio of the length W(θ) of the shorter side of the projection image of each projection angle θ to the horizontal-direction width $W_0$ of the projection image of the projection angle $θ_{MIN}$ in a case where the keystone correction is not performed. Then, by using this reduction rate $R_W(θ)$, a reduction process is performed for the image data before the keystone correction.

$$R_W(θ)=W_0/W(θ) \tag{20}$$

Figure 41:
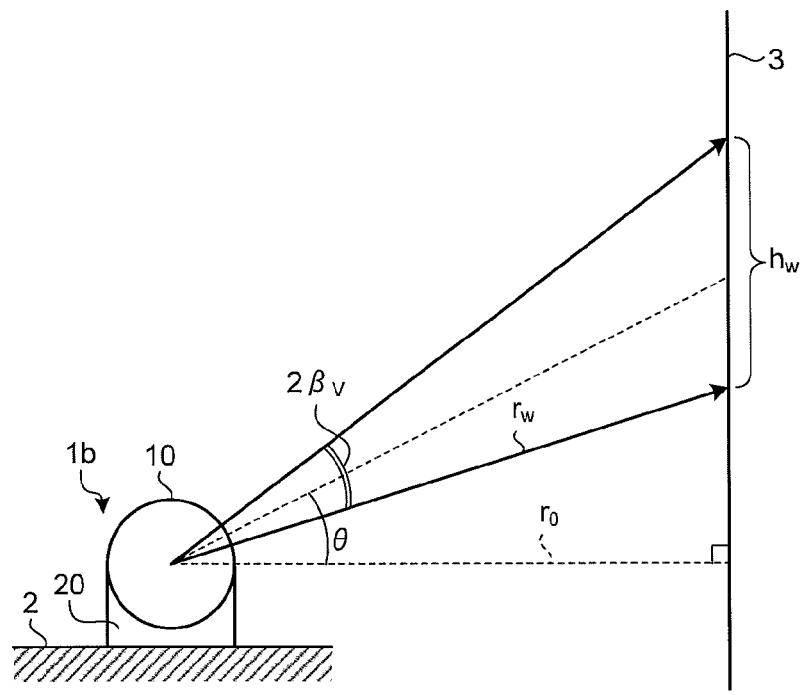
FIG. 41 is a diagram that illustrates a method of calculating the length of a shorter side of a projection image according to a second embodiment.
Figure 42:
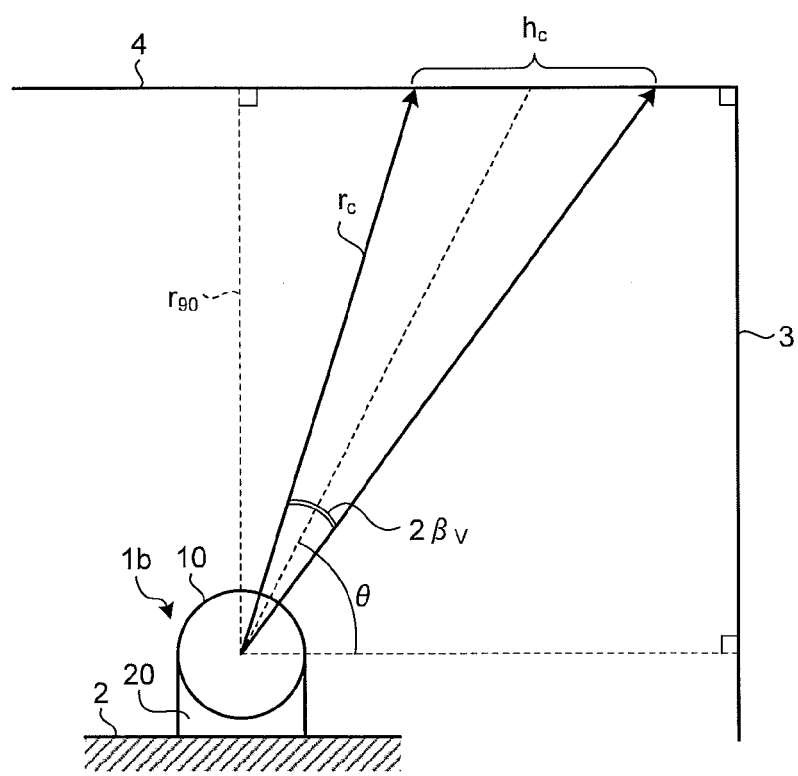
FIG. 42 is a diagram that illustrates the method of calculating the length of the shorter side of the projection image according to the second embodiment.

A method of calculating the length W(θ) of the shorter side of the projection image will be described with reference to FIGS. 41 and 42. FIG. 41 illustrates an example of a case where an image is projected onto a projection medium having a projection face perpendicular to the wall 3, in other words, the projection direction of the projection angle θ=0°. In addition, FIG. 42 illustrates an example of a case where an image is projected onto a projection medium having a projection face perpendicular to the ceiling 4, in other words, the projection direction of the projection angle θ=90°. In the cases illustrated in FIGS. 41 and 42, the ceiling 4 is horizontal with respect to the base 2, and the wall 3 is perpendicular to the base 2. In other words, in cases where the projection angle θ=0° or 90°, the projection direction of the projection lens 12 is perpendicular to the wall 3 and the ceiling 4.

Here, in a case where the size of the display element 114 is different between the vertical direction and the horizontal direction, a vertical-direction view angle $α_V$ and a horizontal-direction view angle $α_H$ are defined as the view angle α. These view angles $α_V$ and $α_H$ are constant regardless of the projection angle θ. Hereinafter, angles of ½ of the view angle $α_V$ and the view angle $α_H$ are represented as an angle $β_V$ and an angle $β_H$, and description will be presented using a view angle $2β_V$ and a view angle $2β_H$.

First, a case will be described in which the projection image is projected onto the wall 3. In FIG. 41, a range $h_w$ represents a range from the upper side to the lower side of the projection image of a case where the projection image is projected onto the wall 3 at the projection angle θ with the view angle $2β_V$. As described with reference to FIG. 38, in a case where the projection image is projected onto the wall 3, for a projection angle θ>0°, the lower end of the projection image, in other words, the range $h_w$ forms the shorter side. Here, a distance (a distance of a case where the projection direction is perpendicular to the wall 3) up to the wall 3 of a case where the projection angle θ=0° is a distance $r_0$, and a distance up to the wall 3 on the shorter side of the projection image at the projection angle θ is a distance $r_W$. In addition, in this case, the projection angle θ is an angle within the range of 0° to a maximum projection angle for which the lower end of the range $h_w$ is caught in the wall 3. In this case, the relation between the distance $r_0$ and the distance $r_W$ is represented in the following Equation (21).

$$r_0=r_w×\cos(θ-β_V) \tag{21}$$

Meanwhile, when the view angle $α_H$ arrives at the projection angle θ to be constant, the length W of the shorter side of the projection image for which the keystone correction has not been performed is proportional to the distance $r_w$ up to the projection medium toward the shorter side. Thus, a change in the length W(θ) according to the projection angle θ of a case where the projection image is projected onto the wall 3 is represented in the following Equation (22).

$$W(θ)=2r_w×\tan β_H \tag{22}$$

By applying Equation (20) to Equation (21), as represented in the following Equation (23), the length W(θ) can be calculated based on the distance $r_0$ and the projection angle θ. In addition, in Equation (23) and Equation (21) described above, in a case where the projection angle θ>90° (for example, the projection image is projected onto a face facing the wall 3 with the projector device 1b being interposed therebetween), the sign of the angle $β_V$ is positive.

$$W(θ)=2r_0×\tan β_H/\cos(θ-β_V) \tag{23}$$

Next, a case will be described in which the projection image is projected onto the ceiling 4. In FIG. 42, a range $h_c$ represents a range from the upper side to the lower side of the projection image of a case where the projection image is projected onto the ceiling at the projection angle θ with the view angle $2β_V$. As described with reference to FIG. 38, in a case where the projection image is projected onto the ceiling 4, a side of the projection image, in other words, the range $h_c$ that is close to the projector device 1b forms the shorter side. Here, a distance (a distance of a case where the projection direction is perpendicular to the ceiling 4) up to the ceiling 4 of a case where the projection angle θ=90° is a distance $r_{90}$, and a distance up to the ceiling 4 on the shorter side of the projection image at the projection angle θ is a distance $r_c$. In addition, in this case, the projection angle θ is an angle within a range in which the shorter side of the range $h_c$ is caught in the ceiling 4. In this case, the relation between the distance $r_{90}$ and the distance $r_c$ is represented in the following Equation (24).

$$r_{90}=r_c×\sin(θ+β_V) \tag{24}$$

Meanwhile, when the view angle $α_H$ arrives at the projection angle θ to be constant, the length W of the shorter side of the projection image for which the keystone correction has not been performed is proportional to the distance $r_w$ up to the projection medium toward the shorter side. Thus, a change in the length W(θ) according to the projection angle θ of a case where the projection image is projected onto the ceiling 4 is represented in the following Equation (25) that is similar to Equation (22) described above.

$$W(θ)=2r_c×\tan β_H \tag{25}$$

By applying Equation (24) to Equation (25), as represented in the following Equation (26), the length W(θ) can be calculated based on the distance $r_{90}$ and the projection angle θ. In addition, in Equation (26) and Equation (24) described above, in a case where the projection angle θ>90°, the sign of the angle $β_V$ is negative.

$$W(θ)=2r_{90}×\tan β_H/\sin(θ+β_V) \tag{26}$$

Internal Configuration of Projector Device According to Second Embodiment

Figure 43:
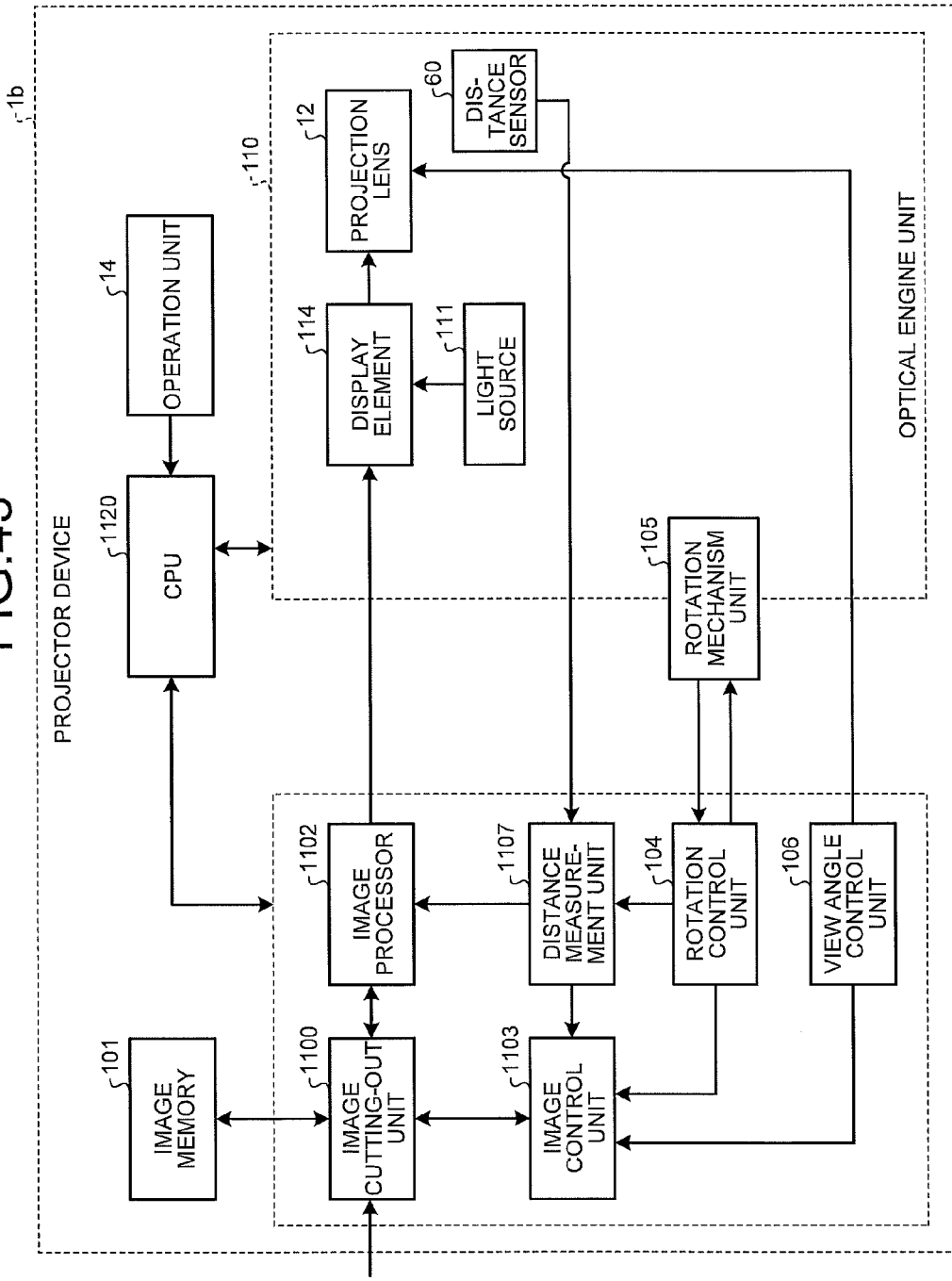
FIG. 43 is a block diagram that illustrates the configuration of an example of a circuit unit and an optical engine unit according to the second embodiment.

FIG. 43 is a block diagram that illustrates an example of the functional configuration of the projector device 1b according to the second embodiment. In FIG. 43, the same reference numeral is assigned to a portion common to the configuration illustrated in FIG. 4 described above, and detailed description thereof will not be presented.

The external appearance and the structure of the projector device 1b according to the second embodiment are similar to those of the first embodiment.

As illustrated in FIG. 43, the image processing/controlling unit 90 illustrated in FIG. 4 includes: an image memory 101; an image cutting-out unit 1100; an image processor 1102; and an image control unit 1103. In addition, a CPU 1120 realizes the function of an overall control unit 120 according to a program stored in ROM in advance with RAM operated as a work memory. In the example illustrated in FIG. 43, the output of an operation unit 14 is supplied to the CPU 1120.

In addition, as illustrated in FIG. 43, in the projector device 1b, a distance sensor 60 and a distance measurement unit 1107 are added to the projector device 1 illustrated in FIG. 4. The distance sensor 60 is disposed in a window portion 13 for measuring a distance from a projection lens 12 to a projection medium. A detection signal output from the distance sensor 60 is input to the distance measurement unit 1107. In addition, angle information representing the angle of a drum unit 10, in other words, the projection direction according to a projection lens 12 is input from a rotation control unit 104 to the distance measurement unit 1107. The distance measurement unit 1107 performs a distance measurement process based on the detection signal, thereby derives a distance from the distance sensor 60 to the projection medium in the projection direction represented in the angle information.

In addition, the distance measurement unit 1107 calculates a projection direction that is perpendicular to the projection medium based on the derived distance. The angle of the calculated projection direction perpendicular to the projection medium with respect to the projection angle 0° is set as a projection angle θref (first direction).

Processes performed by an image processor 1102 and an image control unit 1103 to be described later are performed based on this projection angle $\theta_{ref}$. In other words, by correcting the projection angle θ by using the projection angle $\theta_{ref}$, also in a case where the horizontal direction (projection angle 0°) of the projector device 1b is not perpendicular to the projection face of the projection medium, processes depending on the projection angle θ can be appropriately performed by the image processor 1102 and the image control unit 1103. A method of calculating the projection angle $\theta_{ref}$ will be described later.

Image data output from the image cutting-out unit 1100 and the projection angle $\theta_{ref}$ acquired by the distance measurement unit 1107 are supplied to the image processor 1102. The image processor 1102 outputs the image data for which image processing has been performed based on timing represented in a vertical synchronization signal VD supplied from a timing generator not illustrated in the figure.

The image processor 1102, for example, performs image processing for the supplied image data, for example, by using an image memory 101. The image processor 1102 accesses the image memory 101 through the image cutting-out unit 1100. However, the embodiment is not limited thereto, and a memory used by the image processor 1102 for the image processing may be separately arranged.

For example, the image processor 1102 performs a size converting process such that the size of the image data supplied from the image cutting-out unit 1100 coincides with the size of the display element 114. In addition, the image processor 1102 may perform various kinds of image processing such as a size converting process executed through a general linear transformation process, an interpolation process, a thinning out process, an edge enhancement process, a low pass filter process, and a halftone mixing process described for the image processing/controlling unit 90 illustrated in FIG. 4. The image data output from the image processor 1102 is supplied to the display element 114.

The image control unit 1103 designates an image cut-out area using the image cutting-out unit 1100 based on the information relating to the angle supplied from the rotation control unit 104, the projection angle $\theta_{ref}$ supplied from the distance measurement unit 1107, and the information relating to the view angle supplied from the view angle control unit 106.

At this time, the image control unit 1103 designates a cut-out area of the image data based on a line position according to an angle between projection directions before and after the change of the projection lens 12. The image control unit 1103 designates the image cut-out area for the image cutting-out unit 1100. In addition, the image control unit 1103 instructs the image cutting-out unit 1100 to read image data from the designated image cut-out area in synchronization with a vertical synchronization signal VD supplied from a timing generator not illustrated in the figure.

In the description presented above, while the image cutting-out unit 1100, the image processor 1102, the image control unit 1103, the rotation control unit 104, the view angle control unit 106, and the distance measurement unit 1107 have been described as separate hardware, the configuration is not limited to this example. For example, each of these units may be realized by a module of a program operating on the CPU 1120.

Size Correcting Process Relating to Second Embodiment

Figure 44:
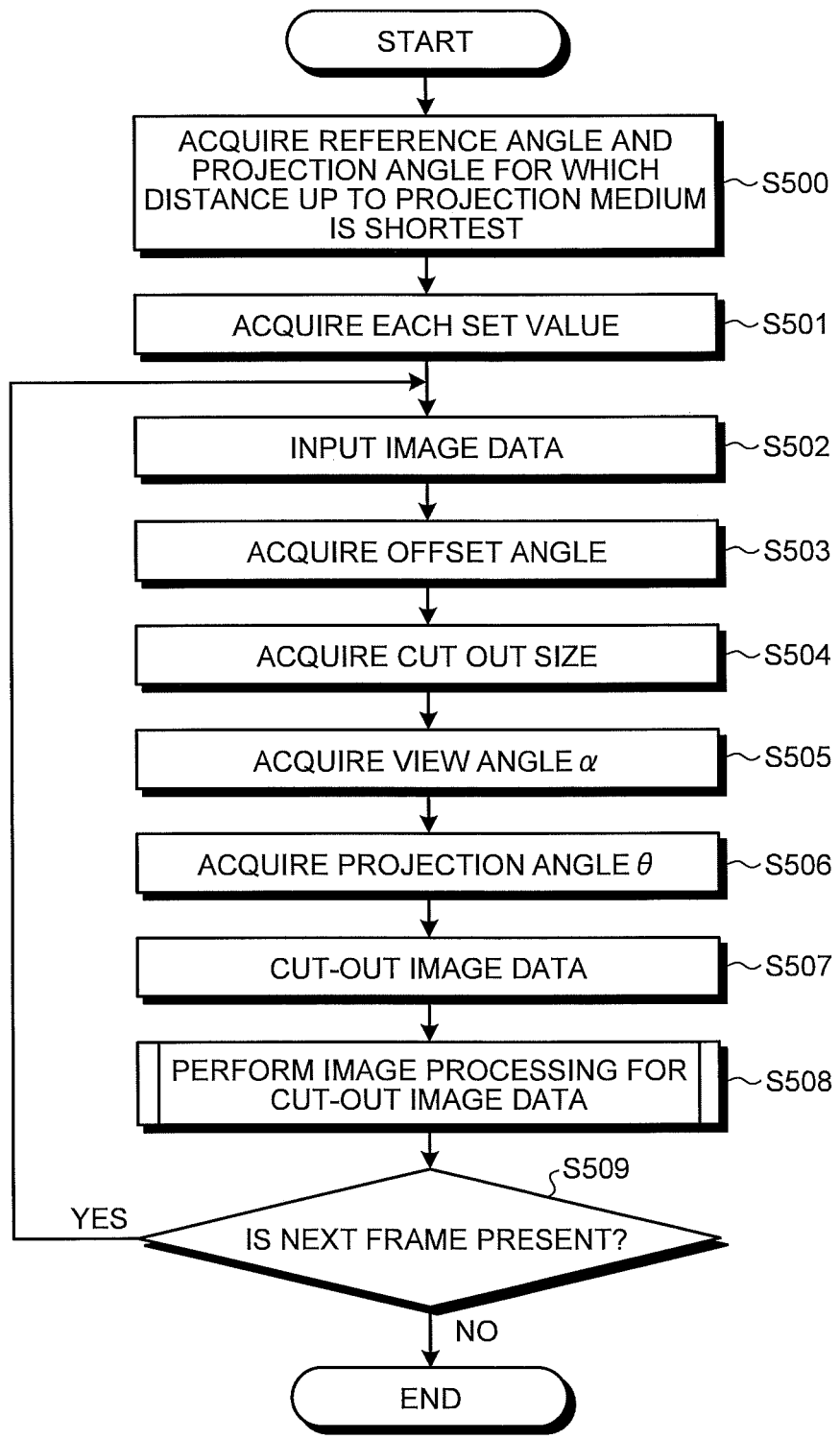
FIG. 44 is a flowchart that illustrates the flow of an image projection process performed by a projector device that can be applied to the second embodiment.

Next, the flow of the image projecting process performed by the projector device 1b that can be applied to the second embodiment will be described with reference to a flowchart represented in FIG. 44.

First, in Step S500, the distance measurement unit 1107 acquires a projection angle θ for which the projection direction is perpendicular to the projection medium as the reference angle $\theta_{ref}$ at the time of projection. In addition, the distance measurement unit 1107 acquires a projection angle $\theta_{MIN}$ corresponding to a projection direction in which a distance up to the projection medium is shortest. Methods of acquiring the reference angle $\theta_{ref}$ and the projection angle $\theta_{MIN}$ will be described later.

In the next Step S501, in accordance with the input of the image data, various set values relating to the projection of an image according to the image data are input to the projector device 1b. The various set values that have been input, for example, are acquired by the CPU 1120. The various set values acquired here, for example, include a value representing whether or not the image according to the image data is rotated, in other words, whether or not the horizontal direction and the vertical direction of the image are interchanged, an enlargement rate of the image, and an offset angle $\theta_{ofst}$ at the time of projection. The various set values may be input to the projector device 1b as data in accordance with the input of the image data to the projector device 1b or may be input by operating the operation unit 14.

In the next Step S502, image data corresponding to one frame is input to the projector device 1b, and the input image data is acquired by the image cutting-out unit 1100. The acquired image data is written into the image memory 101.

In the next Step S503, the image control unit 1103 acquires the offset angle $\theta_{ofst}$. In the next Step S504, the image control unit 1103 acquires the cut out size, in other words, the size of the cut-out area of the input image data. The image control unit 1103 may acquire the size of the cut-out area from the set value acquired in Step S501 or may be acquired according to an operation for the operation unit 14. In the next Step S505, the image control unit 1103 acquires the view angle α of the projection lens 12. For example, the image control unit 1103 acquires the vertical-direction view angle $α_V$ and the horizontal-direction view angle $α_H$ of the projection lens 12 from the view angle control unit 106. The image control unit 1103 may be configured to acquire only one of the view angle $α_V$ and the view angle $\alpha_H$ from the view angle control unit 106 and acquire the other view angle from the one view angle that has been acquired according to the aspect ratio of the display element 114.

In addition, in the next Step S506, the distance measurement unit 1107 acquires the projection angle θ of the projection lens 12, for example, from the rotation control unit 104. The distance measurement unit 1107 corrects the acquired projection angle θ by using the reference angle $\theta_{ref}$ acquired in Step S500, thereby acquiring a corrected projection angle θ'. This projection angle θ' is transmitted to the image processor 1102 and the image control unit 1103.

In the next Step S507, the image control unit 1103 acquires a cut-out area of the input image data by using Equations (3) to (8) described above based on the offset angle $\theta_{ofst}$, the size of the cut-out area, the view angle α, and the projection angle θ' corrected by the distance measurement unit 1107 that are acquired in Steps S503 to S506. The image control unit 1103 instructs the image cutting-out unit 1100 to read image data from the acquired cut-out area. The image cutting-out unit 1100 reads image data within the cut-out area from the image data stored in the image memory 101 according to an instruction transmitted from the image control unit 1103, thereby performing cutting out of the image data. The image cutting-out unit 1100 supplies the image data of the cut-out area read from the image memory 101 to the image processor 1102.

In Step S508, the image processor 1102 performs a size converting process, for example, by using Equations (1) and (2) described above for the image data supplied from the image cutting-out unit 1100. In addition, the image processor 1102, for the image data, performs a reduction process using the reduction rate $R_W(\theta)$ acquired in a process to be described later and a keystone correction according to the projection angle θ' corrected by the distance measurement unit 1107.

The image data for which the size converting process, the reduction process and the keystone correction have been performed by the image processor 1102 is supplied to the display element 114. The display element 114 modulates light supplied from a light source 111 according to the image data and emits the modulated light. The emitted light is projected from the projection lens 12.

In the next Step S509, the CPU 1120 determines whether or not there is an input of image data of the next frame of the image data input in Step S502 described above. In a case where it is determined that there is an input of the image data of the next frame, the CPU 1120 returns the process to Step S502 and performs the processes of Steps S502 to S508 described above for the image data of the next frame. In other words, the processes of Steps S502 to S508, for example, is repeated in units of frames of the image data according to the vertical synchronization signal VD of the image data. Thus, the projector device 1*b* can cause each process to follow a change in the projection angle θ in units of frames.

On the other hand, in Step S509, in a case where it is determined that the image data of the next frame has not been input, the CPU 1120 stops the image projecting operation of the projector device 1*b*. For example, the CPU 1120 performs control of the light source 111 to be in the Off state and instructs a rotation mechanism unit 105 to return the posture of the drum unit 10 to the initial posture. Then, after the posture of the drum unit 10 is returned to the initial posture, the CPU 1120 stops a fan that cools the light source 111 and the like.

Figure 45:
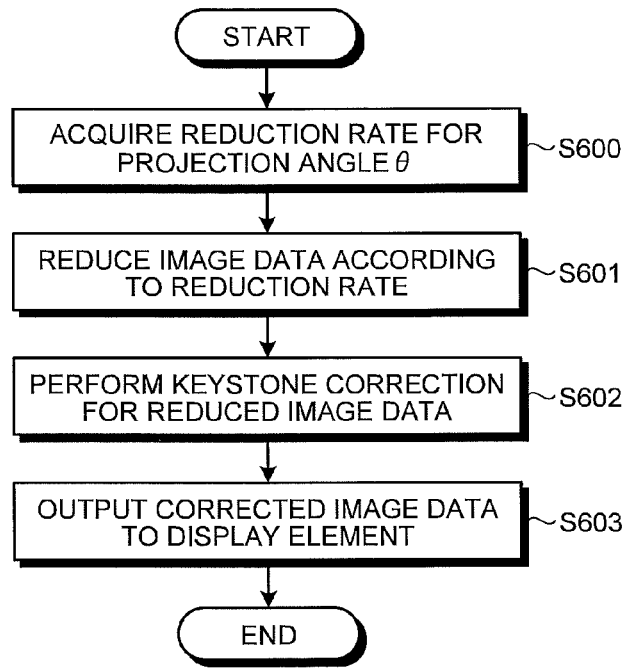
FIG. 45 is a flowchart that illustrates the flow of a keystone correction and a reduction process according to the second embodiment.

FIG. 45 is a flowchart that illustrates the flow of a keystone correction and a reduction process according to the second embodiment. The process according to the flowchart illustrated in FIG. 45 is included in the process of Step S508 represented in FIG. 44 described above.

The image processor 1102 acquires a reduction rate $R_W(\theta)$ for the projection angle θ acquired in Step S506 according to Equations (20) to (26) described above in Step S600. Actually, the image processor 1102 acquires a reduction rate $R_W(\theta')$ for the projection angle θ' acquired by correcting the projection angle θ using the reference angle $\theta_{ref}$. For example, the projection angle θ' is applied to the variable θ of the reduction rate $R_W(\theta)$ acquired by using Equations (20) to (26).

In the next Step S601, the image processor 1102 performs a reduction process according to the reduction rate $R_W(\theta')$ acquired in Step S600 for the image data supplied from the image cutting-out unit 1100. In addition, in the next Step S602, the image processor 1102 performs a keystone correction according to the projection angle θ' for the image data for which the reduction process has been performed in Step S601.

The processes of Steps S601 and S602 are performed by the image processor 1102 by using a predetermined area of the memory 101. It is apparent that a memory that is dedicatedly used for image processing may be arranged in the image processor 1102.

Then, in the next Step S603, the image processor 1102 outputs the image data for which the reduction process and the keystone correction have been performed to the display element 114. The light, which is based on the image data, output from the display element 114 is projected onto the projection medium at the projection angle θ' from the projection lens 12. A projection image having the same size as the projection image at the time of being projected at the projection angle $\theta_{MIN}$ is projected onto the projection medium.

The processes of Steps S601 and S602 described above will be described more specifically with reference to FIGS. 46A and 46B. Here, by referring to FIG. 38 described above, the reference angle $\theta_{ref}=0°$, and the projection direction is perpendicular to the projection medium (the wall 3) at the projection angle θ=0°. In addition, it is assumed that the distance up to the projection medium is shortest at the projection angle θ=90°.

Figure 46A:
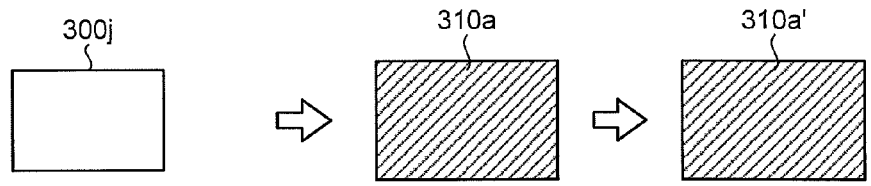
FIG. 46A is a diagram that illustrates the keystone correction and the reduction process according to the second embodiment more specifically.

FIG. 46A illustrates an example of the image data projected onto the ceiling 4 with the projection angle θ=90° (=projection angle $\theta_{MIN}$). In addition, FIG. 46B illustrates an example of the image data projected onto the ceiling 4 with a projection angle $\theta_a$ that is smaller than the projection angle θ=90°. Here, when the projection direction for the boundary 5 between the ceiling 4 and the wall 3 is the projection angle $\theta_M$, it is assumed that the projection angle $\theta_a$ satisfies $\theta_{MIN} > \theta_a > \theta_M$. In addition, the projection angle $\theta_a$ is corrected by using the reference angle $\theta_{ref}$.

Figure 46B:
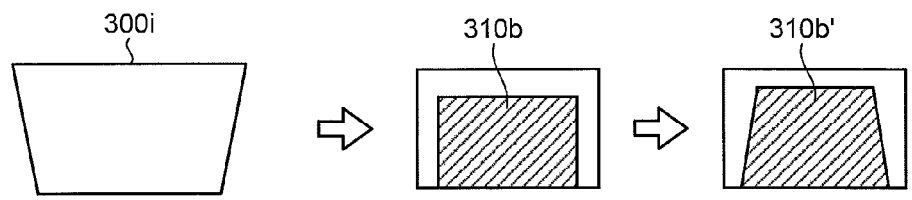
FIG. 46B is a diagram that illustrates the keystone correction and the reduction process according to the second embodiment more specifically.

In FIGS. 46A and 46B, examples of projection images 300*j* and 300*i* of a case where the keystone correction and the reduction process have not been performed are illustrated on the left side. In addition, in FIGS. 46A and 46B, examples of image data for which the reduction process has been performed in Step S601 are illustrated at the center, and examples of image data for which the keystone correction has been performed in Step S602 are illustrated on the right side.

In the example of the projection angle $\theta_{MIN}$ illustrated in FIG. 46A, in a case where the projection direction is perpendicular to the projection medium, and a trapezoidal distortion does not occur, the projection images 300j has a size that is the reference for the reduction process. Thus, the image processor 1102 does not perform the reduction process of Step S601 and acquires image data 310a having a size coinciding with the size of the original image data. In addition, since a trapezoidal distortion does not occur in the image data 310a, the image processor 1102 does not perform the keystone correction of Step S602. Accordingly, image data 310a' having the size and the shape of the image coinciding with those of the image data 310a is supplied to the display element 114.

In the example of the projection angle $\theta_a$ illustrated in FIG. 46B, the projection direction is not perpendicular to the projection medium, and a trapezoidal distortion occurs, and the length W of the shorter side of a trapezoid according to a projection image is different according to the projection angle $\theta$. Thus, in this example of the projection angle $\theta_a$, it is necessary to perform the reduction process of Step S601 and the keystone correction of Step S602 for the image data supplied to the display element 114.

In the example illustrated in FIG. 46B, in the projection image, the length W of the shorter side of a trapezoid according to a trapezoidal distortion changes (grows) according to the projection angle $\theta_a$ based on Equation (26) described above. Thus, the image processor 1102 acquires a reduction rate $R_W(\theta_a)$ using Equations (20) to (26) by the process of Step S601 and performs a reduction process according to the reduction rate $R_W(\theta_a)$ for the image data supplied from the image cutting-out unit 1100 for the horizontal and vertical directions. Accordingly, reduced image data 310b having the same aspect ratio as that of the original image data is generated.

The image processor 1102 performs a keystone correction according to the projection angle $\theta$, for the reduced image data 310b by using an existing technology by the process of Step S602. The image data 310b' for which the reduction process and the keystone correction have been performed is formed in a trapezoidal shape in which the length of the upper base is reduced according to the trapezoidal distortion and the reduction rate $R_W(\theta_a)$, and the length of the lower base is reduced with the reduction rate $R_W(\theta_a)$ according to the projection angle $\theta_a$. As described above, the keystone correction is a correction for maintaining the aspect ratio of the original image by using the length W of the lower base of the trapezoidal shape as the reference. Thus, for a projection image acquired by projecting the image data 310b' onto the projection medium (the ceiling 4) according to the projection angle $\theta_a$, a trapezoidal distortion occurring according to the projection angle $\theta_a$ is corrected, and the size coincides with the size of the projection image according to the projection angle $\theta_{MIN}$.

As above, according to the second embodiment, a projection image constantly having the same size and the same shape regardless of the projection angle $\theta$ can be acquired.

Modified Example of Second Embodiment

Next, a modified example of the second embodiment will be described. In the second embodiment described above, by performing the keystone correction after the reduction process, the size correcting process is performed. In contrast to this, in the modified example of the second embodiment, by performing a reduction process after a keystone correction, the size correcting process is performed. In addition, the whole flow of the size correcting process according to the modified example of the second embodiment is common to that of the flowchart illustrated in FIG. 44 described above, and thus, description thereof will not be presented.

Figure 47:
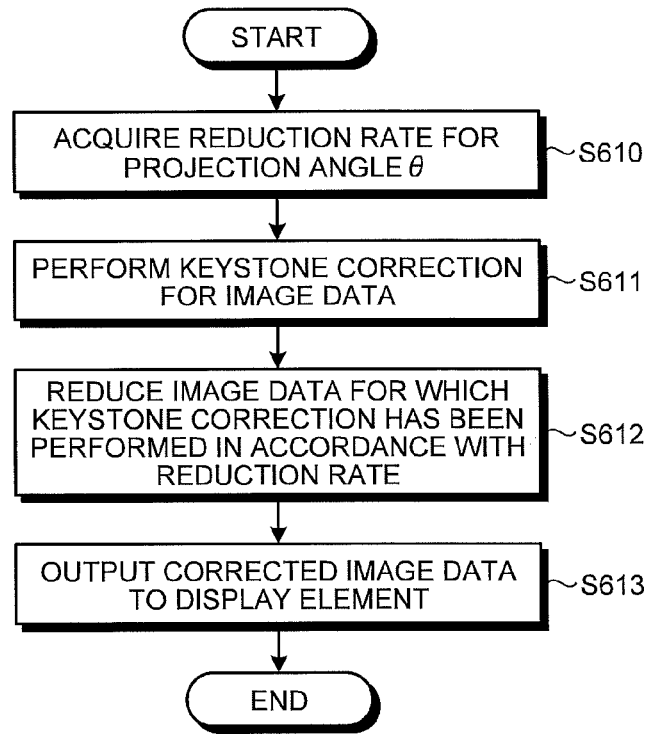
FIG. 47 is a flowchart that illustrates the flow of a keystone correction and a reduction process according to a modified example of the second embodiment.

FIG. 47 is a flowchart that illustrates the flow of the keystone correction and the reduction process according to the modified example of the second embodiment. The process according to the flowchart illustrated in FIG. 47 is included in the process of Step S508 represented in FIG. 44 described above.

The image processor 1102 acquires a reduction rate $R_W(\theta)$ for the projection angle $\theta$ acquired in Step S506 according to Equations (20) to (26) described above in Step S610. Actually, the image processor 1102 acquires a reduction rate $R_W(\theta')$ for the projection angle $\theta'$ acquired by correcting the projection angle $\theta$ using the reference angle $\theta_{ref}$. For example, the projection angle $\theta'$ is applied to the variable $\theta$ of the reduction rate $R_W(\theta)$ acquired by using Equations (20) to (26).

In the next Step S611, the image processor 1102 performs a keystone correction according to the projection angle $\theta'$ for image data supplied from the image cutting-out unit 1100. In the next Step S612, the image processor 1102 performs a reduction process according to the reduction rate $R_W(\theta')$ for the image data for which the keystone correction has been performed in Step S611. The image processor 1102 performs the keystone correction of Step S611 in consideration of the reduction process of Step S612.

The processes of Steps S611 and S612 are performed by the image processor 1102 by using a predetermined area of the image memory 101. It is apparent that a memory that is dedicatedly used for image processing may be arranged in the image processor 1102.

Then, in the next Step S613, the image processor 1102 outputs the image data for which the reduction process and the keystone correction have been performed to the display element 114. The light, which is based on the image data, output from the display element 114 is projected onto the projection medium at the projection angle $\theta'$ from the projection lens 12. A projection image having the same size as the projection image at the time of being projected at the projection angle $\theta_{MIN}$ is projected onto the projection medium.

The processes of Steps S611 and S612 described above will be described more specifically with reference to FIGS. 48A and 48B. Here, by referring to FIG. 38 described above, the reference angle $\theta_{ref}=0°$, and the projection direction is perpendicular to the projection medium (the wall 3) at the projection angle $\theta=0°$. In addition, it is assumed that the distance up to the projection medium is shortest at the projection angle $\theta=90°$.

Figure 48A:
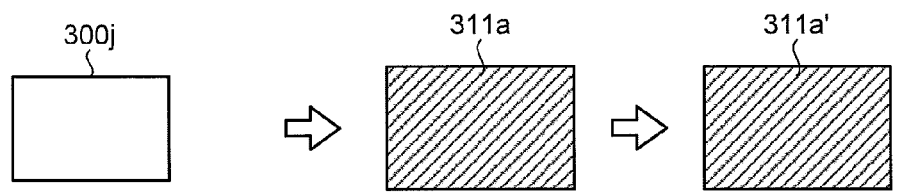
FIG. 48A is a diagram that illustrates the keystone correction and the reduction process according to the modified example of the second embodiment more specifically.
Figure 48B:
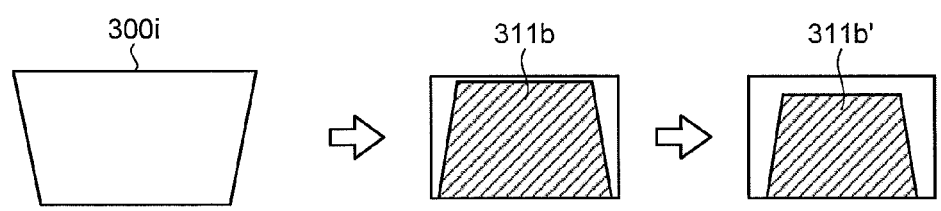
FIG. 48B is a diagram that illustrates the keystone correction and the reduction process according to the modified example of the second embodiment more specifically.

FIG. 48A illustrates an example of the image data projected onto the ceiling 4 with the projection angle $\theta=90°$ (=projection angle $\theta_{MIN}$) In addition, FIG. 48B illustrates an example of the image data projected onto the ceiling 4 with a projection angle $\theta_b$ that is smaller than the projection angle $\theta=90°$. Here, when the projection direction for the boundary 5 between the ceiling 4 and the wall 3 is the projection angle $\theta_M$, it is assumed that the projection angle $\theta_b$ satisfies $\theta_{MIN}>\theta_b>\theta_M$. In addition, the projection angle $\theta_b$ is corrected by using the reference angle $\theta_{ref}$.

In FIGS. 48A and 48B, examples of projection images 300j and 300i of a case where the keystone correction and the reduction process have not been performed are illustrated on the left side. In addition, in each of FIGS. 48A and 48B, an example of image data for which the keystone correction has been performed in Step S611 is illustrated at the center, and an example of image data for which the reduction process correction has been performed in Step S612 is illustrated on the right side.

In the example of the projection angle $\theta_{MIN}$ illustrated in FIG. 48A, in a case where the projection direction is perpendicular to the projection medium, and a trapezoidal distortion does not occur, the projection images 300j has a size that is the reference for the reduction process. Thus, the image processor 1102 does not perform the keystone correction of Step S611 and acquires image data 311a having a size and a shape coinciding with those of the original image data. In addition, a trapezoidal distortion does not occur in the image data 311a, the size coincides with the size of the original image data, and accordingly, the image processor 1102 does not perform a reduction process of Step S612. Accordingly, image data 311a' having the size and the shape coinciding with those of the image data 311a is supplied to the display element 114.

In the example of the projection angle $\theta_b$ illustrated in FIG. 48B, the projection direction is not perpendicular to the projection medium, and a trapezoidal distortion occurs, and the length W of the shorter side of a trapezoid according to a projection image is different according to the projection angle $\theta$. Thus, in this example of the projection angle $\theta_b$, it is necessary to perform the keystone correction of Step S611 and the reduction process of Step S612 for the image data supplied to the display element 114.

The image processor 1102 performs the keystone correction according to the projection angle $\theta_b$ by using an existing technology for image data supplied from the image cutting-out unit 1100 by the process of Step S611. The image data 311b for which the keystone correction has been performed has a trapezoidal shape in which the length of the upper base is reduced, the height is reduced according to the trapezoidal distortion, the length of the lower base is the same as the length of the lower base of an image according to the original image data, the length of the upper base is shorter than the length of the lower base, and the height is lower than the height of the image according to the original image data.

The image processor 1102 performs the reduction process of Step S612 for the image data 311b for which the keystone correction has been performed. In the projection image, based on Equation (26) described above, the length W of the shorter side of a trapezoid according to the trapezoidal distortion changes (grows) according to the projection angle $\theta_b$. Thus, the image processor 1102 acquires a reduction rate $R_W(\theta_b)$ using Equations (20) to (26). Then, the image processor 1102 performs a reduction process according to the reduction rate $R_W(\theta_b)$ in the horizontal and vertical directions for the image data 311b for which the keystone correction has been performed. Accordingly, in the embodiment, image data 311b' similar to the image data 310b' illustrated in FIG. 46B can be acquired.

In addition, the image processor 1102, in Step S611 described above, performs the keystone correction in consideration of the reduced size according to the reduction process performed in Step S612. For example, it may be considered to multiply the right side of Equation (26) applied to the case illustrated in FIG. 48B by a coefficient that is "1" at the projection angle $\theta=90°$ and changes according to the projection angle $\theta$.

As above, also according to the modified example of the embodiment, a projection image constantly having the same size and the same shape regardless of the projection angle $\theta$ can be acquired.

Method of Measuring Distance Common to Second Embodiment and Modified Example of Second Embodiment As described above, in the embodiment, it is necessary to acquire a shortest distance $r_{MIN}$ from the projector device 1b to the projection medium and a projection angle $\theta_{MIN}$ at which the distance $r_{MIN}$ is acquired. Hereinafter, regarding a method of measuring a distance that can be applied to be common to the embodiment and the modified example of the embodiment, two methods will be described.

First Distance Measurement Method

First, a first distance measurement method will be described. According to the first method, a distance from a projection medium is measured by using the distance sensor 60 while rotating the drum unit 10, whereby a change in the distance according to the projection angle $\theta$ is acquired. The distance measurement unit 1107 acquires a projection direction with respect to two intersections of the projection media intersecting the projection direction, which is perpendicular to the projection medium, based on an inflection point of the change in the distance and acquires projection angles $\theta$ of such projection directions.

Figure 49:
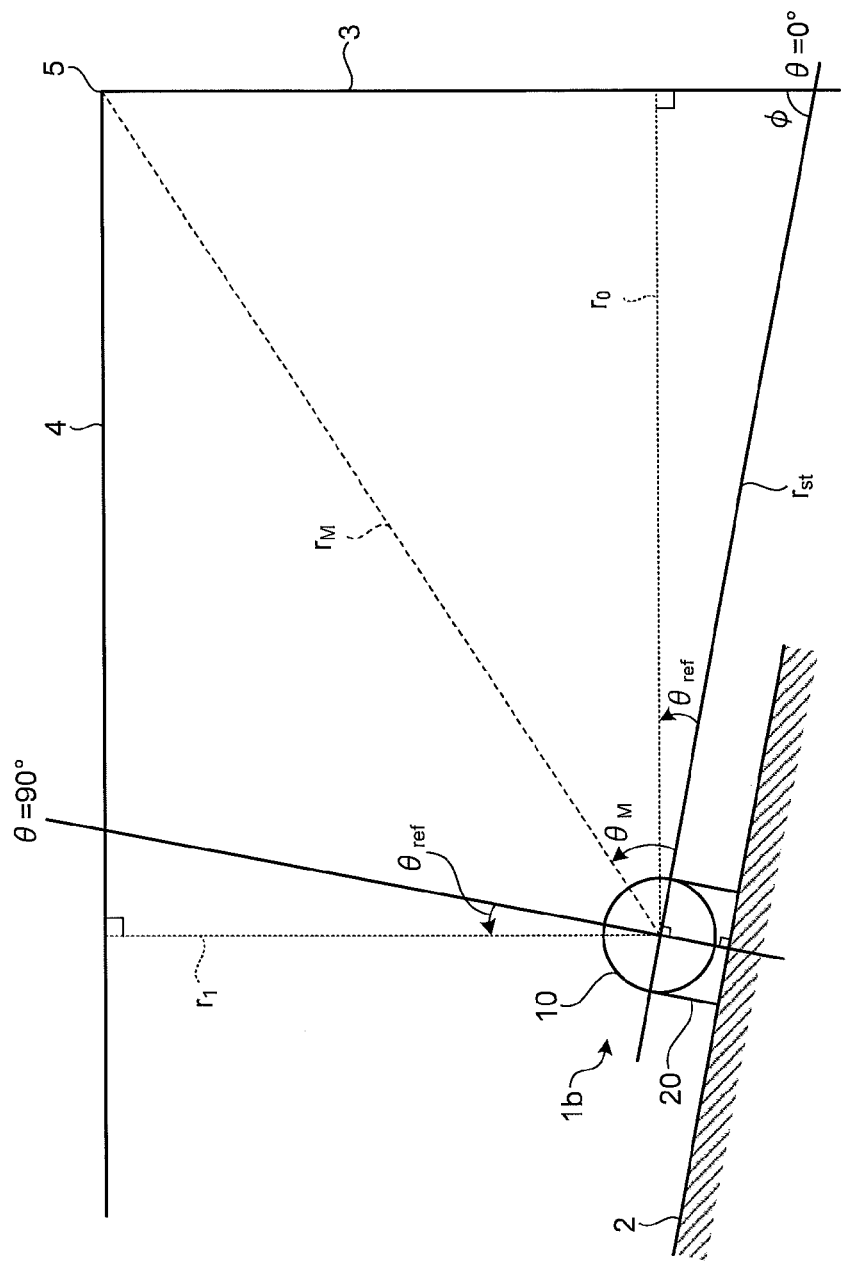
FIG. 49 is a diagram that illustrates a first distance measurement method that can be applied to be common to the second embodiment and the modified example of the second embodiment.

The description will be presented with reference to FIG. 49. FIG. 49 illustrates a case where the base 2 on which the projector device 1b is disposed is inclined with respect to the horizontal direction in the negative direction of rotation of the drum unit 10. In such a state, for example, while the drum unit 10 of the projector device 1b is rotated from the projection angle $\theta=0°$ in the counterclockwise direction, distances up to the wall 3 and the ceiling 4 that are projection media are measured by using the distance sensor 60. The distance measurement unit 1107 acquires a distance r at a projection angle $\theta$ based on a detection signal output from the distance sensor 60 and angle information supplied from the rotation control unit 104. In the example illustrated in FIG. 49, acquisition of a distance $r_{st}$ at the projection angle $\theta=0°$ is illustrated.

In FIG. 49, a distance $r_0$ represents a distance of a case where the projection direction is perpendicular to the wall 3, and a distance $r_1$ represents a distance of a case where the projection direction is perpendicular to the ceiling 4. In addition, a distance $r_M$ is a distance at the boundary 5. As can be understood from FIG. 49, since the projector device 1b is inclined in the negative direction of the rotation of the drum unit 10, the distance $r_{st}$ is longer than the distance $r_0$. In addition, an angle formed by the projection direction of a case where the projection angle $\theta=0°$ and the projection direction perpendicular to the wall 3 is denoted as angle $\theta_{ref}$, and a projection direction at the projection angle $\theta_M$ coincides with the boundary 5.

For example, the distance measurement unit 1107 takes in a detection signal output from the distance sensor 60 for every predetermined interval of the angle (the projection angle $\theta$) represented by the angle information supplied from the rotation control unit 104 and calculates a distance r based on the detection signal that has been taken in. Then, an inflection point of a change of the calculated distance r according to the projection angle $\theta$ is acquired. In the example illustrated in FIG. 27, a distance r up to the wall 3 approximately changes according to the reciprocal of cos $\theta$ with respect to the projection angle $\theta$. In addition, a distance r up to the ceiling approximately changes according to the reciprocal of sin $\theta$ with respect to the projection angle $\theta$.

Figure 50:
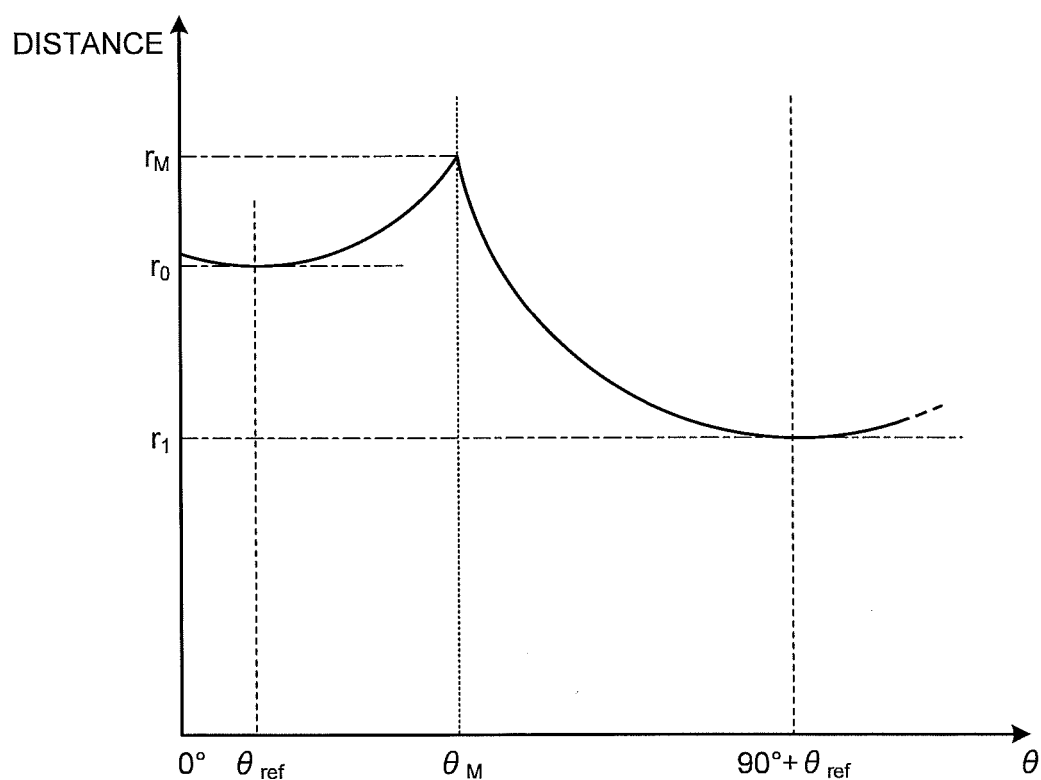
FIG. 50 is a diagram that schematically illustrates a change in the distance r with respect to the projection angle θ that can be applied to be common to the second embodiment and the modified example of the second embodiment.

FIG. 50 schematically illustrates a change in the distance r with respect to the projection angle $\theta$ in the example illustrated in FIG. 49. The distance r gradually decreases from the projection angle $\theta=0°$ according to the reciprocal of cos $\theta$, the distance r up to the wall 3 is shortest (distance $r_{MIN}$) at a point at which the projection direction is perpendicular to the wall 3, and thereafter, the distance r increases.

Accordingly, this projection direction corresponds to an inflection point of the change in the distance r. This inflection point is an inflection point of a downward projection. The distance measurement unit 1107 detects the inflection point of the downward projection based on a change in the distance r and acquires a projection angle $\theta_{ref}$ corresponding to the detected inflection point.

When the projection angle $\theta$ is increased from the inflection point, a measurement point for the wall 3 of the distance r is moved upward and arrives at the boundary 5 between the wall 3 and the ceiling 4. At this boundary 5, the direction of the change in the distance r changes, and, when the projection angle $\theta$ is further increased, the distance r gradually decreases according to the reciprocal of sin $\theta$. Accordingly, the projection angle $\theta_M$ at which the projection direction corresponds to the boundary 5 is an inflection point of the distance r. This inflection point is an inflection point of an upward projection. The distance measurement unit 1107 detects the inflection point of the upward projection based on a change in the distance r and acquires a projection angle $\theta_M$ corresponding to the detected inflection point.

After the boundary 5, the distance r gradually decreases according to an increase in the projection angle $\theta$, the distance r up to the ceiling 4 is shortest (distance $r_1$) at a point at which the projection direction is perpendicular to the ceiling 4, and thereafter, the distance r increases. Accordingly, this projection direction is an inflection point of the change in the distance r. This inflection point, similar to the inflection point at the projection angle $\theta_{ref}$ described above, is an inflection point of a downward projection. The distance measurement unit 1107 detects the inflection point of the downward projection based on a change in the distance r. When the angle formed by the wall 3 and the ceiling 4 is 90°, a projection angle $\theta$ corresponding to the inflection point of the downward projection detected here is 90°+$\theta_{ref}$.

As above, based on a result of the distance measurement performed according to the rotation of the drum unit 10, the distance measurement unit 1107 detects two inflection points of downward projections and one inflection point of the upward projection and acquires projection angles $\theta$ corresponding thereto. For example, the distance measurement unit 1107 performs the inflection point detecting operation described above as an initial operation at the time of start-up of the projector device 1b and acquires projection angles $\theta$ at the inflection points in advance. However, the operation is not limited thereto, but the inflection point detecting operation described above may be performed according to a user's operation for the operation unit 14.

The distance measurement unit 1107 acquires distances up to the projection medium for inflection points of the downward projections acquired as above and selects a shortest distance $r_{MIN}$ from among the acquired distances. In addition, the distance measurement unit 1107 acquires a projection angle $\theta_{MIN}$ corresponding to the inflection point for which the shortest distance $r_{MIN}$ is acquired. The distance measurement unit 1107 transmits the distance $r_{MIN}$ and the projection angle $\theta_{MIN}$ acquired as above to the image processor 1102.

In addition, when an image according to actual image data is projected, the distance measurement unit 1107, for example, corrects angles represented in the angle information output from the rotation control unit 104 by using the projection angle $\theta_{ref}$ acquired in advance and transmits a resultant angle to the image processor 1102 as a projection angle $\theta'$ representing the projection direction.

In addition, as described above with reference to FIG. 38, the direction of a trapezoidal distortion of the projection image changes between before and after the projection directions corresponding to the projection angles $\theta$=−90°, 0°, and 90° and the boundaries 5 and 7. Thus, the image processor 1102 needs to change the side used as the reference for the keystone correction to the upper base and the lower base of the trapezoidal shape before and after such projection directions.

Thus, the distance measurement unit 1107 transmits information representing the side used as the reference for the keystone correction to the image processor 1102 together with the projection angle $\theta'$ based on the angles represented in the angle information output from the rotation control unit 104 and the projection angle $\theta$ corresponding to each inflection point acquired in advance. The image processor 1102 performs the keystone correction for the image data based on the projection angle $\theta'$ and the information representing the side used as the reference.

In addition, the distance measurement unit 1107 transmits the projection angle $\theta'$ described above also to the image control unit 1103. The image control unit 1103 designates an image area to be cut out by the image cutting-out unit 1100 in accordance with the projection angle $\theta'$.

Figure 51:
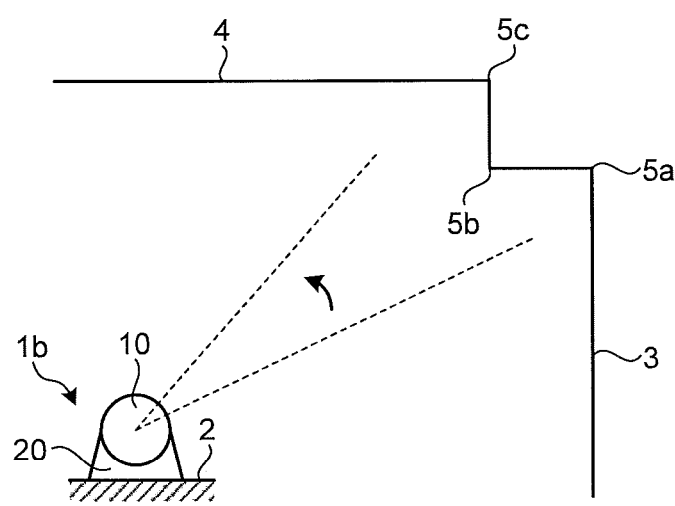
FIG. 51 is a diagram illustrating that the first distance measurement method can respond also to a case where a plurality of boundaries are included that can be applied to be common to the second embodiment and the modified example of the second embodiment.

In the description presented above, while an example in which there is only one boundary 5 between the wall 3 and the ceiling 4 has been described, this first distance measurement method can respond to a case where a plurality of boundaries such as boundaries 5a, 5b, and 5c illustrated in FIG. 51 are included. For example, by differentiating the change in the projection angle $\theta$ of the distance r, an inflection point corresponding to the projection angle $\theta$ for which the projection direction is perpendicular to the projection medium and inflection points corresponding to the boundaries 5a, 5b, and 5c can be discriminated from each other.

Figure 52:
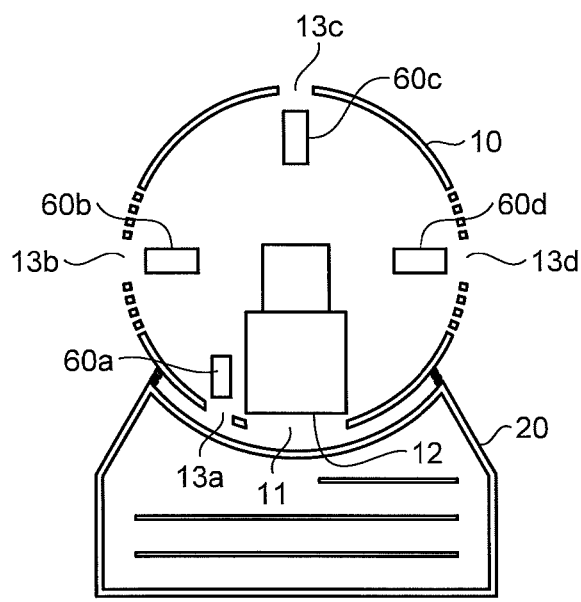
FIG. 52 is a diagram that illustrates an example, in which a plurality of distance sensors are arranged in the drum unit, relating to the first distance measurement method that can be applied to be common to the second embodiment and the modified example of the second embodiment.

In addition, in the description presented above, while one distance sensor 60 is disposed in the drum unit 10, the number of distance sensors is not limited to this example. In other words, as illustrated in FIG. 52 as an example, a plurality of distance sensors 60a, 60b, 60c, and 60d may be disposed in the drum unit 10. In the example illustrated in FIG. 52, four distance sensors 60a, 60b, 60c, and 60d are disposed at an angle interval of 90° in the drum unit 10, and window portions 13a, 13b, 13c, and 13d are disposed in correspondence with the distance sensors 60a, 60b, 60c, and 60d. In a case where only one distance sensor 60 described above is used, when each inflection point is detected, it is necessary to rotate the drum unit 10, for example, in an angle range of 270° from the projection angle $\theta$=−90° of the initial state to the projection angle $\theta$=180°. In contrast to this, in the example illustrated in FIG. 52, distance measurement of the entire periphery of 360° can be covered by rotation of the drum unit 10 at most in an angle range of 90°, and accordingly, each inflection point can be acquired at a higher speed. It is apparent that the number of the distance sensors 60 is not limited to four, but the number of distance sensors may be two or three, or five or more, and the interval of each distance sensor 60 is not limited to 90°.

Second Distance Measurement Method

Next, a second distance measurement method will be described. In the second distance measurement method, distances up to two arbitrary points on a projection medium are measured by using the distance sensor 60. Then, based on the measured distances of the two points and an angle formed by projection directions for the two points, a projection angle $\theta_{ref0}$ for which the projection direction is perpendicular to the projection medium is acquired.

Figure 53:
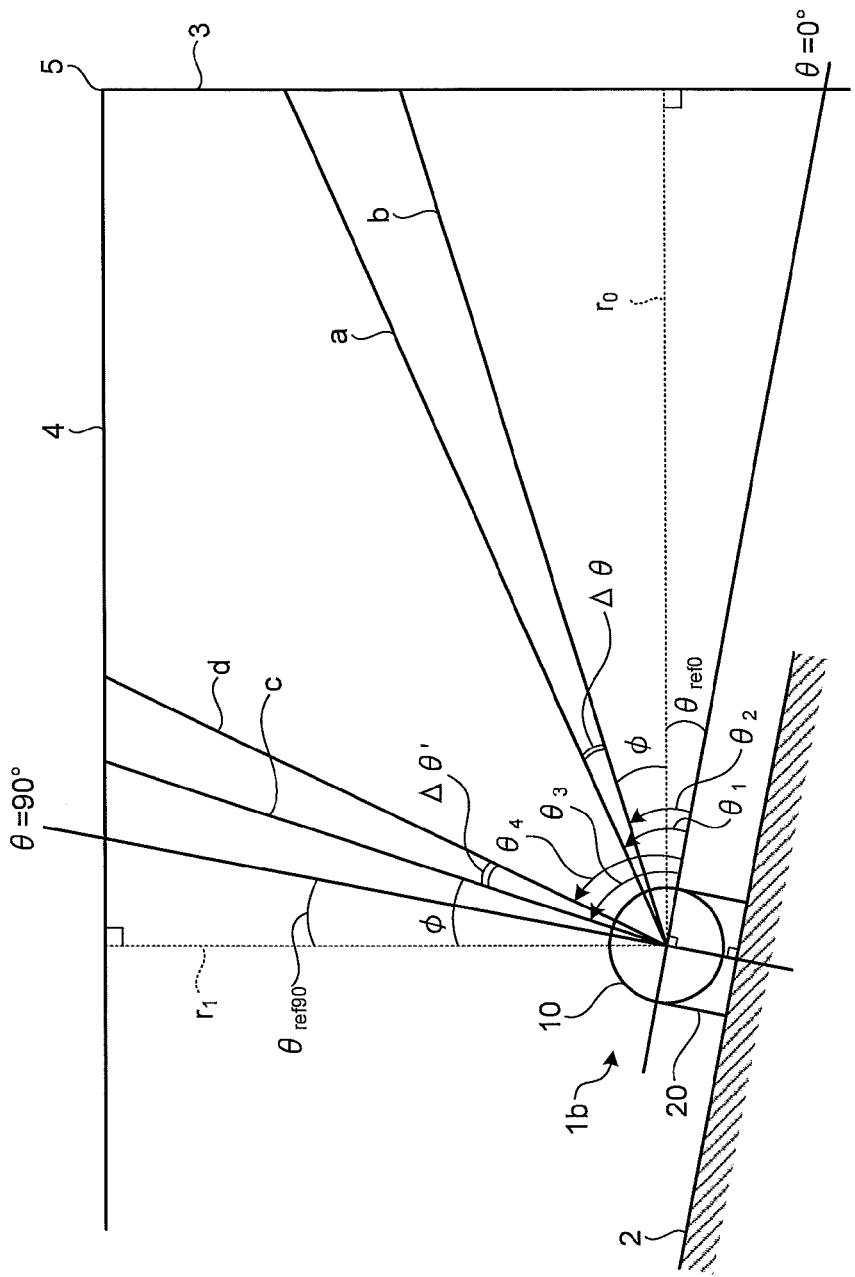
FIG. 53 is a diagram that illustrates a second distance measurement method that can be applied to be common to the second embodiment and the modified example of the second embodiment.

A more specific description will be presented with reference to FIG. 53. The installation state and the like of the projector device 1b are similar to those illustrated in FIG. 49 described above. First, the distance measurement unit 1107 measures a distance a based on a detection signal acquired by the distance sensor 60 for an appropriate projection angle $\theta_1$ for which the projection direction faces the wall 3. Next, the distance measurement unit 1107 measures a distance b for a projection angle $\theta_2$ other than the projection angle $\theta_1$. In addition, the distance measurement unit 1107 calculates a differential angle $\Delta\theta$ between the projection angle $\theta_1$ and the projection angle $\theta_2$.

In addition, the rotation of the drum unit 10 for the projection angles $\theta_1$ and $\theta_2$, for example, is designated by a user operating the operation unit 14 while checking the projection direction. However, the designation is not limited thereto, but the rotation may be designated by the distance measurement unit 1107 at predetermined timing such as the timing of an initial operation.

The distance measurement unit 1107 acquires a differential angle $\psi$ between the projection angle $\theta_2$ and the projection angle $\theta_{ref0}$ (first direction) for which the projection direction is perpendicular to the projection medium by using the acquired distances a and b and the angle $\Delta\theta$.

First, when a distance up to the projection medium (the wall 3) for the projection angle $\theta_{ref0}$ is $r_0$, the following Equations (27) and (28) are satisfied for the distances a and b.

$$r_0 = a \times \cos \psi \quad (27)$$

$$r_0 = b \times \cos(\Delta\theta + \psi) \quad (28)$$

By applying an addition theorem to the right side of "$a \times \cos \psi = b \times \cos(\Delta\theta + \psi)$", the following Equation (29) is acquired, and, by solving Equation (19) with respect to the distance a, Equation (30) is acquired.

$$a \times \cos \psi = b(\cos \Delta\theta \cos \psi - \sin \Delta\theta \sin \psi) \quad (29)$$

$$a = b \times \cos \Delta\theta - b \times \sin \Delta\theta \tan \psi \quad (30)$$

Based on Equation (30), the angle $\psi$ is acquired by using the following Equation (31). Then, as represented in Equation (32), by subtracting this angle $\psi$ from the projection angle $\theta_2$ for which the distance a is measured, the projection angle $\theta_{ref0}$ is calculated.

$$\psi = \arctan(\cot \Delta\theta - (a/b) \cdot \csc \Delta\theta) \quad (31)$$

$$\theta_{ref0} = \theta_2 - \psi \quad (32)$$

Also for the ceiling 4, the distance measurement unit 1107 similarly measures distances c and d up to two arbitrary points. In addition, a differential angle $\Delta\theta'$ of projection directions in which the distances c and d are measured is acquired based on the projection angles $\theta_3$ and $\theta_4$ for which the distances c and d are measured. Then, the distance measurement unit 1107 acquires a differential angle $\phi$ between the projection angle $\theta_3$ and the projection angle $\theta_{ref90}$ for which the projection direction is perpendicular to the projection medium by using the distances c and d and the angle $\Delta\theta'$ that have been acquired. By adding the acquired angle $\phi$ and the projection angle $\theta_3$, a projection angle $\theta_{ref90}$ (another first direction) is calculated. A method of calculating the projection angle $\theta_{ref90}$ is similar to that described using Equations (27) to (32), and thus, the description thereof will not be presented.

Figure 54:
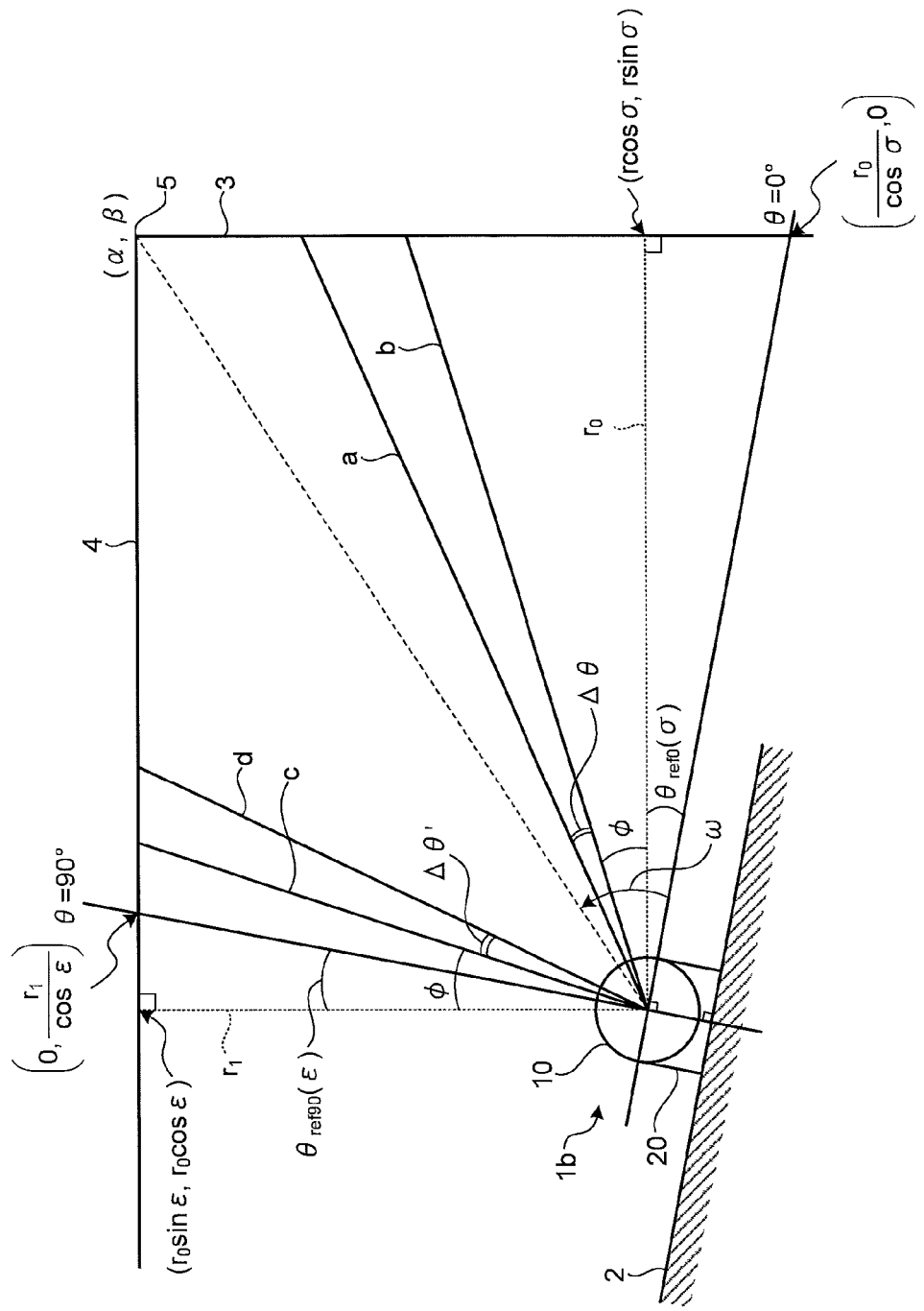
FIG. 54 is a diagram that illustrates a method of calculating a projection angle for a boundary between a wall and a ceiling according to the second distance measurement method that can be applied to be common to the second embodiment and the modified example of the second embodiment.

The distance measurement unit 1107 acquires a projection angle $\omega$ corresponding to the boundary 5 between the wall 3 and the ceiling 4. A method of calculating the projection angle $\omega$ will be schematically described with reference to FIG. 54. As the coordinate system, in a case where a coordinate system in which the projection direction of a projection angle $\theta=0°$ of the projector device 1b is set as the X axis, and the projection direction of a projection angle $\theta=90°$ is set as the Y axis is used, by acquiring coordinates ($\alpha$, $\beta$) of an intersection between a first line representing the wall 3 illustrated in FIG. 54 and a second line representing the ceiling 4, the projection angle $\omega$ can be calculated by using the following Equations (33) and (34). In Equations (33) and (34), a value $\gamma$ represents a distance from the origin (the rotation center of the drum unit 10) of the coordinate system to the coordinates ($\alpha$, $\beta$).

$$\gamma^2 = \alpha^2 + \beta^2 \quad (33)$$

$$\omega = \arccos(\alpha/\gamma) \quad (34)$$

Here, the first line is acquired based on first coordinates of an intersection between the projection direction of the projection angle $\theta=0°$ and the first line and second coordinates of an intersection between the projection direction of a projection angle $\theta_{ref0}$ that is perpendicular to the first line and the first line. In other words, the first and second coordinates are represented in the following Equations (35) and (36). In the following description, the projection angle $\theta_{ref0}$ is represented as an angle $\sigma$.

$$\text{First Coordinates} = (r_0/\cos \sigma, 0) \quad (35)$$

$$\text{Second Coordinates} = (r_0 \times \cos \sigma, r_0 \times \sin \sigma) \quad (36)$$

The first line corresponds to a linear function, and the coordinates of two points passing through the first line are known. Thus, by applying the coordinates to a two-point standard type of a linear function, the first line is represented in the following Equation (37). Here, a distance $r_0$, for example, is acquired as $r_0 = a \times \cos \theta_1$ by referring to FIG. 53.

$$y = -x \cot \sigma + r_0/\sin \sigma \quad (37)$$

Similarly, the second line is acquired based on third coordinates of an intersection between the projection direction of the projection angle $\theta=90°$ and the second line and fourth coordinates of an intersection between the projection direction of a projection angle $\theta_{ref90}$ that is perpendicular to the second line and the second line. In other words, the third and fourth coordinates are represented in the following Equations (38) and (39). In the following description, the projection angle $\theta_{ref90}$ is represented as an angle $\epsilon$.

$$\text{Third Coordinates} = (0, r_1/\cos \epsilon) \quad (38)$$

$$\text{Fourth Coordinates} = (r_1 \times \sin \epsilon, r_1 \times \cos \epsilon) \quad (39)$$

The second line corresponds to a linear function, and the coordinates of two points passing through the second line are known. Thus, by applying the coordinates to the two-point standard type of a linear function, the second line is represented in the following Equation (40). Here, a distance $r_1$, for example, is acquired as $r_1 = c \times \sin \theta_3$ by referring to FIG. 53.

$$y = -x \tan \epsilon + r_1/\cos \epsilon \quad (40)$$

Thus, based on Equations (37) and (40) described above, a value $\alpha$ and a value $\beta$ of the coordinates ($\alpha$, $\beta$) of an intersection between the first and second lines are acquired in the following Equations (41) and (42). By applying the values $\alpha$ and $\beta$ acquired using Equations (41) and (42) to Equations (33) and (34) described above, the projection angle ω of the projection direction corresponding to the boundary 5 is acquired.

$$\alpha = -(r_1 \times \sin \sigma - r_0 \times \cos \epsilon)/\cos(\sigma + \epsilon) \quad (41)$$

$$\beta = \{\cos \sigma \times (r_1 \times \sin \sigma - r_0 \times \cos \epsilon)\}/\{\sin \sigma \cos(\sigma + \epsilon)\} + r_0/\sin \sigma \quad (42)$$

The distance measurement unit 1107 acquires distances up to the projection medium for the projection direction that is perpendicular to the projection medium acquired as above and selects a shortest distance $r_{MIN}$ from among the acquired distances. In addition, the distance measurement unit 1107 acquires a projection angle $\theta_{MIN}$ corresponding to this shortest distance $r_{MIN}$. The distance measurement unit 1107 transmits the distance $r_{MIN}$ and the projection angle $\theta_{MIN}$ acquired as above to the image processor 1102.

Here, a method of changing the side that is used as the reference in the keystone correction by using the projection angles $\theta_{ref0}$ and $\theta_{ref90}$ and the projection angle w, a method of designating the image cut-out area, and the like are similar to those of the first distance measurement method described above, and the description thereof will not be presented here.

Third Embodiment

Next, a third embodiment will be described. According to the projector devices 1, 1a, and 1b described above, by emitting projection light to be perpendicular to the projection face of the projection medium, an optimal projection image can be acquired. Accordingly, generally, in a projection device, an adjustment mechanism used for adjusting the angle of projection light is arranged. However, it is considered to be difficult for a user to acquire an appropriate projection image by manually adjusting the projection angle. For example, in order to acquire an appropriate projection image, the user needs to manually adjust the projection angle while visually checking the posture of the projection device, the installation state of the projection medium, a projection image projected from the projection device to the projection medium. In order to acquire an appropriate projection image by using this method, a lot of time is necessary, and the user is required to have a corresponding technology. An object of the third embodiment is to provide a projector device capable of easily acquiring an appropriate projection image regardless of the posture of the projection device and the like.

In addition, the functional configuration of the projector device 1b according to the second embodiment described with reference to FIG. 43 may be applied to the third embodiment. The external appearance and the configuration of the projector device 1b applied to the third embodiment are similar to those of the first embodiment.

However, as described above with reference to FIG. 38, the direction of an increase in the distortion changes at predetermined projection directions ($\theta = -90°$, $90°$, and $0°$ and the boundaries 5 and 7 between the wall 3 and the ceiling 4 and the floor 6) as boundaries with respect to a monotonous increase in the projection angle $\theta$. Among such projection directions, the projection angles $\theta = -90°$, $90°$, and $0°$ correspond to projection directions that are perpendicular to the projection face of the projection medium, and, between before and after such projection directions, the direction of a change in the distance from the projection lens 12 to the projection medium with respect to the direction of the change in the projection angle $\theta$ changes. In addition, the boundaries 5 and 7 are portions at which the face of the projection medium is discontinuous, and, between before and after the projection directions, the direction of a change in the distance from the projection lens 12 to the projection medium with respect to the direction of the change in the projection angle $\theta$ changes.

Accordingly, between before and after the projection direction in which the direction of the change in the distance from the projection lens 12 to the projection medium with respect to the direction of the change in the projection angle $\theta$, it is necessary to change a horizontal correction coefficient and a vertical correction coefficient according to the keystone correction according to the projection direction. Hereinafter, the horizontal correction coefficient and the vertical correction coefficient will be collectively referred to as correction coefficients.

In other words, as the correction coefficients, a first correction coefficient of which the degree (hereinafter, referred to as the degree of distortion suppression) of suppression of horizontal and vertical distortions of a projection image increases according to an increase in the projection angle $\theta$ and a second correction coefficient of which the degree of distortion suppression decreases according to an increase in the projection angle $\theta$ are prepared in advance. The image processor 1102 performs a keystone correction for image data to be projected by performing switching between the first and second correction coefficients according to the projection angle $\theta$.

In addition, as the first correction coefficient and the second correction coefficient, the first correction coefficient $k(\theta, \beta)$ and the second correction coefficient $k_V(d_y)$ acquired using Equations (10) to (19) in the first embodiment described above may be used.

More specifically, for example, as the rotation of the drum unit 10 is started from the projection angle $\theta = -90°$, the image processor 1102 selects the first correction coefficient between the projection angle $\theta = -90°$ and the boundary 7, and the second correction coefficient is selected between the boundary 7 and the projection angle $\theta = 0°$. Next, the first correction coefficient is selected between the projection angle $\theta = 0°$ and the boundary 5, and the second correction coefficient is selected between the boundary 5 and the projection angle $\theta = 90°$. In addition, after the projection angle $\theta$, until a next boundary between the ceiling and the wall, the first correction coefficient is selected.

In a case where the first and second correction coefficients are selected according to the projection angle $\theta$ as described above, the projection directions for the projection angles $\theta = -90°$, $0°$, and $90°$ in the projector device 1b need to be perpendicular to the floor 6, the wall 3, and the ceiling 4 that are projection media. On the other hand, in a case where the projector device 1b is disposed to be inclined with respect to the rotation direction of the drum unit 10, such projection directions are not perpendicular to the floor 6, the wall 3, and the ceiling 4. In such a case, when the projection angle $\theta$ of the projector device 1b is used as a parameter of the projection angle $\theta$ included in the first and second correction coefficients, a correction other than the correction to be performed for the actual projection direction is performed.

In the third embodiment, a projection angle $\theta$ (=the projection angle $\theta_{ref}$) for which the projection direction of the projection lens 12 is perpendicular to the projection medium is acquired based on a distance from the projector device 1b to the projection medium that is measured using the distance sensor 60. In addition, based on the distance, a projection angle of an intersection of two projection media intersecting with each other such as the wall 3 and the ceiling 4, in other words, a projection angle for the boundary 5 between the wall 3 and the ceiling 4 is acquired. The image processor 1102, between before and after the acquired projection angle of the boundary 5, performs a keystone correction by performing switching between the first and second correction coefficients.

More specifically, the projector device 1b according to the third embodiment acquires the projection angle $\theta_M$ of the boundary 5 by using the first distance measurement method that is common to the second embodiment and the modified example of the second embodiment described above and performs the keystone correction by performing switching between the first and second correction coefficients between before and after the projection angle $\theta_M$. Alternatively, the projector device 1b according to the third embodiment acquires the projection angle ω of the boundary 5 by using the first distance measurement method that is common to the second embodiment and the modified example of the second embodiment described above and performs the keystone correction by performing switching between the first and second correction coefficients between before and after the projection angle ω.

Flow of Process of Performing Projection of Image Data

Figure 55:
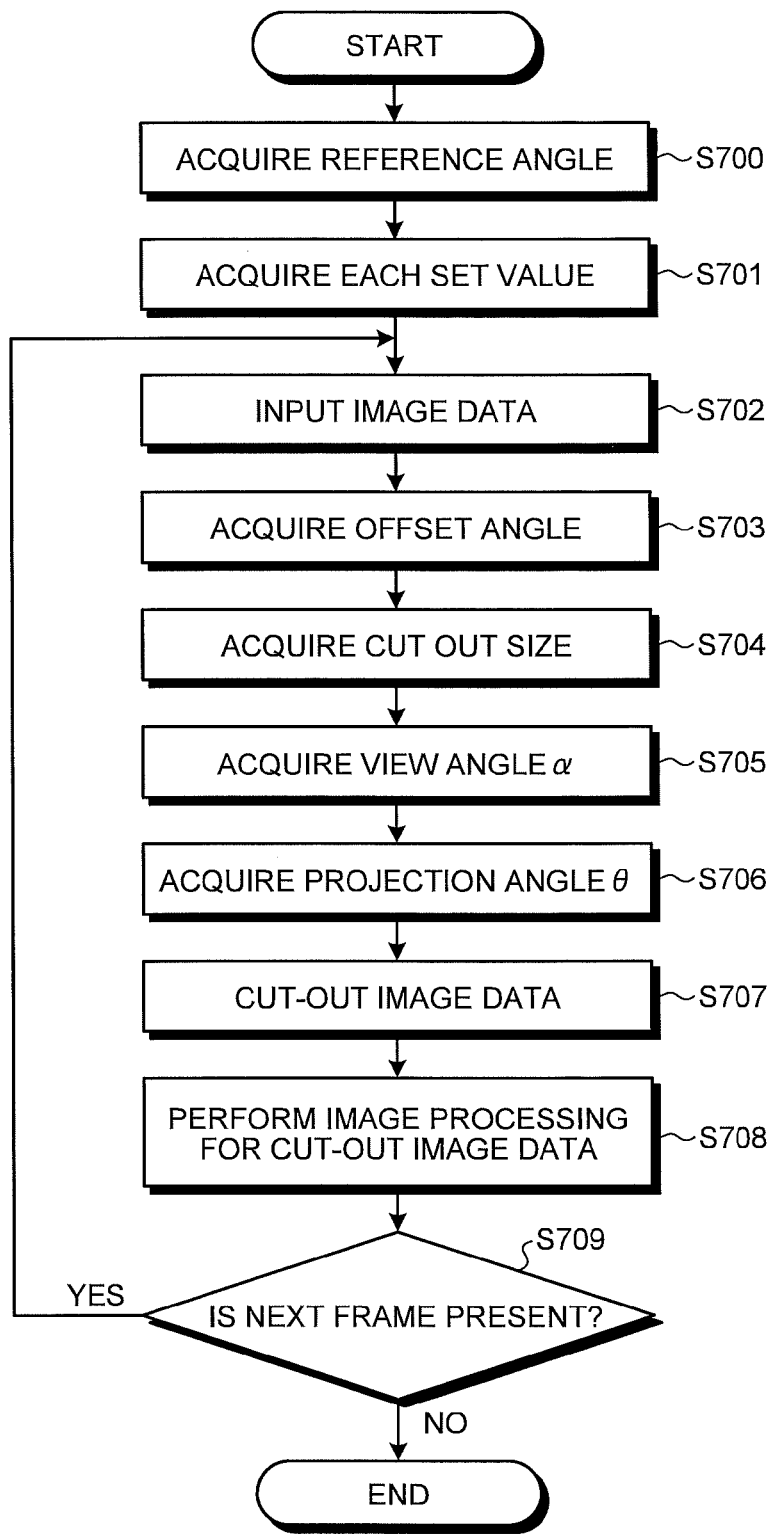
FIG. 55 is a flowchart that illustrates the flow of an image projection process performed by a projector device that can be applied to a third embodiment.

Next, the flow of the image projecting process performed by the projector device 1b according to the third embodiment will be described with reference to a flowchart illustrated in FIG. 55.

First, in Step S700, the distance measurement unit 1107 acquires a projection angle $\theta_{ref}$ or a projection angle $\theta_{ref0}$ for which the projection direction is perpendicular to the projection medium as a reference angle used at the time of performing the projection process by using the first distance measurement method or the second distance measurement method described above. In addition, at this time, the distance measurement unit 1107 also acquires a projection angle $\theta_M$ or a projection angle ω of a projection direction corresponding to the boundary of the projection medium. The operation of Step S700, for example, is performed as an initial operation of the projector device 1b. Hereinafter, the reference angle and the like will be described as being acquired by using the first distance measurement method.

In the next Step S701, in accordance with the input of image data, various set values relating to the projection of an image according to the image data are input to the projector device 1b. The input various set values, for example, are acquired by the CPU 1120. The various set values acquired here, for example, include a value representing whether or not the image according to the image data is rotated, in other words, whether or not the horizontal direction and the vertical direction of the image are interchanged, an enlargement rate of the image, and an offset angle $\theta_{ofst}$ at the time of projection. The various set values may be input to the projector device 1b as data in accordance with the input of the image data to the projector device 1b or may be input by operating the operation unit 14.

In the next Step S702, image data corresponding to one frame is input to the projector device 1b, and the input image data is acquired by the image cutting-out unit 1100. The acquired image data is written into the image memory 101.

In the next Step S703, the image control unit 1103 acquires the offset angle $\theta_{ofst}$. In the next Step S704, the image control unit 1103 acquires the cut out size, in other words, the size of the cut-out area of the input image data. The image control unit 1103 may acquire the size of the cut-out area from the set value acquired in Step S701 or may be acquired according to an operation for the operation unit 14. In the next Step S705, the image control unit 1103 acquires the view angle α of the projection lens 12. The image control unit 1103 acquires the view angle α of the projection lens 12, for example, from the view angle control unit 106.

In addition, in the next Step S706, the distance measurement unit 1107 acquires the projection angle θ of the projection lens 12, for example, from the rotation control unit 104. The distance measurement unit 1107 corrects the acquired projection angle θ by using the projection angle $\theta_{ref}$ that is the reference angle acquired in Step S700, thereby acquiring a projection angle θ'. This projection angle θ' is transmitted to the image processor 1102 and the image control unit 1103.

In the next Step S707, the image control unit 1103 acquires a cut-out area of the input image data by using Equations (3) to (8) described above based on the offset angle $\theta_{ofst}$, the size of the cut-out area, the view angle α, and the projection angle θ' corrected by the distance measurement unit 1107 that are acquired in Steps S703 to S706. The image control unit 1103 instructs the image cutting-out unit 1100 to read image data from the acquired cut-out area. The image cutting-out unit 1100 reads image data within the cut-out area from the image data stored in the image memory 101 according to an instruction transmitted from the image control unit 1103, thereby performing cutting out of the image data. The image cutting-out unit 1100 supplies the image data of the cut-out area read from the image memory 101 to the image processor 1102.

In Step S708, the image processor 1102 performs a size converting process, for example, by using Equations (1) and (2) described above for the image data supplied from the image cutting-out unit 1100. In addition, the image processor 1102 performs a keystone correction according to the projection angle θ' corrected by the distance measurement unit 1107 for the image data. At this time, the image processor 1102 selects a correction coefficient based on information representing one of the first and second correction coefficients to be used, which is supplied from the distance measurement unit 1107, and performs a keystone correction.

The image data for which the size converting process and the keystone correction have been performed by the image processor 1102 is supplied to the display element 114. The display element 114 modulates light supplied from the light source 111 based on the image data and emits the modulated light. The emitted light is projected from the projection lens 12.

In the next Step S709, the CPU 1120 determines whether or not there is an input of image data of the next frame of the image data input in Step S702 described above. In a case where it is determined that there is an input of the image data of the next frame, the CPU 1120 returns the process to Step S702 and performs the processes of Steps S702 to S708 described above for the image data of the next frame. In other words, the processes of Steps S702 to S708, for example, is repeated in units of frames of the image data according to the vertical synchronization signal VD of the image data. Thus, the projector device 1b can cause each process to follow a change in the projection angle θ in units of frames.

On the other hand, in Step S709, in a case where it is determined that the image data of the next frame has not been input, the CPU 1120 stops the image projecting operation of the projector device 1b. For example, the CPU 1120 performs control of the light source 111 to be in the Off state and instructs a rotation mechanism unit 105 to return the posture of the drum unit 10 to the initial posture. Then, after the posture of the drum unit 10 is returned to the initial posture, the CPU 1120 stops a fan that cools the light source 111 and the like.

As above, according to the projector device 1b, while the resolution of the image data is maintained, the user can perform image projection in which the position of a projected subject image can be easily checked in an image relating to the input image data.

Fourth Embodiment

Next, a fourth embodiment will be described. The output of an optical-type distance sensor (the distance sensor 60) disposed in the window portion 13 is not necessarily stable but minutely changes constantly due to the influence of an external disturbance, environments, or the like. Accordingly, also when the distance between the projection device and a projection medium is fixed, an in-focus distance according to automatic focusing minutely changes continuously by being reflected according to the change of the output of the distance measurement sensor. Such a minute change of the automatic focusing is not of a degree causing the external appearance of a projection image projected onto the projection medium to be discomfort.

Meanwhile, according to the continuous minute change of the automatic focusing, a focusing lens system included in a projection optical system is continued to be driven minutely, and wear or fatigue of a mechanical part such as a gear that drives the lens system is promoted. This becomes a factor that degrades the reliability of the device. In contrast to this, it may be considered to increase a margin of the output of the distance sensor so as to cause the minute change of the output of the distance sensor to be ignorable. However, in such a case, it is difficult to appropriately perform in-focusing according to automatic focusing, and there is concern that the external appearance of a projection image projected onto the projection medium becomes discomfortable. An object of the fourth embodiment is to appropriately control the automatic focusing performed in the projector device.

Internal Configuration of Projector Device According to Fourth Embodiment

Figure 56:
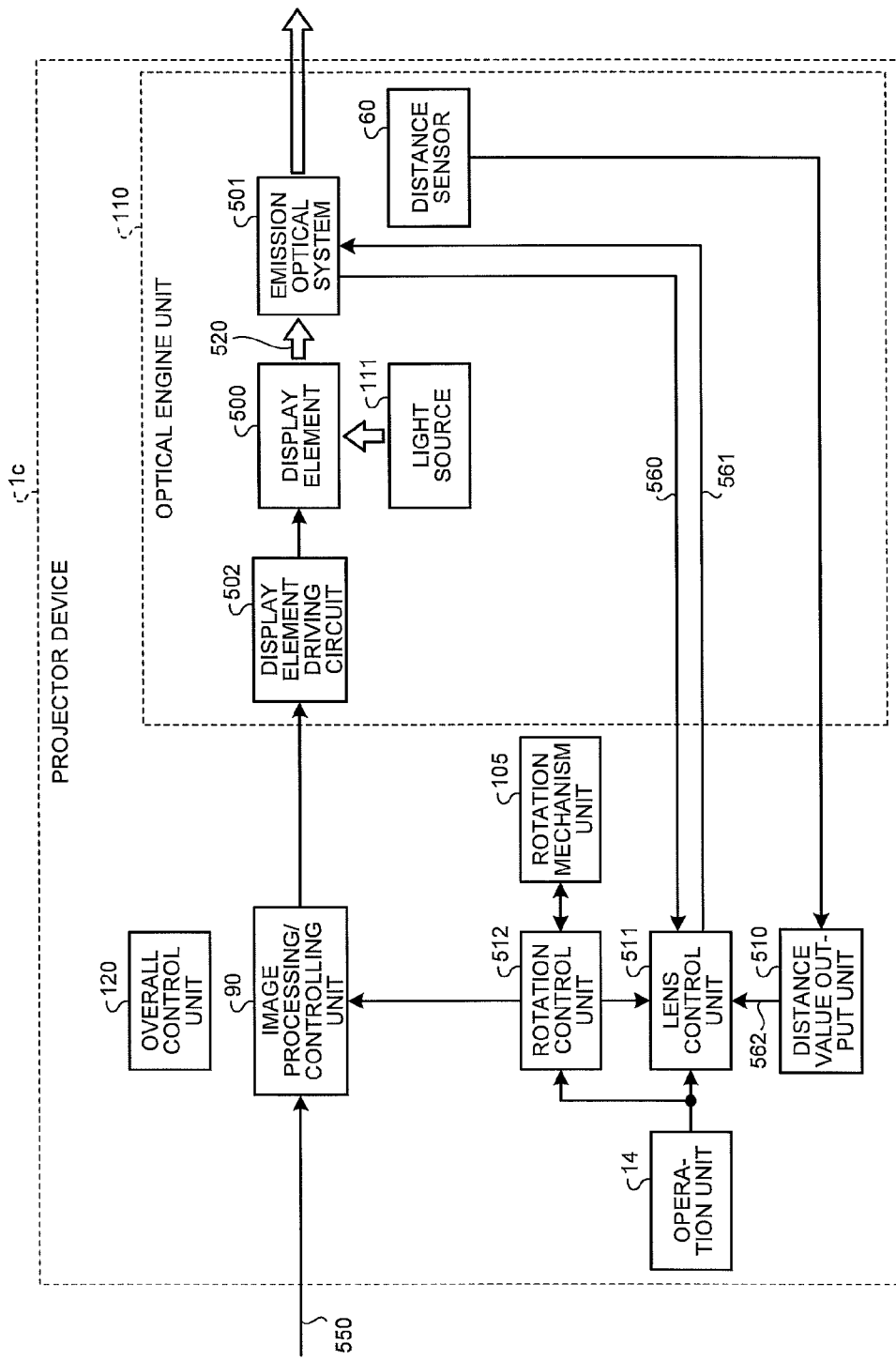
FIG. 56 is a block diagram that illustrates the configuration of an example of a circuit unit and an optical engine unit of a projector device according to a fourth embodiment.

FIG. 56 is a block diagram that illustrates an example of the functional configuration of a projector device 1c according to a fourth embodiment. In FIG. 56, the same reference numeral is assigned to a portion common to the configuration illustrated in FIGS. 4 and 43 described above, and detailed description thereof will not be presented. The external appearance and the structure of the projector device 1c according to the fourth embodiment are similar to those of the first embodiment.

As illustrated in FIG. 56, the drive system control unit 91 illustrated in FIG. 4 includes: a lens control unit 511; a rotation control unit 512; and a rotation mechanism unit 105. In the example illustrated in FIG. 56, while the output of an operation unit 14 is represented to be directly input to the lens control unit 511 and the rotation control unit 512, actually, the output of the operation unit 14 is supplied to an overall control unit 120, and the overall control unit 120 controls the lens control unit 511 and the rotation control unit 512 according to a user's operation for the operation unit 14.

As illustrated in FIG. 56, a distance value output unit 510 is arranged, and a detection signal output from the distance sensor 60 is supplied to the distance value output unit 510. The distance value output unit 510 outputs a distance value 562 representing a distance from the projection lens 12 to the projection medium based on the detection signal supplied from the distance sensor 60.

As illustrated in FIG. 56, an optical engine unit 110 includes: a light source 111; a display element 500; an emission optical system 501; and a display element driving circuit 502. The display element 500 configured, for example, by a transmission-type liquid crystal display device is driven by a display element driving circuit 502, modulates light of each of colors RGB based on image data, transmits the modulated light, and emits the light. In other words, the display element 500 and the display element driving circuit 502 correspond to the display element 114 illustrated in FIG. 4 and the like. The light 520 of the colors RGB, which is modulated based on the image data, emitted from the display element 500 is incident to the emission optical system 501 and is projected to the outside of the projector device 1c from the projection lens 12 included in the emission optical system 501.

Figure 57:
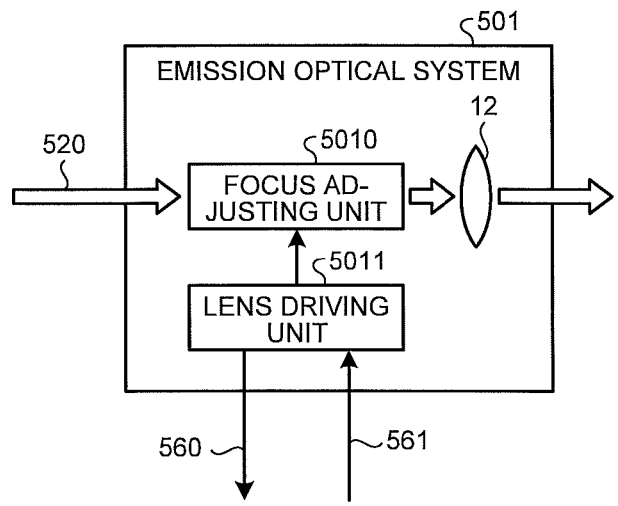
FIG. 57 is a block diagram that illustrates the configuration of an example of an emission optical system according to the fourth embodiment.

FIG. 57 is a block diagram that illustrates the configuration of an example of the emission optical system 501. The emission optical system 501 includes: the projection lens 12; a focus adjusting unit 5010; and a lens driving unit 5011. The focus adjusting unit 5010, for example, includes a plurality of combined lenses and adjusts the focus of light passing through it according to the driving of the lens driving unit 5011. The lens driving unit 5011, for example, drives some of the plurality of lenses included in the focus adjusting unit 5010 based on an in-focus control signal 561 and adjusts the focus of light passing through the focus adjusting unit 5010 for the projection medium. In addition, the lens driving unit 5011 outputs lens position information 560 that represents the position of a lens driven for adjusting the focus.

As described above, the optical engine unit 110 is disposed inside the drum unit 10 that can be rotated by the rotation mechanism unit 105. The rotation mechanism unit 105 includes the drive unit 32 described with reference to FIGS. 2A and 2B and a gear 35 that is a configuration of the drum unit 10 side and rotates the drum unit 10 by a predetermined amount by using the rotation of the motor. In other words, the projection direction of the projection lens 12 is changed by the rotation mechanism unit 105.

The image data 550 of a still image or a moving image is input to the projector device 1c and is supplied to the image processing/controlling unit 90. The image processing/controlling unit 90 performs image processing for the supplied image data as is necessary, stores the processed image data in a memory not illustrated in the figure, cuts out image data of an image area according to angle information, which is supplied from the rotation control unit 512, from the image data stored in the memory, performs image processing for the cut-out image data as is necessary, and outputs the processed cut-out image data. The image data output from the image processing/controlling unit 90 is supplied to the display element driving circuit 502, and the display element driving circuit 502 drives the display element 500 based on the image data.

The rotation control unit 512 instructs the rotation mechanism unit 105, for example, in accordance with a user's operation for the operation unit 14. In addition, the rotation mechanism unit 105 includes photo interrupters 51a and 51b. The rotation mechanism unit 105 controls the drive unit 32 in accordance with the instruction supplied from the rotation control unit 512 and controls the rotation operation of the drum unit 10 (the drum 30). For example, the rotation mechanism unit 105 generates a drive pulse in accordance with the instruction supplied from the rotation control unit 512, thereby driving the motor. The rotation control unit 512 generates an operation flag representing whether or not the drum unit 10 is in the middle of the rotation operation based on the drive pulse generated by the rotation mechanism unit 105.

Meanwhile, the outputs of the photo interrupters 51a and 51b and the drive pulse used for driving the motor are supplied from the rotation mechanism unit 105 to the rotation control unit 512. The rotation control unit 512, for example, counts the number of drive pulses using a counter, acquires detection timing of the protrusion 46a based on the output of the photo interrupter 51b, and resets the counted number of pulses at the detection timing of the protrusion 46a. The rotation control unit 512 sequentially acquires the angle of the drum unit 10 (the drum 30) based on the counted number of pulses. The angle information representing the angle of the drum unit 10 is supplied to the image processing/controlling unit 90.

A detection signal output from the distance sensor 60 is input to the distance value output unit 510. The distance value output unit 510 performs a distance measuring process based on the detection signal and derives a distance between the projection lens 12 and the projection medium. The distance value output unit 510 supplies a distance value 562 representing the derived distance to the lens control unit 511.

The lens control unit 511 generates an in-focus control signal 561 used for controlling the focus adjusting unit 5010 included in the emission optical system 501 by using the distance value 562 supplied from the distance value output unit 510 as a first distance value. In addition, the lens control unit 511 controls the generation of the in-focus control signal 561 by using the distance value supplied from the distance value output unit 510 as a second distance value.

The overall control unit 120 can exchange commands and data among the image processing/controlling unit 90, the distance value output unit 510, the lens control unit 511, the rotation control unit 512, and the operation unit 14 through a path not illustrated in the figure.

Figure 58:
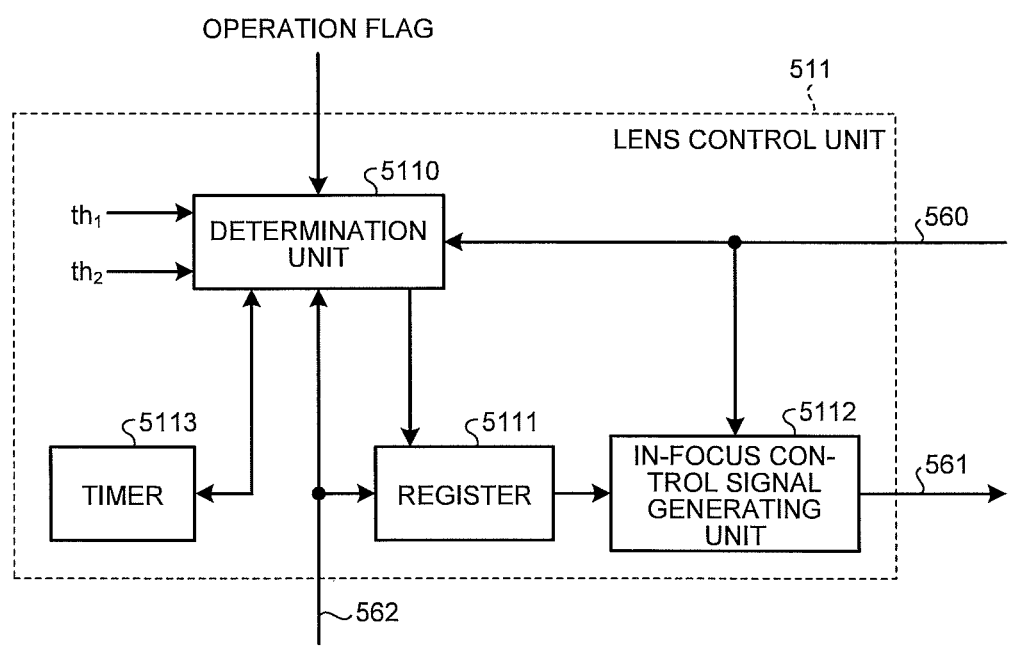
FIG. 58 is a block diagram that illustrates the configuration of an example of a lens control unit according to the fourth embodiment.

FIG. 58 illustrates the configuration of an example of the lens control unit 511. The lens control unit 511 includes: a determination unit 5110; a register 5111; an in-focus control signal generating unit 5112; and a timer 5113. The timer 5113 measures time under the control of the determination unit 5110.

To the lens control unit 511, the distance value 562 is input from the distance value output unit 510, and the lens position information 560 representing the current lens position $D_L$ is input from the lens driving unit 5011. The distance value 562 input to the lens control unit 511 is supplied to the in-focus control signal generating unit 5112 through the register 5111. The in-focus control signal generating unit 5112 uses the supplied distance value 562 for the process as the first distance value. In addition, the distance value 562 input to the lens control unit 511 is supplied to the determination unit 5110. The determination unit 5110 uses the supplied distance value 562 for the process as the second distance value. The lens position information 560 input to the lens control unit 511 is supplied to the determination unit 5110 and the in-focus control signal generating unit 5112. In addition, the operation flag representing whether or not the drum unit 10 is in the middle of the rotation operation is supplied to the determination unit 5110 from the rotation control unit 512.

The lens control unit 511 generates the in-focus control signal 561 used for controlling the focus adjusting unit 5010 included in the emission optical system 501 by using the distance value 562 supplied from the distance value output unit 510 as the first distance value. In addition, the lens control unit 511 controls the generation of the in-focus control signal 561 by using the distance value 562 supplied from the distance value output unit 510 as the second distance value.

The in-focus control signal generating unit 5112 generates the in-focus control signal 561 based on the lens position information 560 and the first distance value read from the register 5111. Here, the control of the focus adjustment performed by the focus adjusting unit 5010 will be schematically described with reference to FIG. 59. Here, the focus will be described to be adjusted by moving the lens 5130 forward or backward with respect to the projection direction among the plurality of lenses included in the focus adjusting unit 5010. The adjustment of the focus may be performed by moving a plurality of lenses including the lens 5130 with respect to the projection direction.

Figure 59:
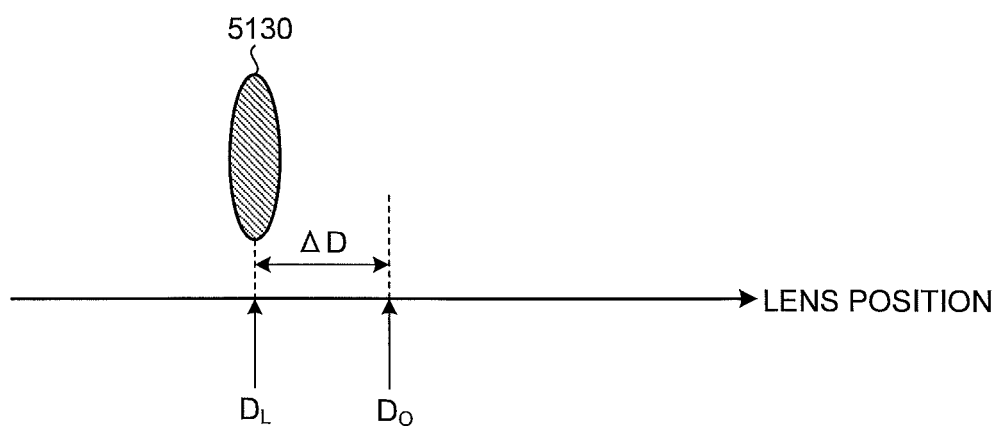
FIG. 59 is a diagram that schematically illustrates control of focus adjustment performed by a focus adjusting unit according to the fourth embodiment.

In FIG. 59, the horizontal axis represents a position along the projection direction of the lens 5130. A target position $D_O$ of the lens 5130 is set based on the distance value 562 output from the distance value output unit 510. This target position $D_O$ is a position at which an image projected from the projection lens 12 is in focus with the projection medium in a case where the lens 5130 is located at the position.

In a case where the current lens position $D_L$ of the lens 5130 is different from the target position $D_O$, a deviation $\Delta D$ of the current lens position $D_L$ from the target position $D_O$ occurs. The deviation $\Delta D$ is a value that represents a deviation on the projection medium from the in-focus state of an image projected from the projection lens 12. In other words, as the absolute value of the deviation $\Delta D$ decreases, a more in-focus state is formed. On the other hand, as the absolute value of the deviation $\Delta D$ increases, the state deviates more from the in-focus state. In order to cause the projection image to be in focus for the projection medium, the lens control unit 511 moves the position of the lens 5130 such that the deviation $\Delta D$ becomes zero.

More specifically, in the lens control unit 511, the in-focus control signal generating unit 5112 sets a first target position $D_{O\_1}$ according to the first distance value read from the register 5111. In addition, the in-focus control signal generating unit 5112 acquires the lens position information 560 representing the current lens position $D_L$ of the lens 5130 of the focus adjusting unit 5010 from the lens driving unit 5011.

The in-focus control signal generating unit 5112 calculates a first deviation $\Delta D_1$ based on the set first target position $D_{O\_1}$ and the current lens position $D_L$ represented in the acquired lens position information 560. Then, the in-focus control signal generating unit 5112 generates a drive control signal for moving the lens 5130 by the deviation $\Delta D$ and outputs the generated drive control signal as the in-focus control signal 561. The in-focus control signal 561 is input to the emission optical system 501 and is supplied to the lens driving unit 5011. The lens driving unit 5011 drives the focus adjusting unit 5010 based on the supplied in-focus control signal 561.

As above, the in-focus control signal generating unit 5112 and the lens driving unit 5011 configure a focus adjusting/driving unit that drives the focus adjusting unit 5010 in cooperation with each other.

The determination unit 5110 sets a second target position $D_{O\_2}$ based on the second distance value. The determination unit 5110 calculates a second deviation $\Delta D_2$ based on the second target position $D_{O\_2}$ and the current lens position $D_L$. In addition, a first value $th_1$ set as a threshold th and a second value $th_2$ that is larger than the first value $th_1$ are input to the determination unit 5110. For example, the first value $th_1$ and the second value $th_2$ are input from the overall control unit 120. However, the first value $th_1$ and the second value $th_2$ are not limited thereto but may be stored in a register not illustrated in the figure or the like in advance. In addition, the determination unit 5110 determines whether or not update of the register 5111 is performed based on the second deviation $\Delta D_2$ acquired based on the second target position $D_{0\_2}$ and the current lens position $D_L$, the operation flag, and the threshold th to which the first value $th_1$ or the second value $th_2$ is set. Then, the determination unit 5110 generates a register control signal used for controlling the update of the register 5111 based on a result of the determination. In other words, the determination unit 5110 serves as a control unit controlling whether or not the update of the register 5111 is performed. The determination process performed by the determination unit 5110 will be described later.

Here, while the image processing/controlling unit 90, the distance value output unit 510, the lens control unit 511, and the rotation control unit 512 have been described to be configured as separated hardware, the embodiment is not limited thereto. For example, all or some of the image processing/controlling unit 90, the distance value output unit 510, the lens control unit 511, and the rotation control unit 512 may be realized by a module of a program operating on the CPU as the function of the overall control unit 120.

Focus Adjusting Process According to Embodiment

Next, a focus adjusting process according to a fourth embodiment will be described. As described with reference to FIG. 59, in a case where the position of the lens 5130 is controlled such that the deviation $\Delta D$ becomes zero, the absolute value of the deviation $\Delta D$ is controlled so as to be the threshold th set in advance or less. In the fourth embodiment, a first value $th_1$ and a second value $th_2$ that is larger than the first value $th_1$ are prepared, and one of the first value $th_1$ and second value $th_2$ is set as the threshold th for the absolute value of the deviation $\Delta D$ depending on the condition.

Figure 60:
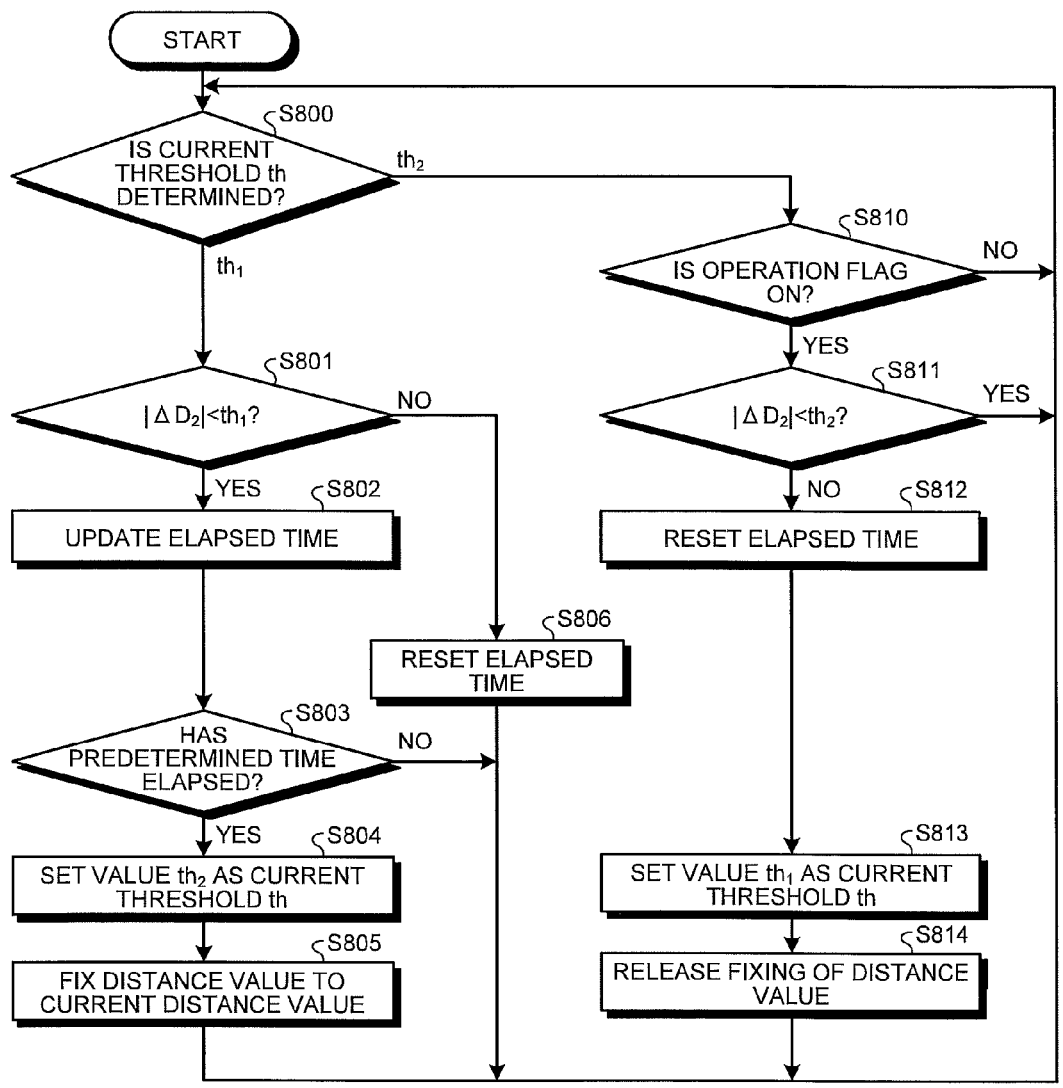
FIG. 60 is a flowchart that illustrates an example of a register control method used by a determination unit according to the fourth embodiment.

FIG. 60 is a flowchart that illustrates an example of a method of controlling the register 5111 that is executed by the determination unit 5110. Before the execution of the process of the flowchart represented in FIG. 60, the determination unit 5110 sets the first value $th_1$ as an initial value of the threshold th. In addition, the determination unit 5110 illustrated in FIG. 58 resets an elapsed time measured by the timer 5113 to zero.

In Step S800, the determination unit 5110 determines whether the current threshold th for the absolute value of the second deviation $\Delta D_2$ is the first value $th_1$ or the second value $th_2$. In a case where the current threshold th is determined to be the first value $th_1$, the determination unit 5110 causes the process to proceed to Step S801 and determines whether or not the absolute value of the second deviation $\Delta D_2$ is less than the first value $th_1$. In a case where the absolute value of the second deviation $\Delta D_2$ is determined to be the first value $th_1$ or more, the determination unit 5110 causes the process to proceed to Step S806, resets the elapsed time measured by the timer 5113 to zero, and returns the process to Step S800.

In a case where the absolute value of the second deviation $\Delta D_2$ is determined to be less than the first value $th_1$ in Step S801, the determination unit 5110 causes the process to proceeds to Step S802 and updates the elapsed time. Then, the determination unit 5110 determines whether or not the elapsed time exceeds the time set in advance in the next Step S803. In a case where the elapse time is determined not to exceed the time, the determination unit 5110 returns the process to Step S800.

On the other hand, in a case where the elapsed time is determined to exceed the time set in advance in Step S803, the determination unit 5110 causes the process to proceed to Step S804 and sets the second value $th_2$ as the current threshold th. Then, in the next Step S805, the determination unit 5110 generates a register control signal used for stopping the update of the register 5111 and supplies the generated register control signal to the register 5111. In accordance with this register control signal, the update of the content stored in the register 5111 is stopped, and the distance value (first distance value) used by the in-focus control signal generating unit 5112 for calculating the first deviation $\Delta D_1$ is fixed to the distance value 562 that is output from the distance value output unit 510 immediately before the stopping of the update of the register 5111. Then, the process is returned to Step S800.

In other words, in Step S803, in a case where the absolute value of the second deviation $\Delta D_2$ is maintained to be in the state of being less than the first value $th_1$, and the elapsed time exceeds the time set in advance, the position of the focus can be regarded not to change for a time determined in advance. In such a case, it can be supposed that the relation between the projection lens 12 and the projection medium is fixed. Thus, by fixing the first distance value used by the in-focus control signal generating unit 5112 for generating the in-focus control signal 561, the influence of swinging of the detection signal output from the distance sensor 60 on the focus adjustment can be removed, and a continuous minute change in the focus adjusting unit 5010 is suppressed.

In addition, in the process until Step S804, the second deviation $\Delta D_2$ calculated by the determination unit 5110 based on the second distance value and the current lens position $D_L$ and the first deviation $\Delta D_1$ calculated by the in-focus control signal generating unit 5112 based on the first distance value and the current lens position $D_L$ use the distance value 562 supplied from the distance value output unit 510 and have the same value. In Step S805, when the update of the distance value 562 in the register 5111 is stopped, the in-focus control signal generating unit 5112 calculates the first deviation $\Delta D_1$ based on the distance value 562 supplied before the stop of the update of the register 5111. In such a case, since the distance value 562 supplied to the in-focus control signal generating unit 5112 is not changed but can be regarded as a fixed value, the first deviation $\Delta D_1$ does not change as well. On the other hand, the determination unit 5110 calculates the second deviation $\Delta D_2$ according to a change in the distance value 562 directly supplied from the distance value output unit 510. For that reason, the second deviation $\Delta D_2$ changes also after Step S805.

In Step S800, when the current threshold th is determined to be the second value $th_2$, the determination unit 5110 causes the process to proceed to Step S810. In Step S810, the determination unit 5110 determines whether or not the operation flag representing whether or not the drum unit 10 is in the middle of the rotation operation is On, in other words, whether or not the drum unit 10 is in the middle of the rotation operation. The determination unit 5110, for example, can acquire the operation flag based on the drive pulse of the motor that is supplied from the rotation mechanism unit 105 to the rotation control unit 512.

In Step S810, in a case where it is determined that the operation flag is Off, in other words, the drum unit 10 is not in the middle of the rotation operation, the determination unit 5110 returns the process to Step S800.

On the other hand, in a case where the operation flag is determined to be On in Step S810, the determination unit 5110 causes the process to proceed to Step S811 and determines whether or not the absolute value of the second deviation $\Delta D_2$ is less than the second value $th_2$. In a case where the absolute value of the second deviation $\Delta D_2$ is determined to be less than the second value $th_2$, the determination unit 5110 returns the process to Step S800.

In Step S811, in a case where the absolute value of the second deviation $\Delta D_2$ is determined to be the second value $th_2$ or more, the determination unit 5110 causes the process to Step S812 and resets the elapsed time that is measured by the timer 5113 to zero.

Then, in the next Step S813, the determination unit 5110 sets the first value $th_1$ as the current threshold th and causes the process to proceed to Step S814. In Step S814, the determination unit 5110 generates a register control signal restarting the update of the register 5111 and supplies the generated register control signal to the register 5111. Accordingly, the fixing of the first distance value used by the in-focus control signal generating unit 5112 for calculating the first deviation $\Delta D_1$, which is performed in Step S805 described above, is released. In other words, the distance value 562 supplied from the distance value output unit 510 to the register 5111 is supplied to the in-focus control signal generating unit 5112 again and is used as the first distance value for the calculation of the first deviation $\Delta D_1$. Accordingly, the first deviation $\Delta D_1$ calculated by the in-focus control signal generating unit 5112 is updated in accordance with the distance value 562 output from the distance value output unit 510. When the determination unit 5110 restarts the update of the register 5111 and releases the fixing of the second distance value stored in the register 5111, the process is returned to Step S800. Accordingly, the focus adjustment at the first value $th_1$, which is performed in Step S801 and the subsequent steps, is restarted.

After Step S810, the process starting from Step S811 relates to the focus adjusting process in the middle of the rotation of the drum unit 10. In the middle of the rotation of the drum unit 10, the projection direction according to the projection lens 12 changes in accordance with the rotation of the drum unit 10, and a distance between the projection lens 12 and the projection medium changes in accordance with the change, and accordingly, it is necessary to constantly monitor the focus. Accordingly, in Step S811, at a time point at which the absolute value of the second deviation $\Delta D_2$ becomes the second value $th_2$ or more, the threshold th for the absolute value of the second deviation $\Delta D_2$ is changed to the first value $th_1$ of the initial value, and the fixing of the distance value 562 supplied to the in-focus control signal generating unit 5112 is released, and ordinary focus adjustment is performed.

On the other hand, in a case where the rotation of the drum unit 10 is minute, and the absolute value of the second deviation $\Delta D_2$ is less than the second value $th_2$, the first distance value used by the in-focus control signal generating unit 5112 is maintained to be fixed. Accordingly, there is no change in the first deviation $\Delta D_1$ calculated by the in-focus control signal generating unit 5112, and unnecessary movement of the focus adjusting unit 5010 is suppressed.

Another Example of Register Control Method Executed by Determination Unit

Figure 61:
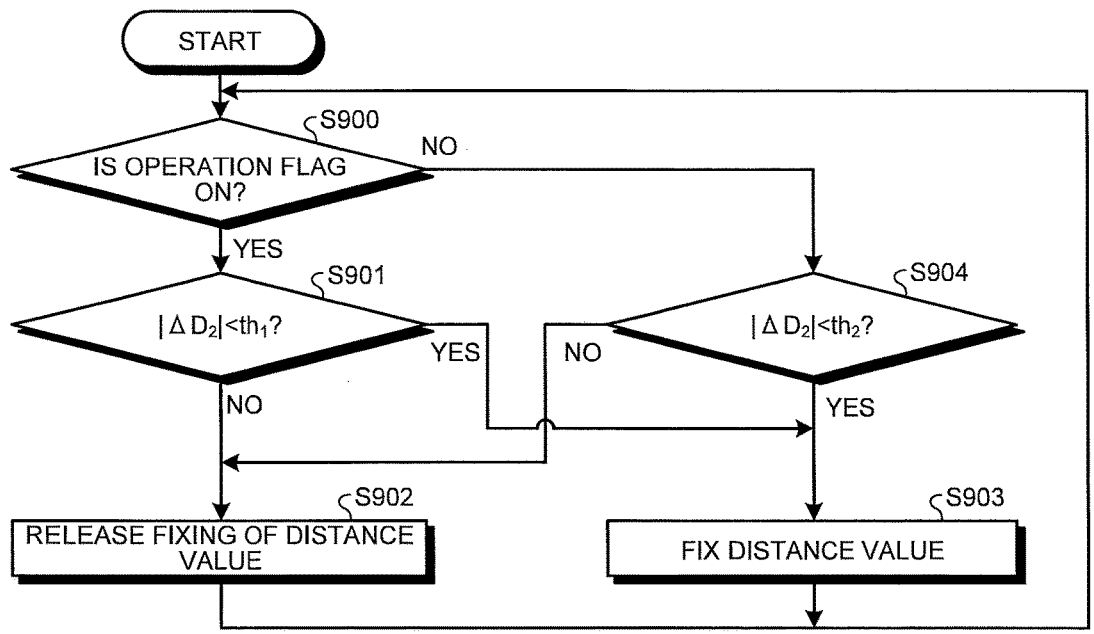
FIG. 61 is a flowchart that illustrates another example of a register control method used by the determination unit according to the fourth embodiment.

Next, another example of the method of controlling the register 5111 that is executed by the determination unit 5110 according to the fourth embodiment will be described. In this another example, the configurations described with reference to FIGS. 1A and 1B, FIGS. 2A and 2B, FIG. 3, and FIGS. 56 to 59 can be directly applied, and thus, detailed description thereof will not be presented here. FIG. 61 is a flowchart that illustrates another example of the method of controlling the register 5111 that is executed by the determination unit 5110.

In Step S900, the determination unit 5110 determines whether or not the operation flag representing whether or not the drum unit 10 is in the middle of the rotation operation is On, in other words, whether or not the drum unit 10 is in the middle of the rotation operation. In a case where the operation flag is determined to be On in Step S900, the determination unit 5110 causes the process to proceed to Step S901 and determines whether or not the absolute value of the second deviation $\Delta D_2$ is less than the first value $th_1$. In a case where the absolute value of the second deviation $\Delta D_2$ is determined to be less than the first value $th_1$, the determination unit 5110 causes the process to proceed to Step S903.

In Step S903, the determination unit 5110 generates a register control signal used for stopping the update of the register 5111 and supplies the generated register control signal to the register 5111. In accordance with this register control signal, the update of the content stored in the register 5111 is stopped, and the first distance value used by the in-focus control signal generating unit 5112 for calculating the first deviation $\Delta D_1$ is fixed to the distance value 562 that is output from the distance value output unit 510 immediately before the stop of the update of the register 5111. Then, the process is returned to Step S900.

In addition, in Step S903, in a case where the update of the register 5111 is stopped, the state is maintained, and the content stored in the register 5111 is maintained as it is.

In Step S901, in a case where the absolute value of the second deviation $\Delta D_2$ is determined to be the first value $th_1$ or more, the determination unit 5110 causes the process to proceed to Step S902. The determination unit 5110, in Step S902, generates a register control signal restarting the update of the register 5111 and supplies the generated register control signal to the register 5111. Accordingly, the fixing of the first distance value used by the in-focus control signal generating unit 5112 for calculating the first deviation $\Delta D_1$, which is performed in Step S903 described above, is released. Then, the process is returned to Step S900.

On the other hand, in a case where the operation flag is determined to be Off in Step S900 described above, the determination unit 5110 causes the process to proceed to Step S904. The determination unit 5110 determines whether or not the absolute value of the second deviation $\Delta D_2$ is less than the second value $th_2$ in Step S904. In a case where the absolute value of the second deviation $\Delta D_2$ is determined to be the second value $th_2$ or more, the determination unit 5110 causes the process to proceed to Step S902 described above, and the fixing of the first distance value is released.

On the other hand, in a case where the absolute value of the second deviation $\Delta D_2$ is determined to be less than the second value $th_2$ in Step S904, the determination unit 5110 causes the process to Step S903 described above and fixes the first distance value. Then, the process is returned to Step S900.

As above, also in this another example, similar to the example described with reference to FIG. 60, also in the middle of the rotation of the drum unit 10, in a case where the rotation of the drum unit 10 is minute, and the absolute value of the second deviation $\Delta D_2$ is fitted into the first value $th_1$, the first distance value used by the in-focus control signal generating unit 5112 is maintained to be fixed. Accordingly, there is no change in the first deviation $\Delta D_1$ calculated by the in-focus control signal generating unit 5112, and unnecessary movement of the focus adjusting unit 5010 is suppressed. In addition, according to the flowchart represented in FIG. 61, the control process can be realized with the number of steps less than that of the flowchart represented in FIG. 60.

As above, according to the fourth embodiment, the focus adjusting unit 5010 is appropriately controlled according to a change in the distance between the projection lens 12 and the projection medium and with or without rotation of the drum unit 10 and the magnitude thereof. Accordingly, wear or fatigue of the mechanical portion of the focus adjusting unit 5010 is suppressed, and a situation in which the external appearance of a projection image projected onto the projection medium is discomfort can be prevented.

Modified Example of Fourth Embodiment

In the description presented above, while the value representing a deviation of the image, which is projected from the projection lens 12, from the in-focus state on the projection medium is acquired based on the distance between the projection lens 12 and the projection medium, the method of acquiring the value is not limited thereto. Thus, the value representing a deviation from the in-focusing may be acquired by using another method. For example, the degree of in-focusing may be acquired based on an image projected onto the projection medium. In such a case, the distance sensor 60 is replaced with an imaging device such as a charge coupled device (CCD), a complementary metal oxide semiconductor (CMOS), or an imager, and the distance value output unit 510 is replaced with an analysis unit. Based on a result of the analysis of a captured image that is performed by the analysis unit, the lens control unit 511 acquires the value representing a deviation from the in-focus state. For example, the lens control unit 511 may use a method of acquiring a deviation from the in-focus state based on the contrast of an image or a method of acquiring a deviation from the in-focus state based on a phase difference of light that is divided into two parts and is incident to the imaging device.

In addition, two or more of the first to fourth embodiments described above may be combined together.

According to the present invention, a projection device, an image correction method, and a program capable of effectively using a pixel area displayable in a display device can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection device comprising:
 a projection unit including a display element in which a plurality of pixel lines each formed by a plurality of pixels arranged in a first direction are arranged in a second direction perpendicular to the first direction and an optical system that projects light emitted from the display element and projecting an image based on input image data;
 a first correction unit generated on a main storage device and configured to correct a first direction scale of each line data of the image data that corresponds to each of the pixel lines based on a position of the each of the pixel lines in the second direction in the display element and a second-direction component of inclination of a projection direction of the projection unit with respect to a normal line of a projection face onto which the image is projected;
 a second correction unit generated on the main storage device and configured to correct a second direction scale of each pixel data of the image data after the correction performed by the first correction unit based on a position of each pixel in the second direction in the display element and the second-direction component of the inclination of the projection direction of the projection unit with respect to the normal line of the projection face onto which the image is projected;
 an image cutting-out unit realized by a module of a program operating on a CPU and configured to cut-out image data of an area, which is projected from the projection unit, of the image data after the correction performed by the second correction unit and input the image data of the area to the projection unit;
 a first correction control unit generated on the main storage device and configured to calculate a first correction coefficient used for correcting the first direction scale of each line data of the image data that corresponds to each of the pixel lines based on a position of the each of the pixel lines in the second direction in the display element and the second-direction component of the inclination of the projection direction of the projection unit with respect to the normal line of the projection face onto which the image is projected; and
 a second correction control unit generated on the main storage device and configured to calculate a second correction coefficient used for correcting the second direction scale of each pixel data in the second direction in the image data after the correction performed by the first correction unit based on a position of the each pixel in the second direction in the display element and the second-direction component of the inclination of the projection direction of the projection unit with respect to the normal line of the projection face onto which the image is projected,
 wherein the first correction unit is configured to correct the first direction scale of each line data of the image data that corresponds to each of the pixel lines by using the first correction coefficient calculated by the first correction unit, and
 wherein the second correction unit is configured to correct the second direction scale of each pixel data in the second direction by using the second correction coefficient calculated by the second correction control unit.

2. The projection device according to claim 1, wherein the second correction control unit is configured to convert the position of each pixel in the second direction into an angle having a center axis of the projection unit in the projection direction as a reference and calculate the second correction coefficient corresponding to each pixel in accordance with the angle after the conversion.

3. The projection device according to claim 1, wherein the second correction control unit is configured to calculate the second correction coefficients for at least two pixels among the plurality of pixels, which are arranged in the second direction, of the image data after the correction performed by the first correction unit and calculate the second correction coefficient for another pixel among the plurality of pixels arranged in the second direction by performing linear interpolation of the second correction coefficients calculated for the at least two pixels.

4. The projection device according to claim 1, further comprising:
a distance value output unit realized by a module of the program operating on the CPU and configured to output a distance value representing a measured distance from the projection unit to the projection medium;
a focus adjusting unit that includes a plurality of lenses and configured to adjust a focus of light passing through the focus adjusting unit and the projection unit;
a focus adjusting/driving unit realized by a module of the program operating on the CPU and configured to detect a first deviation from an in-focus state of the light projected onto the projection medium by the projection unit based on a first distance value by using the distance value as the first distance value and drive the focus adjusting unit such that a value representing the first deviation becomes zero;
a determination unit realized by a module of the program operating on the CPU and configured to detect a second deviation from the in-focus state of the light based on a second distance value by using the distance value as the second distance value and determine whether or not a value representing the second deviation is less than a threshold; and
a focus adjusting/controlling unit realized by a module of the program operating on the CPU and configured to set the threshold of the determination unit to a second value larger than a first value and stop updating the first distance value of the focus adjusting/driving unit in a case where the determination unit determines that the threshold is the first value, and a state in which the value representing the second deviation is less than the first value is continued for a time set in advance.

5. The projection device according to claim 4, wherein the focus adjusting/controlling unit is configured to set the threshold value to the first value and restart updating of the first distance value in a case where the determination unit determines that the threshold is the second value, the projection direction of the projection unit is in the middle of being changed, and the value representing the second deviation is the threshold or more.

6. A projection device comprising:
a projection direction changing unit configured to change a projection direction of a projection lens and change a projection direction of a projection unit that converts image data into light and projects the light;
a projection direction acquiring unit realized by a module of a program operating on a CPU and configured to measure a distance up to a projection medium onto which the projection unit projects light and acquire a first projection direction in which the distance is the shortest;
a ratio acquiring unit configured to calculate a ratio between a size of a projection image on the projection medium that is projected in the first projection direction and a size of each projection image on the projection medium that is acquired by projecting an image according to the image data in each second projection direction using the projection unit; and
an image processor configured to perform a reduction process according to the ratio acquired by the ratio acquiring unit for the image data projected by the projection unit, wherein the ratio acquiring unit is configured to acquire the ratio based on the second projection direction, a distance up to the projection medium in the first projection direction, and a view angle according to the projection unit.

7. The projection device according to claim 6, wherein the image processor performs the reduction process for the image data and performs a trapezoidal distortion correction for the image data for which the reduction process is performed along the projection direction.

8. The projection device according to claim 6, wherein the projection direction acquiring unit is configured to detect first inflection points of downward projections in a change in the measured distance while changing the projection direction of the projection unit by using the projection direction changing unit and acquire a projection direction corresponding to the first inflection point, for which the distance is the shortest, among the detected first inflection points as the first projection direction.

9. The projection device according to claim 6, wherein the projection direction acquiring unit is configured to measure distances in two projection directions for each face of the projection medium for which the projection unit can perform projection, acquire third projection directions perpendicular to the projection medium up to which the distances are measured in the two projection directions based on the distances measured in the second projection directions and an angle formed by the two projection directions, and acquire a shortest third projection direction among the third projection directions for each face of the projection medium as the first projection direction.

10. The projection device according to claim 6, wherein the image processor is configured to perform a trapezoidal distortion correction along the projection direction for the image data and perform the reduction process for the image data for which the trapezoidal distortion correction is performed.

11. The projection device according to claim 6, further comprising:
a distance value output unit realized by a module of the program operating on the CPU and configured to output a distance value that represents the measured distance from the projection unit to the projection medium;
a focus adjusting unit that includes a plurality of lenses and configured to adjust a focus of light passing through the focus adjusting unit and the projection unit;
a focus adjusting/driving unit realized by a module of the program operating on the CPU and configured to detect a first deviation from an in-focus state of the light projected onto the projection medium by the projection unit based on a first distance value by using the distance value as the first distance value and drive the focus adjusting unit such that a value representing the first deviation becomes zero;
a determination unit realized by a module of the program operating on the CPU and configured to detect a second deviation from the in-focus state of the light based on a second distance value by using the distance value as the second distance value and determine whether or not a value representing the second deviation is less than a threshold; and
a focus adjusting/controlling unit realized by a module of the program operating on the CPU and configured to set the threshold of the determination unit to a second value larger than a first value and stop updating the first distance value of the focus adjusting/driving unit in a case where the determination unit determines that the threshold is the first value, and a state in which the value representing the second deviation is less than the first value is continued for a time set in advance.

12. The projection device according to claim 11, wherein the focus adjusting/controlling unit is configured to set the threshold value to the first value and restart updating of the first distance value in a case where the determination unit determines that the threshold is the second value, the projection direction of the projection unit is in the middle of being changed, and the value representing the second deviation is the threshold or more.

13. A projection device comprising:
a projection direction changing unit configured to change a projection direction of a projection lens and change a projection direction of a projection unit that converts image data into light and projects the light;
a distance measurement unit realized by a module of a program operating on a CPU and configured to measure a distance up to a projection medium onto which the projection unit projects light;
a direction acquiring unit configured to calculate a first direction perpendicular to the projection medium based on distances measured in at least two or more projection directions of the projection unit by the distance measurement unit; and
an image processor configured to perform image processing according to a second direction acquired by correcting the projection direction of the projection unit using the first direction for the image data projected by the projection unit,
wherein the direction acquiring unit is configured to detect a first inflection point of a downward projection in a change in the distance measured by the distance measurement unit while changing the projection direction of the projection unit by using the projection direction changing unit and acquire a projection direction corresponding to the first inflection point as the first direction.

14. The projection device according to claim 13,
wherein the direction acquiring unit is configured to further detect a second inflection point of an upward projection in the change in the distance for every predetermined interval of the projection direction that is measured by the distance measurement unit, and
wherein the image processor performs a distortion correcting process according to a correction coefficient set in advance for the image data and performs switching the correction coefficient between a first correction coefficient and a second correction coefficient between before and after the projection direction corresponding to the first inflection point and between before and after the projection direction corresponding to the second inflection point.

15. The projection device according to claim 13,
wherein the distance measurement unit measures a first distance and a second distance in a first projection direction and a second projection direction for projection for a first face of the projection medium, and
wherein the direction acquiring unit acquires the first direction by using the first distance, the second distance, and an angle formed by the first projection direction and the second projection direction.

16. The projection device according to claim 15,
wherein the distance measurement unit is configured to further measure a third distance and a fourth distance in a third projection direction and a fourth projection direction for projection for a second face intersecting with the first face,
wherein the direction acquiring unit is configured to acquire another first direction by using the third distance, the fourth distance, and an angle formed by the third projection direction and the fourth projection direction and acquire an intersection between the first face and the second face based on a first point and a second point on the first face at which the first distance and the second distance are measured and a third point and a fourth point on the second face at which the third distance and the fourth distance are measured, and
wherein the image processor is configured to perform a distortion correcting process according to a correction coefficient set in advance for the image data and perform switching the correction coefficient between a first correction coefficient and a second correction coefficient between before and after first direction, between before and after a direction corresponding to the intersection, and between before and after the another first direction.

17. The projection device according to claim 13, further comprising:
a distance value output unit realized by a module of the program operating on the CPU and configured to output a distance value representing a measured distance from the projection unit to the projection medium;
a focus adjusting unit that includes a plurality of lenses and configured to adjust a focus of light passing through the focus adjusting unit and the projection unit;
a focus adjusting/driving unit realized by a module of the program operating on the CPU and configured to detect a first deviation from an in-focus state of the light projected onto the projection medium by the projection unit based on a first distance value by using the distance value as the first distance value and drive the focus adjusting unit such that a value representing the first deviation becomes zero;
a determination unit realized by a module of the program operating on the CPU and configured to detect a second deviation from the in-focus state of the light based on a second distance value by using the distance value as the second distance value and determine whether or not a value representing the second deviation is less than a threshold; and
a focus adjusting/controlling unit realized by a module of the program operating on the CPU and configured to set the threshold of the determination unit to a second value larger than a first value and stop updating the first distance value of the focus adjusting/driving unit in a case where the determination unit determines that the threshold is the first value, and a state in which the value representing the second deviation is less than the first value is continued for a time set in advance.

18. The projection device according to claim 17, wherein the focus adjusting/controlling unit is configured to set the threshold value to the first value and restart updating of the first distance value in a case where the determination unit determines that the threshold is the second value, the projection direction of the projection unit is in the middle of being changed, and the value representing the second deviation is the threshold or more.

* * * * *